US012812336B2

(12) United States Patent
Jia et al.

(10) Patent No.: US 12,812,336 B2
(45) Date of Patent: Nov. 24, 2026

(54) COMMUNICATION METHOD AND APPARATUS FOR MULTICAST/BROADCAST SERVICE

(71) Applicant: HUAWEI TECHNOLOGIES CO., LTD., Shenzhen (CN)

(72) Inventors: Jianxin Jia, Shanghai (CN); Wenfu Wu, Shanghai (CN); Zaifeng Zong, Nanjing (CN); Fenqin Zhu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 245 days.

(21) Appl. No.: 18/446,672

(22) Filed: Aug. 9, 2023

(65) Prior Publication Data

US 2023/0388756 A1 Nov. 30, 2023

Related U.S. Application Data

(63) Continuation of application No. PCT/CN2021/121471, filed on Sep. 28, 2021.

(30) Foreign Application Priority Data

Feb. 10, 2021 (WO) ................ PCT/CN2021/076441

(51) Int. Cl.
*H04W 4/06* (2009.01)
*H04W 4/02* (2018.01)
*H04W 72/04* (2023.01)

(52) U.S. Cl.
CPC ............. *H04W 4/06* (2013.01); *H04W 4/023* (2013.01); *H04W 72/04* (2013.01)

(58) Field of Classification Search
None
See application file for complete search history.

(56) References Cited

U.S. PATENT DOCUMENTS

2006/0050672 A1 3/2006 Shim et al.
2009/0093259 A1 4/2009 Edge et al.
(Continued)

FOREIGN PATENT DOCUMENTS

CN 101668246 A 3/2010
CN 101820585 A 9/2010
(Continued)

OTHER PUBLICATIONS

3GPP TR23.757 V1.2.0,"3rd Generation Partnership Project,Technical Specification Group Services and System Aspects; Study on architectual enhancements for 5G multicast-broadcast services (Release 17)",Nov. 28, 2020,total 13 pages.
(Continued)

*Primary Examiner* — Walter J Divito

(57) ABSTRACT

This application provides a communication method and apparatus for a multicast/broadcast service. The method is performed by a network device and including: obtaining reference location information of a terminal representing a reference location of the terminal. When the reference location of the terminal is inside a service area of a first multicast/broadcast service, triggering a target access network device of the terminal to allocate, to the terminal, a data resource for transmitting the first multicast/broadcast service. When the reference location of the terminal is outside the service area, triggering the target access network device not to allocate, to the terminal, a data resource for transmitting the first multicast/broadcast service. According to the method, when the terminal moves into the service area or moves out of the service area, the network device can dynamically and flexibly interact with an access network device, thereby effectively saving network resources.

16 Claims, 25 Drawing Sheets

(56) References Cited

U.S. PATENT DOCUMENTS

| | | | | |
|---|---|---|---|---|
| 2014/0112236 A1* | 4/2014 | Jung | H04W 36/0064 370/312 |
| 2015/0373638 A1* | 12/2015 | Zhang | H04W 48/20 370/312 |
| 2021/0136721 A1* | 5/2021 | Kumar | H04W 64/00 |

FOREIGN PATENT DOCUMENTS

| | | | |
|---|---|---|---|
| CN | 104812025 | A | 7/2015 |
| CN | 109429185 | A | 3/2019 |
| CN | 111213393 | A | 5/2020 |
| CN | 112118542 | A | 12/2020 |
| EP | 1914928 | A1 | 4/2008 |
| WO | 2020156384 | A1 | 8/2020 |

OTHER PUBLICATIONS

3GPP TS 23.502 V16.7.1,"3rd Generation Partnership Project,Technical Specification Group Services and System Aspects; Procedures for the 5G System (5GS); Stage 2 (Release 16)," Jan. 13, 2021,total 23 pages.

3GPP TS 38.423 V16.4.0 (Jan. 2021),3rd Generation Partnership Project;Technical Specification Group Radio Access Network;NG-RAN;Xn application protocol (XnAP) (Release 16),total 457 pages.

3GPP TR 23.757 V1.2.0 (Nov. 2020),3rd Generation Partnership Project;Technical Specification Group Services and System Aspects;Study on architectural enhancements for 5G multicast-broadcast services (Release 17),total 293 pages.

3GPP TS 29.502 V16.6.0 (Dec. 2020),3rd Generation Partnership Project;Technical Specification Group Core Network and Terminals;5G System;Session Management Services;Stage 3 (Release 16),total 267 pages.

3GPP TS 38.413 V16.4.0 (Jan. 2021),3rd Generation Partnership Project;Technical Specification Group Radio Access Network;NG-RAN;NG Application Protocol (NGAP) (Release 16),total 470 pages.

Ericsson:"KI#6, New Solution: Support Local MBS Service." SA WG2 Meeting #139E Electronic, Jun. 1-12, 2020. S2-2003703, total 5 pages.

Huawei, HiSilicon:"KI #6, New Sol: On Local MBS Support." 3GPP TSG-WG SA2 Meeting #140E e-meeting Elbonia, Aug. 19-Sep. 1, 2020. S2-2005410, total 5 pages.

* cited by examiner

COMMUNICATION METHOD AND APPARATUS FOR MULTICAST/BROADCAST SERVICE

CROSS-REFERENCE TO RELATED APPLICATIONS

This application is a continuation of International Application No. PCT/CN2021/121471, filed on, Sep. 28, 2021, which claims priority to International Application No. PCT/CN2021/076441, filed on Feb. 10, 2021. The disclosures of the aforementioned applications are hereby incorporated by reference in their entireties.

TECHNICAL FIELD

This application relates to the field of communication technologies, and in particular, to a communication method and apparatus for a multicast/broadcast service.

BACKGROUND

With development of the mobile Internet, mobile high-definition video services are experiencing a surge. Users are gradually changing from watching video programs through fixed networks to watching video programs through mobile phone terminals and mobile networks. Video services have increasingly strong impact on mobile networks.

To overcome the foregoing difficulties, supporting a multicast/broadcast service (5G Multicast/Broadcast Service, 5MBS) function based on a 5th generation (5G) mobile communication network architecture becomes a key research subject.

A key research issue of the 5MBS research subject is a local multicast/broadcast service (Local MBS). The local multicast/broadcast service means that the multicast/broadcast service is distributed only in a specified area, and the specified area may be referred to as a distribution area or as a service area. The distribution area may be a cell, or may be a tracking area (TA), or the like.

For the foregoing research issue, when a terminal moves into a multicast/broadcast service area or moves out of a distribution area, how to perform multicast/broadcast session management to effectively save a network resource is an urgent problem to be resolved.

SUMMARY

Embodiments of this application provide a communication method for a multicast/broadcast service, to enable a network device to dynamically determine a relationship between reference location information of a terminal and a service area of a first multicast/broadcast service and flexibly allocate a resource to or delete a resource from the terminal, thereby improving the utilization of network resources, effectively saving network resources, and avoiding a resource waste caused by invalid forwarding of data of a multicast/broadcast service.

According to a first aspect, a communication method for a multicast/broadcast service is provided. The method includes: a network device obtains reference location information of a terminal. The reference location information represents a reference location of the terminal. When the reference location of the terminal is inside a service area of a first multicast/broadcast service, the network device triggers a target access network device of the terminal to allocate a transmission resource to the terminal. The transmission resource is used to transmit data of the first multicast/broadcast service.

With reference to the first aspect, in some implementations of the first aspect, the reference location information includes location information of the terminal in the target access network device of the terminal.

With reference to the first aspect, in some implementations of the first aspect, the location information is an identifier of a target cell of the terminal and/or an identifier of the target access network device.

With reference to the first aspect, in some implementations of the first aspect, the network device includes a session management function network element or a source access network device of the terminal.

According to the communication method for a multicast/broadcast service provided in this application, when the network device dynamically determines that the reference location information of the terminal is inside the service area of the first multicast/broadcast service, a T-gNB of the terminal is triggered to allocate a resource to, or establish a resource for the terminal, thereby improving the utilization of network resources.

According to a second aspect, a communication method for a multicast/broadcast service is provided. The method includes: a network device obtains reference location information of a terminal. The reference location information represents a reference location of the terminal. When the reference location of the terminal is outside a service area of a first multicast/broadcast service, the network device initiates release of a first transmission resource of the terminal. The first transmission resource is used to transmit data of the first multicast/broadcast service.

It should be noted that the network device may initiate release of the first transmission resource of the terminal, or the network device may trigger or initiate deletion of the first transmission resource.

According to the communication method for a multicast/broadcast service provided in this application, if the network device determines that the reference location of the terminal is outside the service area of the first multicast/broadcast service, the network device triggers/initiates a release/deletion of the first transmission resource of the terminal so that network resources can be effectively saved, and a resource waste caused by invalid forwarding can be avoided.

With reference to the second aspect, in some implementations of the second aspect, the first transmission resource includes a resource used by the terminal to transmit the data of the first multicast/broadcast service through a target access network device of the terminal.

With reference to the second aspect, in some implementations of the second aspect, the network device determines, based on the reference location information, that the terminal is outside the service area of the first multicast/broadcast service.

With reference to the second aspect, in some implementations of the second aspect, the reference location information includes location information of the terminal in an access network device that currently serves the terminal, or location information of the terminal in the target access network device of the terminal.

With reference to the second aspect, in some implementations of the second aspect, that a network device obtains reference location information of a terminal includes: when the network device is a session management function network element, the session management function network element receives a first message. The first message includes the reference location information.

With reference to the second aspect, in some implementations of the second aspect, the first message further includes identification information of the first multicast/broadcast service.

With reference to the second aspect, in some implementations of the second aspect, the first message is a protocol data unit (PDU) session context update request or a location information provision.

With reference to the second aspect, in some implementations of the second aspect, the method further includes: the session management function network element subscribes to the reference location information of the terminal from an access and mobility management network element. That the session management function network element receives a first message includes: the session management function network element receives the reference location information of the terminal from the access and mobility management network element.

With reference to the second aspect, in some implementations of the second aspect, that the network device initiates release of a first transmission resource includes: when the network device is the session management function network element, the session management function network element notifies a user plane function network element (UPF) to release the first transmission resource, and/or the session management function network element notifies the target access network device of the terminal to release the first transmission resource. When the first transmission resource is a radio bearer corresponding to a Quality of Service (QoS) flow corresponding to the first multicast/broadcast service, if the session management function network element only notifies the target access network device of the terminal to release the first transmission resource, it may be understood that the first transmission resource is terminated. When the first transmission resource is the QoS flow corresponding to the first multicast/broadcast service, when the session management function network element notifies the user plane function network element to release the first transmission resource and notifies the target access network device of the terminal to release the first transmission resource, it may be understood that the first transmission resource is released.

With reference to the second aspect, in some implementations of the second aspect, that the session management function network element notifies a UPF to release the first transmission resource includes: the session management function network element sends an N4 session modification request or a packet forwarding control protocol PFCP session modification request to the UPF, to notify the UPF to release the first transmission resource.

According to the communication method for a multicast/broadcast service provided in this application, when the session management function network element determines that the reference location of the terminal is outside the service area of the first multicast/broadcast service, the session management function network element notifies, in a PFCP session context in which the session management function network element interacts with the UPF, to release the multicast/broadcast transmission resource. Through processing and operations performed by the session management function network element, this solution can effectively save network resources, and avoid a resource waste caused by invalid forwarding of data of a multicast/broadcast service.

With reference to the second aspect, in some implementations of the second aspect, the method further includes: when the network device is the session management function network element, the session management function network element notifies the target access network device of the terminal that the first transmission resource is invalid, the session management function network element notifies the target access network device of the terminal not to allocate a radio resource corresponding to the first transmission resource, or the session management function network element does not send an identifier of the first transmission resource to the target access network device of the terminal.

It should be noted that the session management function network element notifies the target access network device of the terminal not to allocate a radio resource corresponding to the first transmission resource may also be that: the session management function network element notifies the target access network device of the terminal not to establish or prepare the radio resource corresponding to the first transmission resource.

According to the communication method for a multicast/broadcast service provided in this application, if the session management function network element determines that the reference location of the terminal is outside the service area of the first multicast/broadcast service, the session management function network element notifies the target access network device of the terminal not to allocate/establish/prepare a transmission resource for the data of the first multicast/broadcast service. Through processing and operations performed by the session management function network element, this solution can effectively save network resources and avoid a resource waste caused by invalid forwarding of data of a multicast/broadcast service.

With reference to the second aspect, in some implementations of the second aspect, that the network device initiates release of a first transmission resource of the terminal includes: when the network device is the source access network device of the terminal, the source access network device notifies a session management function network element to release the first transmission resource.

According to the communication method for a multicast/broadcast service provided in this application, if the source access network device of the terminal determines that the reference location of the terminal is outside the service area of the first multicast/broadcast service, the source access network device of the terminal notifies the session management function network element to release and delete the first transmission resource used to transmit the data of the first multicast/broadcast service. Through processing and operations performed by the source base station, this solution can effectively save network resources, and avoid a resource waste caused by invalid forwarding of data of a multicast/broadcast service.

According to a third aspect, a communication method for a multicast/broadcast service is provided. The method includes: a target access network device obtains reference location information of a terminal. The reference location information represents a reference location of the terminal. When the reference location of the terminal is outside a service area of a first multicast/broadcast service, the target access network device does not accept forwarding of data of the first multicast/broadcast service for the terminal from a source access network device of the terminal.

According to the communication method for a multicast/broadcast service provided in this application, the target access network device performs determining and processing. When the target access network device determines that the reference location of the terminal is outside the service area of the first multicast/broadcast service, the target access network device does not forward the data of the first multicast/broadcast service of the terminal. This solution can effectively save network resources, and avoid a resource waste caused by invalid forwarding of data of a multicast/broadcast service.

With reference to the third aspect, in some implementations of the third aspect, that a target access network device obtains reference location information of a terminal includes: the target access network device receives the reference location information of the terminal from the source access network device.

With reference to the third aspect, in some implementations of the third aspect, the reference location information includes: location information of the terminal in the target access network device of the terminal.

With reference to the third aspect, in some implementations of the third aspect, the method further includes: notifying the source access network device that the target access network device does not accept forwarding of the data of the first multicast/broadcast service for the terminal from the source access network device of the terminal.

According to a fourth aspect, a communication method for a multicast/broadcast service is provided. The method includes: a source access network device finds that a terminal device joins a first multicast/broadcast service. The source access network device sends identification information of a target cell. The identification information of the target cell is carried in N2 session management information (N2 SM Information).

It should be understood that the source access network device finds that the terminal device joins the first multicast/broadcast service may also be understood as that the source access network device determines that the terminal device joins the first multicast/broadcast service.

It should be noted that the identification information of the target cell may be carried in an information element that is parallel to the N2 session management information and that is in a specific message. The specific message may be a handover required message. It may be understood that the identification information of the target cell is not carried in the N2 session management information, and instead, is carried in a handover required as an independent information element. An information element parallel to the N2 session management information may be the identification information of the target cell serving as an information element that is added in addition to information elements that need to be included in a handover required in the conventional art: a handover type, a target identifier (Target ID), a cause value (Cause), a source-to-target transparent container (Source to Target Transparent Container), a PDU session resource list, a message type, an AMF new generation application protocol UE ID (NGAP UE ID), and a RAN UE NGAP ID, and that is parallel to the information elements that need to be included in the handover required in the conventional art. For another example, the identification information of the target cell serves as an information element in addition to information elements included in a handover required in the conventional art: a handover type, a target identifier (Target ID), a cause value (Cause), a source-to-target transparent container (Source to Target Transparent Container), a PDU session resource list, a message type, an AMF UE NGAP ID, and a RAN UE NGAP ID, are not carried in any of the information elements that need to be included in the handover required in the conventional art, and instead, are carried in the handover required as an independent information element.

With reference to the fourth aspect, in some implementations of the fourth aspect, the method further includes: the source access network device receives a measurement report from the terminal device. The source access network device determines the identification information of the target cell of the terminal device based on the measurement report.

It should be noted that the source access network device may further determine the identification information of the target cell of the terminal device based on a load status.

For example, in an implementation, the source access network device is overloaded. For example, there are a large quantity of terminal devices accessing the source access network device. In this case, the source access network device autonomously selects some terminal devices, and actively selects, for the terminal devices, target cells to which the terminal devices need to be handed over. The terminal devices autonomously selected by the source access network device may include a terminal device that joins the first multicast/broadcast service. In this case, the source access network device may use a locally stored identifier of a neighboring cell included in a neighboring base station as an identifier of a target cell selected for the terminal device, include the identifier of the target cell in N2 session management information, and send the N2 session management information to the SMF through the AMF. The identifier of the neighboring cell of the neighboring base station locally stored by the source access network device may be obtained by exchanging parameters with a neighboring access network device when the source access network device is initialized or powered on, or may be obtained through operation, administration, and maintenance (OAM) configuration. There may be one or more neighboring base stations, there may be one or more neighboring cells included in the neighboring base station, and there may be one or more autonomously selected terminal devices.

With reference to the fourth aspect, in some implementations of the fourth aspect, the N2 session management information is carried in a handover required. For example, the N2 session management information is a handover required transfer.

According to a fifth aspect, a communication method for a multicast/broadcast service is provided. The method includes: a source access network device obtains reference location information of a terminal device. The reference location information represents a reference location of the terminal device. The source access network device sends indication information to a session management function network element based on the reference location information. The indication information includes first indication information and/or second indication information. The first indication information indicates that the reference location of the terminal device is outside a service area of a first multicast/broadcast service, and the second indication information indicates that the reference location of the terminal device is inside a service area of a second multicast/broadcast service.

With reference to the fifth aspect, in some implementations of the fifth aspect, the reference location information includes location information of the terminal device in a target access network device, and may be an identifier of a target cell of the terminal device.

With reference to the fifth aspect, in some implementations of the fifth aspect, the indication information is carried in N2 session management information.

With reference to the fifth aspect, in some implementations of the fifth aspect, the indication information is an information element parallel to the N2 session management information. The parallel information elements are described in the fourth aspect, and details are not described herein again.

With reference to the fifth aspect, in some implementations of the fifth aspect, the N2 session management information is carried in a handover required, and the N2 session management information is a handover required transfer.

According to a sixth aspect, a communication method for a multicast/broadcast service is provided. The method includes: a session management function network element receives first indication information. The first indication information indicates that a reference location of a terminal device is outside a service area of a first multicast/broadcast service. The session management function network element initiates, based on the first indication information, release of a first transmission resource of the terminal device. The first transmission resource is used to transmit data of the first multicast/broadcast service.

With reference to the sixth aspect, in some implementations of the sixth aspect, the method further includes: the session management function network element receives second indication information. The second indication information indicates that the reference location of the terminal device is inside a service area of a second multicast/broadcast service. The session management function network element initiates, based on the second indication information, a target access network device of the terminal device to configure a second transmission resource for the terminal device. The second transmission resource is used to transmit data of the second multicast/broadcast service.

With reference to the sixth aspect, in some implementations of the sixth aspect, the first indication information and the second indication information are carried in N2 session management information.

With reference to the sixth aspect, in some implementations of the sixth aspect, the first indication information and the second indication information are information elements parallel to the N2 session management information. The parallel information elements are described in the fourth aspect, and details are not described herein again.

With reference to the sixth aspect, in some implementations of the sixth aspect, the N2 session management information is carried in a handover required, and the N2 session management information is a handover required transfer.

According to a seventh aspect, a communication method for a multicast/broadcast service is provided. The method includes: a session management function network element receives indication information. The indication information indicates that a reference location of a terminal device is inside a service area of a first multicast/broadcast service. The session management function network element initiates, based on the indication information, a target access network device of the terminal device to configure a first transmission resource for the terminal device. The first transmission resource is used to transmit data of the first multicast/broadcast service.

With reference to the seventh aspect, in some implementations of the seventh aspect, the indication information is carried in N2 session management information.

With reference to the seventh aspect, in some implementations of the seventh aspect, the N2 session management information is carried in a handover required, and the N2 session management information is a handover required transfer.

With reference to the seventh aspect, in some implementations of the seventh aspect, the indication information is an information element parallel to the N2 session management information. The parallel information elements are described in the fourth aspect, and details are not described herein again.

Based on the foregoing solution, processing logic of the session management function network element is released, because the processing logic is that the source access network device determines whether the target cell is outside the service area of the first multicast/broadcast service and/or inside the service area of the second multicast/broadcast service, and then notifies the session management function network element of a determination result in an indication manner. For example, when it is determined that the identifier of the target cell is outside the first multicast/broadcast service, the N2 session management information includes identification information of the first multicast/broadcast service and first indication information. The first indication information may be represented by, for example, a binary bit 1 or 0. For another example, when it is determined that identifier of the target cell is inside the second multicast/broadcast service, the N2 session management information includes second indication information and identification information of the second multicast/broadcast service. The second indication information may be represented by, for example, a binary bit 1 or 0.

According to an eighth aspect, a communication method for a multicast/broadcast service is provided. The method includes: a target access network device receives a notification from a session management function network element. The notification notifies that a first transmission resource of the terminal is invalid, and the first transmission resource is used to transmit data of a first multicast/broadcast service. The target access network device does not allocate a radio resource corresponding to the first transmission resource, and/or the target access network device sends indication information to a source access network device of the terminal. The indication information indicates that the target access network device does not accept forwarding of data of the first multicast/broadcast service for the terminal from the source access network device.

According to the communication method for a multicast/broadcast service provided in this application, through processing and operations performed by the target access network device, this solution can effectively save network resources, and avoid a resource waste caused by invalid forwarding of data of a multicast/broadcast service.

According to a ninth aspect, a communication apparatus for a multicast/broadcast service is provided, where the apparatus includes: a processing module configured to obtain reference location information of a terminal. The reference location information represents a reference location of the terminal. When the reference location of the terminal is inside a service area of a first multicast/broadcast service, the processing module triggers a target access network device of the terminal to allocate a transmission resource to the terminal. The transmission resource is used to transmit data of the first multicast/broadcast service.

Based on beneficial effects of the foregoing solutions, refer to corresponding descriptions in the first aspect. For brevity, details are not described herein again in this application.

With reference to the ninth aspect, in some implementations of the ninth aspect, the reference location information includes location information of the terminal in the target access network device of the terminal.

With reference to the ninth aspect, in some implementations of the ninth aspect, the location information is an identifier of a target cell of the terminal and/or an identifier of the target access network device.

With reference to the ninth aspect, in some implementations of the ninth aspect, the apparatus includes a session management function network element or a source access network device of the terminal.

According to a tenth aspect, a communication apparatus for a multicast/broadcast service is provided. The apparatus includes: a processing module configured to obtain reference location information of a terminal. The reference location information represents a reference location of the terminal. When the reference location of the terminal is outside a service area of the first multicast/broadcast service, the processing module triggers release of a first transmission resource of the terminal. The first transmission resource is used to transmit data of the first multicast/broadcast service.

Based on beneficial effects of the foregoing solutions, refer to corresponding descriptions in the second aspect. For brevity, details are not described herein again in this application.

With reference to the tenth aspect, in some implementations of the tenth aspect, the first transmission resource includes a resource used to transmit the data of the first multicast/broadcast service through a target access network device of the terminal.

With reference to the tenth aspect, in some implementations of the tenth aspect, the processing module is further configured to determine, based on the reference location information, that the terminal is outside the service area of the first multicast/broadcast service.

With reference to the tenth aspect, in some implementations of the tenth aspect, the reference location information includes: location information of the terminal in an access network device that currently serves the terminal, or location information of the terminal in a target access network device of the terminal.

With reference to the tenth aspect, in some implementations of the tenth aspect, when the apparatus is a session management function network element, the apparatus further includes: a transceiver module configured to receive a first message. The first message includes the reference location information.

With reference to the tenth aspect, in some implementations of the tenth aspect, the first message further includes identification information of the first multicast/broadcast service.

With reference to the tenth aspect, in some implementations of the tenth aspect, the first message is a protocol data unit PDU session context update request or a location information provision.

With reference to the tenth aspect, in some implementations of the tenth aspect, the transceiver module is further configured to subscribe to the reference location information of the terminal from an access and mobility management network element. That the transceiver module receives the first message includes: the transceiver module receives the reference location information of the terminal from the access and mobility management network element.

With reference to the tenth aspect, in some implementations of the tenth aspect, when the apparatus is the session management function network element, the transceiver module is further configured to notify a user plane function network element UPF to release the first transmission resource, and/or the transceiver module is further configured to notify a target access network device of the terminal to release the first transmission resource.

With reference to the tenth aspect, in some implementations of the tenth aspect, the transceiver module is further configured to send an N4 session modification request or a packet forwarding control protocol PFCP session modification request to the UPF to notify the UPF to release the first transmission resource.

With reference to the tenth aspect, in some implementations of the tenth aspect, when the apparatus is the session management function network element, the transceiver module is further configured to notify a target access network device of the terminal that the first transmission resource is invalid, or the transceiver module is further configured to notify a target access network device of the terminal not to allocate a radio resource corresponding to the first transmission resource, or the transceiver module does not send an identifier of the first transmission resource to a target access network device of the terminal.

With reference to the tenth aspect, in some implementations of the tenth aspect, when the apparatus is a source access network device of the terminal, the apparatus further includes: a transceiver module configured to notify a session management function network element to release the first transmission resource.

According to an eleventh aspect, a communication apparatus for a multicast/broadcast service is provided. The apparatus includes: a processing module configured for a device to obtain reference location information of a terminal. The reference location information represents a reference location of the terminal. When the reference location of the terminal is outside a service area of a first multicast/broadcast service, the processing module does not accept/discards forwarding of data of the first multicast/broadcast service for the terminal from a source access network device of the terminal.

Based on beneficial effects of the foregoing solutions, refer to corresponding descriptions in the third aspect. For brevity, details are not described herein again in this application.

With reference to the eleventh aspect, in some implementations of the eleventh aspect, a transceiver module is configured to receive the reference location information of the terminal from the source access network device.

With reference to the eleventh aspect, in some implementations of the eleventh aspect, the reference location information includes location information of the terminal in a target access network device of the terminal.

With reference to the eleventh aspect, in some implementations of the eleventh aspect, the transceiver module is further configured to notify the source access network device that the apparatus does not accept forwarding of the data of the first multicast/broadcast service for the terminal from the source access network device of the terminal.

According to a twelfth aspect, a communication apparatus for a multicast/broadcast service is provided. The apparatus includes: a transceiver module and a processing module. The transceiver module is configured to receive a notification from a session management function network element. The notification notifies that a first transmission resource of the terminal is invalid, and the first transmission resource is used to transmit data of a first multicast/broadcast service. The processing module is configured to skip allocating a radio resource corresponding to the first transmission resource. In addition/alternatively, the transceiver module is further configured to send indication information to a source access network device of the terminal. The indication information indicates that the transceiver module does not accept forwarding of data of the first multicast/broadcast service for the terminal from the source access network device.

Based on beneficial effects of the foregoing solutions, refer to corresponding descriptions in the fourth aspect. For brevity, details are not described herein again in this application.

According to a thirteenth aspect, a communication apparatus for a multicast/broadcast service is provided. The apparatus includes: a memory and a processor. The memory is configured to store computer instructions. The processor is configured to execute the computer instructions stored in the memory to enable the apparatus to perform the communication method for a multicast/broadcast service in any possible implementation of the first aspect to the eighth aspect.

According to a fourteenth aspect, a computer-readable storage medium is provided. The computer-readable storage medium stores a computer program. When the computer program is executed by a communication apparatus for a multicast/broadcast service, the apparatus is enabled to perform the communication method for a multicast/broadcast service in any possible implementation of the first aspect to the eighth aspect.

DESCRIPTION OF EMBODIMENTS

Figure 1:
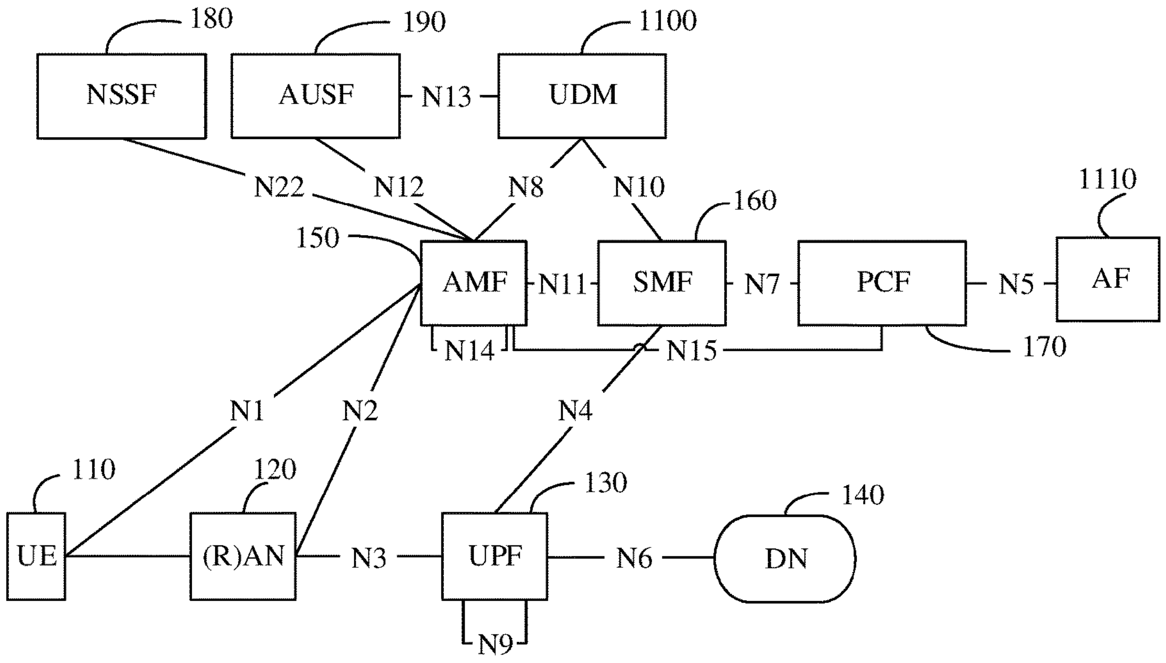
FIG. 1 is a diagram of a network architecture to which an embodiment of this application is applicable.

FIG. 1 is a diagram of a network architecture to which an embodiment of this application is applicable. The following separately describes parts in the network architecture shown in FIG. 1.

1. A user equipment (terminal) 110 may include various handheld devices having a wireless communication function, in-vehicle devices, wearable devices, computing devices or other processing devices connected to a wireless modem, and terminals, mobile stations (MS), terminals, soft clients, or the like in various forms. For example, the UE 110 may be a water meter, an electricity meter, or a sensor.

For example, the user equipment in embodiments of this application may be an access terminal, a subscriber unit, a subscriber station, a mobile station, a relay station, a remote station, a remote terminal, a mobile device, a user terminal, terminal equipment, a wireless communication device, a user agent, or a user apparatus. The user equipment may alternatively be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, an in-vehicle device, a wearable device, a user equipment in a 5G network, a user equipment in a future evolved public land mobile network (PLMN), a user equipment in the future Internet of vehicles, or the like. This is not limited in embodiments of this application.

By way of example, and not limitation, in embodiments of this application, the wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the user equipment in embodiments of this application may alternatively be a user equipment in the Internet of Things (IoT) system. IoT is an important part of development of future information technologies. A main technical feature of the IoT is to connect an object to a network by using a communication technology to implement an intelligent network of human-machine interconnection and thing-thing interconnection. In embodiments of this application, an IoT technology may implement massive connections, deep coverage, and terminal power saving by using, for example, a narrow band (NB) technology. In addition, in embodiments of this application, the user equipment may further include sensors such as a smart printer, a train detector, and a gas station. Main functions include collecting data (some user equipments), receiving control information and downlink data of an access network device, sending an electromagnetic wave, and transmitting uplink data to the access network device.

2. A (radio) access network ((R)AN) device 120 is configured to provide a network access function for an authorized user equipment in a specific area, and can use transmission tunnels with different quality based on levels of user equipments, service requirements, and the like.

The (R)AN device may be referred to as a RAN for short, and is configured to manage a radio resource, provide an access service for a user equipment, and complete forwarding of a control signal and user equipment data between the user equipment and a core network. The (R)AN may also be understood as a base station in a conventional network.

For example, the access network device in embodiments of this application may be any communication device that has a wireless transceiver function and that is configured to communicate with the user equipment. The access network device includes but is not limited to an evolved NodeB (eNB), a radio network controller RNC), a NodeB (NB), a base station controller (BSC), a base transceiver station (BTS), a home base station (for example, a home evolved NodeB (HeNB), or a home NodeB (HNB)), a baseband unit (BBU), an access point (AP) in a wireless fidelity (Wi-Fi) system, a wireless relay node, a wireless backhaul node, a transmission point (TP), a transmission reception point (TRP), or the like. Alternatively, the access network device may be a gNB or a transmission point (TRP or TP) in a 5G system such as an NR system, may be one antenna panel or a group of antenna panels (including a plurality of antenna panels) of a base station in a 5G system, or may be a network node, for example, a baseband unit (BBU) or a distributed unit (DU), that constitutes a gNB or a transmission point.

In some deployments, a gNB may include a central unit (CU) and a DU. The gNB may further include an active antenna unit (AAU). The CU performs some functions of the gNB, and the DU performs some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling, such as RRC layer signaling, may also be considered as being sent by the DU or sent by the DU and the AAU. It may be understood that the access network device may be a device including one or more of a CU node, a DU node, and an AAU node. In addition, the CU may be classified as an access network device in an access network (RAN), or the CU may be classified as an access network device in a core network (CN). This is not limited in this application.

3. A user plane network element 130 is configured to route and forward user plane data, or perform quality of service (QoS) processing on user plane data, and so on.

In a 5G communication system, the user plane network element may be a user plane function (UPF) network element. In a future communication system, the user plane network element may still be the UPF network element, or may have another name. This is not limited in this application.

4. A data network network element (DN) 140 is a network that provides transmission data.

In a 5G communication system, the data network network element may be a data network network element. In a future communication system, the data network network element may still be the DN network element, or may have another name. This is not limited in this application.

5. An access management network element 150 is mainly configured to perform mobility management, access management, and the like, and may be configured to implement another function, other than session management, in mobility management entity (MME) functions in a 4G communication system.

In a 5G communication system, the access management network element may be an access and mobility management function (AMF) network element. In a future communication system, the access management network element may still be the AMF network element, or may have another name. This is not limited in this application.

6. A session management network element 160 is mainly configured to manage a session, assign and manage an Internet Protocol (IP) address of the terminal, select a termination point that can manage a user plane function interface and a policy control and charging function interface, notify downlink data, and so on.

In a 5G communication system, the session management function network element may be a session management function (SMF) network element. In a future communication system, the session management function network element may still be the SMF network element, or may have another name. This is not limited in this application.

7. A policy control network element 170 is configured to provide policy rule information and the like, for example, provide a policy rule for a control plane function network element (for example, an AMF or an SMF).

In a 4G communication system, the policy control network element may be a policy and charging rules function (PCRF) network element. In a 5G communication system, the policy control network element may be a policy control function (PCF) network element. In a future communication system, the policy control network element may still be the PCF network element, or may have another name. This is not limited in this application.

8. A network slice selection network element 180 is configured to search for a PCF associated with a session.

In a 5G communication system, the network slice selection network element may be a network slice selection function (NSSF) network element. In a future communication system, the network slice selection network element may still be the NSSF network element, or may have another name. This is not limited in this application.

9. An authentication server 190 is configured to authenticate a service, generate a key to implement bidirectional authentication for the terminal, and support a unified authentication framework.

In a 5G communication system, the authentication server may be an authentication server function (AUSF) network element. In a future communication system, the authentication server function network element may still be the AUSF network element, or may have another name. This is not limited in this application.

10. A data management network element 1100 is configured to process a terminal identifier, and perform access authentication, registration, mobility management, and the like.

In a 5G communication system, the data management network element may be a unified data management (UDM) network element. In a future communication system, the unified data management network element may still be the UDM network element, or may have another name. This is not limited in this application.

11. An application network element is configured to perform application-affected data routing, access a network exposure function network element, interact with a policy framework to perform policy control, and so on.

In a 5G communication system, the application network element may be an application function (AF) network element. In a future communication system, the application network element may still be the AF network element, or may have another name. This is not limited in this application.

12. A network storage network element is configured to maintain real-time information of all network function services in a network.

In a 5G communication system, the network storage network element may be a network repository function (NRF) network element. In a future communication system, the network storage network element may still be the NRF network element, or may have another name. This is not limited in this application.

It may be understood that the foregoing network elements or functions may be network elements in a hardware device, software functions running on dedicated hardware, or virtualized functions instantiated on a platform (for example, a cloud platform).

Certainly, the network architecture in FIG. 1 may further include another network element, for example, a network element or a device such as a unified data repository (UDR) or a network repository function (NRF). This is not limited.

In the network architecture shown in FIG. 1, the terminal is connected to the AMF by an N1 interface, the RAN is connected to the AMF by an N2 interface, and the RAN is connected to the UPF by an N3 interface.

UPFs are connected to each other by an N9 interface, and the UPF is connected to a DN by an N6 interface.

The session management function network element controls the UPF through an N4 interface. The AMF is connected to the session management function network element by an N11 interface.

The AMF obtains terminal subscription data from the UDM network element through an N8 interface. The session management function network element obtains the terminal subscription data from the UDM network element through an N10 interface.

The AMF obtains policy data from the PCF through an N15 interface, and the session management function network element obtains the policy data from the PCF through an N7 interface.

The AF and the PCF are connected by an N5 interface.

It should be noted that names of the network elements and the communication interfaces between the network elements in FIG. 1 are briefly described by using names specified in the existing protocols as examples. However, embodiments of this application are not limited to being applicable only to the existing known communication systems. Therefore, standard names used when the existing protocols are used as examples for description are all function descriptions. A name of a network element, an interface, signaling, or the like is not limited in this application, and only represents a function of the network element, the interface, or the signaling, and may be correspondingly extended to another system, for example, a 2G, 3G, 4G, or future communication system.

A network architecture to which an embodiment of this application is applicable and that is shown in FIG. 1 is merely an example for description. Network architectures to which embodiments of this application are applicable are not limited thereto. Embodiments of this application are applicable to any network architecture that can implement functions of the foregoing network elements.

For example, in some network architectures, network function network element entities, such as an AMF network element, a session management function network element, a PCF network element, a BSF network element, and a UDM network element, are all referred to as network function (NF) network elements. Alternatively, in some other network architectures, a set of network elements, such as an AMF network element, a session management function network element, a PCF network element, a BSF network element, and a UDM network element, may be referred to as control plane function network elements.

The technical solutions in embodiments of this application may be applied to various communication systems, for example, a long-term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system, a new radio (NR) system, or a future network. The technical solutions provided in this application may be further applied to a future communication system, for example, a sixth generation mobile communication system. Alternatively, the communication system may be a public land mobile network (PLMN), a device-to-device (D2D) communication system, a machine to machine (M2M) communication system, an internet of things (IoT) communication system, or another communication system.

In embodiments of this application, the user equipment or the access network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more types of computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a structure of an entity for performing the method provided in embodiments of this application is not particularly limited in embodiments of this application provided that a program recording code of the method provided in embodiments of this application can be run to perform communication according to the method provided in embodiments of this application. For example, the entity for performing the method provided in embodiments of this application may be the user equipment or the access network device, or may be a functional module capable of invoking and executing the program in the user equipment or the access network device.

In addition, aspects or features of this application may be implemented as a method, an apparatus, or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a compact disc (CD) or a digital versatile disc (DVD)), a smart card and a flash memory component (for example, erasable programmable read-only memory (EPROM), a card, a stick, or a key drive). In addition, various storage media described in this specification may represent one or more devices and/or other machine-readable media that are configured to store information. The term "machine-readable storage media" may include but is not limited to a radio channel, and various other media that can store, include, and/or carry instructions and/or data.

Figure 2:
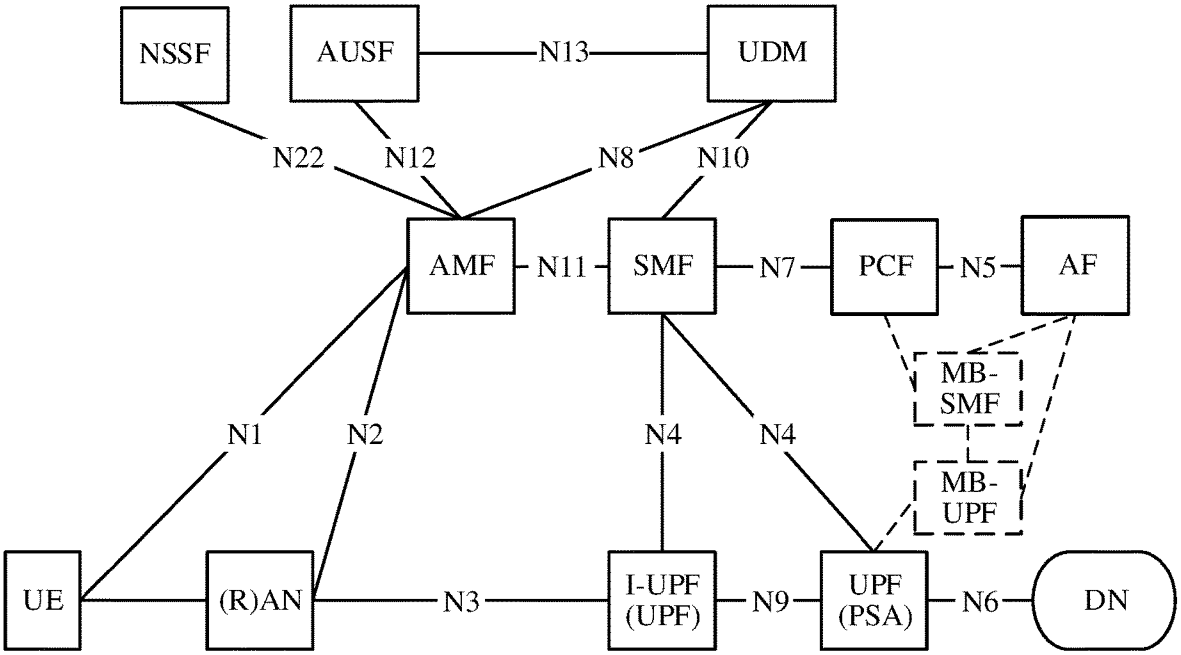
FIG. 2 shows a network architecture used for a multicast/broadcast service to which an embodiment of this application is applicable.

Embodiments of this application further relate to a multicast manner. FIG. 2 provides a network architecture used for a multicast/broadcast service. The architecture is extended based on the architecture shown in FIG. 1. For example, two function entities, such as a multicast/broadcast session management function (MB-SMF) network element and a multicast/broadcast user plane function (MB-UPF) network element, may be added to support a multicast/broadcast service/function.

It should be noted that the communication method provided in this application is also applicable to sending service data in a broadcast manner. When the communication method provided in this application is applied to sending service data in a broadcast manner, multicast in the descriptions of embodiments of this application is replaced with broadcast. A data transmission procedure is similar to that of multicast, and details are not described again in this application for the broadcast manner.

In FIG. 2, the MB-SMF may implement a control plane function of a multicast/broadcast service, and is responsible for management of a multicast/broadcast service/group/session. The MB-SMF may be connected to a multicast/broadcast service server or a multicast/broadcast service function (MBSF) network element or a capability exposure (NEF) network element, to help receive information related to a multicast/broadcast service (for example, a description of the multicast/broadcast service). In addition, the MB-SMF may be connected to the PCF to help create resources for a multicast/broadcast service. The MBU-UPF may be configured to transmit data of a multicast/broadcast service. Optionally, the MB-SMF may be integrated into the PCF or the SMF as a functional module, and the MB-UPF may be integrated into the UPF as a functional module, or the MB-SMF and the MB-UPF may be separately deployed. This is not limited in this application.

It should be noted that the foregoing name of the MB-SMF or the MB-UPF is an example. In a 5G network, the MB-SMF or the MB-UPF may have another name. This is not limited in this application.

The following first describes key terms of related technologies in embodiments of this application. It should be noted that these explanations are intended to make embodiments of this application easier to understand, but should not be considered as a limitation on the protection scope claimed in this application.

(1) Unicast

Unicast in this application refers to the following:

At a core network layer, unicast means sending service data to a terminal through a protocol data unit (PDU) session.

A unicast mode of a multicast/broadcast service may be sending data of the multicast/broadcast service to the terminal through a PDU session, and may be referred to as a unicast mode for short subsequently. The unicast mode may also be referred to as a 5GC individual multicast/broadcast service traffic delivery method (5G core individual MBS traffic delivery method).

Figure 3:
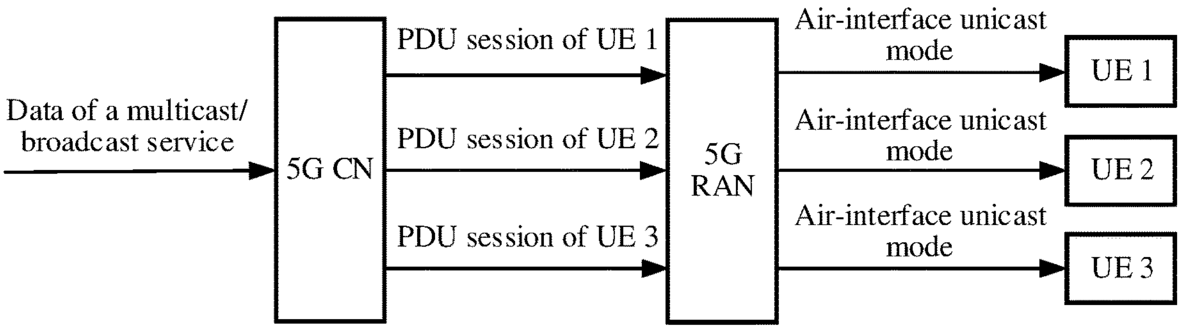
FIG. 3 is a flowchart of data transmission in unicast mode.

A PDU session and the system architecture shown in FIG. 2 are used as an example below to provide a data transmission procedure in unicast mode. FIG. 3 is a diagram of a data transmission procedure in unicast mode. The transmission procedure shown in FIG. 3 may be for transmitting data of a unicast service, or may be for transmitting data of a multicast/broadcast service (in unicast mode).

In FIG. 3, three user equipments (UEs) are used as an example, and a UE 1, a UE 2, and a UE 3 each correspond to a different PDU session. Data of a multicast/broadcast service sent by a service provider (content provider, CP) may be sent to the UE by through a PDU session corresponding to the UE. The PDU session in the figure is assumed to be a PDU session associated with the multicast/broadcast service. A service transmission path from the CP to an NG-RAN may include a transmission path between the CP and a 5G CN (5G core network) and a transmission path between the 5G CN and the NG-RAN. The transmission path between the 5G CN and the NG-RAN may be a PDU session tunnel, for example, an N3 tunnel between a PSA-UPF and the NG-RAN. Different PDU sessions have different PDU session tunnels. Three PDU session tunnels in this diagram respectively correspond to the three UEs. On an air interface, the RAN may separately send the service data to the UE 1, the UE 2, and the UE 3 in uni cast mode, that is, in PTP mode. In the diagram, the service data of the UEs may be different (for example, target addresses are IP addresses of the UEs), and the service data of the UEs may be respectively sent to the UEs through independent transmission paths of the UEs.

(2) Multicast/Broadcast

Multicast/broadcast in this application refers to the following:

At a core network layer, multicast/broadcast refers to sending data of a multicast/broadcast service to a terminal device through a multicast/broadcast session, and may be subsequently referred to as a multicast/broadcast mode. The multicast/broadcast mode may also be referred to as a 5GC shared multicast/broadcast service traffic delivery method (5G core shared MBS traffic delivery method).

In embodiments of this application, the multicast/broadcast mode in the sending mode determined by the SMF means sending data of a multicast/broadcast service to the terminal device through a multicast/broadcast session. A multicast/broadcast service may be described by using information about a multicast/broadcast service. The information about the multicast/broadcast service includes at least description information of the multicast/broadcast service. The description information of the multicast/broadcast service may include description information of one or more multicast/broadcast service flows. The description information of the multicast/broadcast service flow includes at least one of the following: a quality of service index (QoS flow identifier, QFI) that the multicast/broadcast service flow should have, characteristic information of the multicast/broadcast service flow (such as a destination address, a destination port number, and a source address of the multicast/broadcast service flow), and QoS requirements (such as jitter, a delay, a packet loss rate, or a bandwidth) of the multicast/broadcast service flow. The QoS requirement of the multicast/broadcast service flow is for establishing a multicast/broadcast QoS flow. A PDU session tunnel corresponds to a UE, and service data in the PDU session tunnel may be transmitted in a form of a unicast QoS flow. In embodiments of this application, the PDU session tunnel may be further configured to transmit a unicast QoS flow to which a multicast/broadcast QoS flow corresponding to a multicast/broadcast service is mapped. It should be noted that the PDU session is at a UE level, and the multicast/broadcast session is at a service level. One PDU session of one UE may be associated with a plurality of multicast/broadcast services. In other words, the UE may join at least one multicast/broadcast service through the PDU session. A multicast/broadcast session may serve a multicast/broadcast service. The multicast/broadcast session includes a unicast or multicast tunnel from a data network to a core network device and then to a radio access network, and a unicast or multicast/broadcast air interface resource allocated by the radio access network for sending the multicast/broadcast service.

In addition to the description information of the multicast/broadcast service, the information about the multicast/broadcast service may further include information about a terminal, for example, may include an identifier of one or more terminals that are allowed (or request) to join the multicast/broadcast service, an identifier of one or more terminal groups, and the like.

Figure 4:
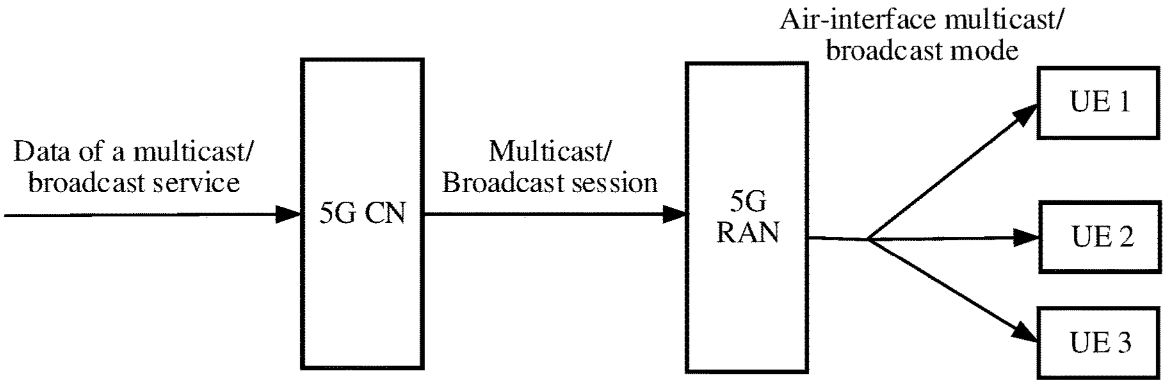
FIG. 4 is a flowchart of data transmission in multicast/broadcast mode.

The system architecture shown in FIG. 2 is used as an example to provide a data transmission procedure in multicast/broadcast mode. FIG. 4 is a flowchart of data transmission in multicast/broadcast mode. The transmission procedure shown in FIG. 4 may be for transmitting data of a multicast/broadcast service.

In FIG. 4, data of a multicast/broadcast service may be sent from a CP to a UE 1, a UE 2, and a UE 3. A multicast/broadcast service transmission path from the CP to an NG-RAN may include a transmission path between the CP and a 5G CN and a transmission path between the 5G CN and the NG-RAN. The transmission path from the 5G CN to the NG-RAN may be a multicast/broadcast session tunnel, that is, an N3 tunnel between an MB-UPF and the NG-RAN. The multicast/broadcast session tunnel is shared by the UE 1, the UE 2, and the UE 3. On an air interface, a RAN may send the data of the multicast/broadcast service to the UE 1, the UE 2, and the UE 3 in PTM mode, that is, only one piece of data needs to be sent, and all the three UEs can receive the data. In the example in FIG. 4, only one piece of data of the multicast/broadcast service is sent on the transmission path from the CP to the UEs, and the plurality of UEs may receive the data at the same time.

In multicast/broadcast mode, service data may be transmitted to all target nodes at a time, or service data may be transmitted to only a specific object. Therefore, in multicast mode, point-to-multipoint transmission may be implemented between one sending node and a plurality of receiving nodes, thereby resolving a problem of low efficiency of the unicast mode.

That an access network device supports a multicast/broadcast function may be understood as that the access network device supports transmitting data of a multicast/broadcast service in multicast/broadcast mode.

That an access network device does not support a multicast/broadcast function may be understood as that the access network device does not support transmitting data of a multicast/broadcast service in multicast/broadcast mode, or the access network device supports transmitting data of a multicast/broadcast service or data of a PDU session only in unicast mode. An access network device that does not support a multicast/broadcast function may implement a network service of a terminal device through a PDU session. The access network device that supports the multicast/broadcast function may receive data of a multicast/broadcast service from a core network through the multicast/broadcast session tunnel, and send the data of the multicast/broadcast service to a plurality of terminal devices that join the multicast/broadcast service. It should be understood that, after arriving at the RAN, the data of the multicast/broadcast service is processed by a service data adaptation protocol (SDAP) layer, a packet data convergence protocol (PDCP) layer, a radio link control (RLC) layer, a media access control (MAC) layer, and a physical (PHY) layer of the RAN, and then is sent to all the UEs that receive the data of the multicast/broadcast service.

A first transmission resource may be a QoS flow corresponding to a first multicast/broadcast service and/or a radio bearer to which the QoS flow is mapped/corresponds. The radio bearer may be, for example, a data radio bearer (DRB) or a multicast radio bearer (MRB). A first QoS flow is used to transmit the first multicast/broadcast service, and may be a unicast QoS flow to which the multicast/broadcast service is mapped or corresponds, or may be a multicast/broadcast QoS flow. The unicast QoS flow is a QoS flow used to transmit service data in a PDU session. Because the PDU session is at a UE level or at a UE granularity, the unicast QoS flow is at a UE granularity or at a UE level. A multicast/broadcast QoS flow is a QoS flow used to transmit data of a multicast/broadcast service in a multicast/broadcast session. Because the multicast/broadcast session is at a service level or at a service granularity, the multicast/broadcast QoS flow is at a service level or at a service granularity.

If a cell or an access network does not support a multicast/broadcast function, the multicast/broadcast service may be transmitted by using a unicast QoS flow and a DRB. When an access network device or a cell supports a multicast/broadcast function, the multicast/broadcast service is sent through a multicast/broadcast QoS flow and a radio bearer (for example, a multicast radio bearer, MRB) corresponding to the multicast/broadcast QoS flow.

It should be noted that multicast mentioned in this application may also be referred to as groupcast. In addition, multicast/broadcast may be replaced with multicast or broadcast. This is not limited.

The following describes technical solutions of this application with reference to accompanying drawings.

Figure 5:
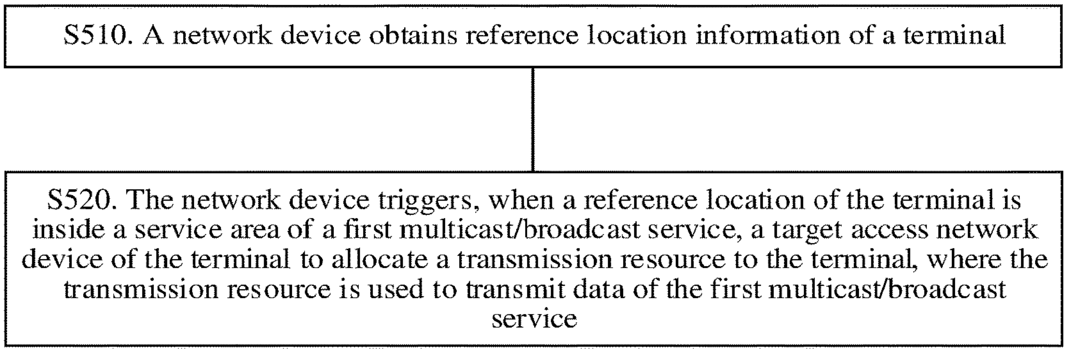
FIG. 5 is a flowchart of a communication method for a multicast/broadcast service according to an embodiment of this application.

FIG. 5 is a flowchart of a communication method 500 for a multicast/broadcast service according to an embodiment of this application. The method may be applied to a process in which a terminal is handed over from a source access network (source-gNB, S-gNB) device to a target access network (target-gNB, T-gNB) device, or may be applied to a process in which a terminal is handed over between co-site cells, that is, a process in which the terminal is handed over from one cell to another target cell in a same access network device. The method 500 includes at least the following steps.

S510. A network device obtains reference location information of a terminal.

The reference location information may represent a reference location of the terminal. The reference location may be location information of the terminal in an access network device that currently serves the terminal. The location information may include an identifier of a cell in which the terminal is currently located. Alternatively, the reference location may be location information of the terminal in a target access network device of the terminal. The location information includes at least one of the following: identifier of a cell, an identifier of an access network device, an identifier of a tracking area, or an identifier of a public land mobile network (PLMN). In addition, the location information may further include global positioning system (GPS) geographic location information, a sector identifier, a PCI, an antenna identifier, a DU identifier, or the like.

Optionally, when the reference location information includes the location information of the terminal in the access network device that currently serves the terminal, the location information may be one or more combinations of an identifier of a current serving cell, an identifier of an access network that currently serves the terminal, an identifier of a current tracking area, or the like.

Optionally, when the reference location information includes the location information of the terminal in the T-gNB of the terminal, the location information may be one or more of an identifier of a target cell, an identifier of the T-gNB, an identifier of a target tracking area, or the like.

Figure 6:
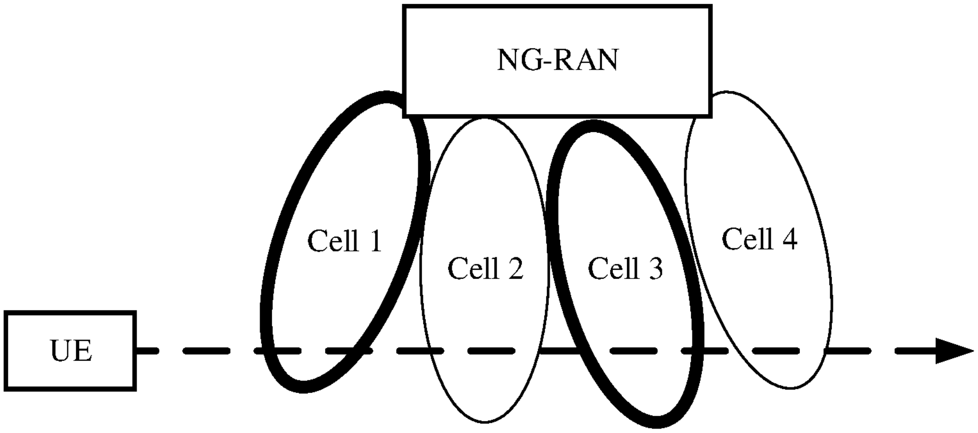
FIG. 6 shows a scenario of a multicast/broadcast service according to an embodiment of this application.

For example, when a co-site cell handover is performed on the terminal, the reference location information may be location information of an access network device that currently serves the terminal, for example, an identifier of a target cell in which the terminal is currently located. When a non-co-site handover is performed on the terminal, the reference location information may be location information of the terminal in the T-gNB of the terminal, for example, may be an identifier of a target cell of the terminal and/or an identifier of the T-gNB of the terminal. The co-site may be a scenario shown in FIG. 6. In FIG. 6, the access network device is an access network device that does not support a multicast/broadcast function, and a service area of a first multicast/broadcast service is a cell 1 and a cell 3 of the access network device. Scenarios that may be included in the non-co-site handover may be an N2 handover and an Xn handover.

S520. The network device triggers, when a reference location of the terminal is inside a service area of a first multicast/broadcast service, a target access network device of the terminal to allocate a transmission resource to the terminal.

S520 may be replaced with: When a reference location of the terminal is inside a service area of a first multicast/broadcast service, the network device triggers, based on the reference location of the terminal and the service area of the first multicast/broadcast service, an access network device of a cell in which the terminal is currently located to allocate a transmission resource to or establish a transmission resource for the terminal, or triggers a target access network device of the terminal to allocate a transmission resource to the terminal.

Further, the network device may trigger the target access network device of the terminal to allocate a transmission resource to the terminal based on a measurement report. For example, when the network device is a source base station, during an Xn handover the source base station triggers the target access network device of the terminal to allocate a transmission resource to the terminal after receiving the measurement report.

Further, the network device may trigger the target access network device of the terminal to allocate a transmission resource to the terminal based on a PDU session context update request. The PDU session context update request may be Nsmf_PDUSession_UpdateSMContext request. For example, when the network device is an SMF, during an N2 handover, the SMF triggers the target access network device of the terminal to allocate a transmission resource to the terminal after receiving Nsmf_PDUSession_UpdateSMContext request.

The transmission resource may be for transmitting data of the first multicast/broadcast service, and the data of the first multicast/broadcast service may be, for example, a radio bearer.

Optionally, the network device may be an SMF or an S-gNB of the terminal.

When the network device is an SMF, that the network device triggers an access network device of a cell in which the terminal is currently located to allocate a transmission resource to the terminal may be that the SMF triggers the access network device of the cell in which the terminal is currently located to establish a transmission resource for the terminal. When the network device is an SMF or an S-gNB, that the network device triggers the target access network device of the terminal to allocate a transmission resource to the terminal may be that the SMF or the S-gNB triggers the target access network device of the terminal to allocate a transmission resource to the terminal, which, in this case, may be applied to a process in which the terminal is handed over from the source access network device to the target access network.

It should be noted that the foregoing trigger process may be, for example, that the SMF sends indication information to the access network device of the cell in which the terminal is currently located to trigger the process, or that the SMF or the S-gNB sends indication information to the target access network device of the terminal to trigger the transmission resource allocation process. This is not limited in this application.

According to the communication method for a multicast/broadcast service provided in this application, when the network device dynamically determines that the reference location information of the terminal is inside the service area of the first multicast/broadcast service, a T-gNB of the terminal is triggered to allocate a resource to the terminal, thereby improving the utilization of network resources.

The following describes the method 500 in this embodiment of this application by using an example in which the network device is an SMF and an example in which the network device is an S-gNB. For example, FIG. 7 to FIG. 9 are described by using an example in which the network device is an SMF.

First, descriptions are provided by using an example in which the network device is an SMF.

Figure 7:
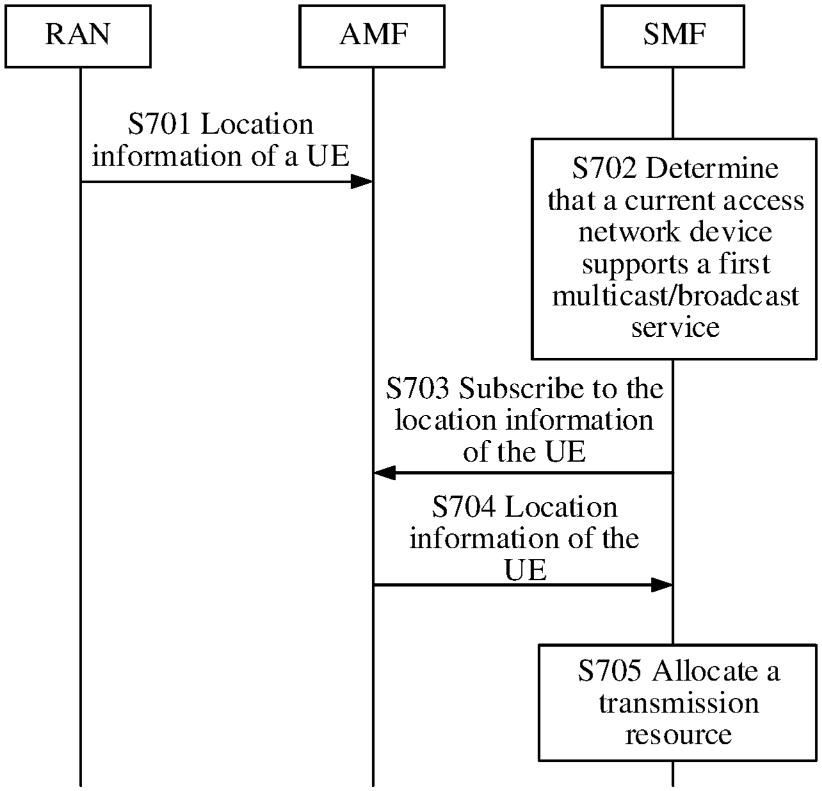
FIG. 7 is a flowchart of a communication method for a multicast/broadcast service according to an embodiment of this application.

When the network device is an SMF, FIG. 7 may show a flowchart of performing a co-site cell handover on a terminal.

S701. An access network device reports reference location information of a terminal to an AMF.

The reference location information may be location information in an access network device that currently serves the terminal. For example, when the terminal moves from a cell 2 to a cell 3, the access network device may report an identifier of the cell 3 to the AMF. In this case, the identifier of the cell 3 may be the foregoing location information.

S702. An SMF determines that the current access network device supports a first multicast/broadcast service.

The current access network device of the terminal may be understood as the access network device that currently serves the terminal.

That the SMF determines that the current access network device supports the first multicast/broadcast service may be, for example, that when UE requests to join a multicast/broadcast session by using a PDU session modification request, the AMF reports a multicast/broadcast capability of the access network device currently accessed by the UE, and the SMF determines, based on the multicast/broadcast capability of the access network device, that the current access network device supports the first multicast/broadcast service.

S703. The SMF subscribes to location information of the terminal from the AMF.

S703 is an optional step. The AMF may actively report the location information of the terminal to the SMF, or may report the location information of the terminal based on a request from the SMF. This is not limited.

S704. The AMF reports the location information of the terminal to the SMF.

The AMF may report the identifier of the cell 3 to the SMF.

S705: The SMF allocates a transmission resource to the terminal.

Based on the location information of the terminal, the SMF continues to perform a procedure in which the terminal joins the multicast/broadcast service, for example, allocate or add, to a PDU session associated with the multicast/broadcast service, information about a unicast QoS flow to which a multicast/broadcast QoS flow mapping is mapped.

It should be noted that a PDU session associated with a multicast/broadcast service may also be referred to as a unicast fall-back PDU session, or referred to as a PDU session for a 5GC shared delivery method to individual delivery method switch, or referred to as a PDU session corresponding to a 5GC individual multicast/broadcast service traffic delivery method (5GC individual MBS traffic delivery method), or referred to as a PDU session corresponding to a 5GC individual delivery method, or referred to as a PDU session corresponding to an individual delivery method.

It should be understood that the transmission resource may be for transmitting data of the first multicast/broadcast service. It should be noted that the resource allocation may also be understood as establishing a QoS flow used to transmit data of a multicast/broadcast service. This is not limited in this application.

According to the communication method for a multicast/broadcast service provided in this application, when the SMF dynamically determines that the reference location information of the terminal is inside the service area of the first multicast/broadcast service, an access network device that currently serves the terminal is triggered to allocate a resource to or establish a resource for the terminal, thereby improving the utilization of network resources.

Figure 8A:
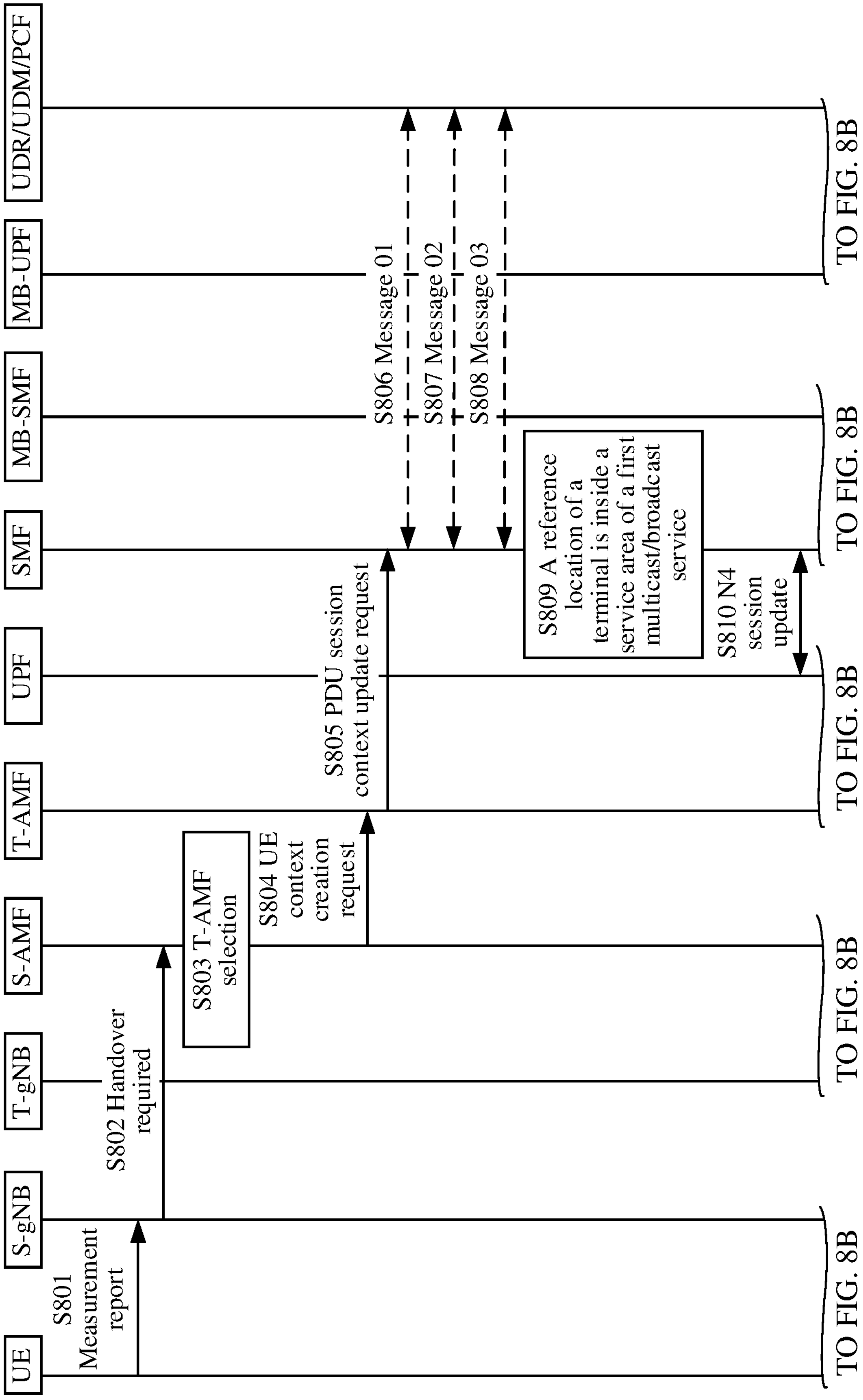
FIG. 8A and FIG. 8B are flowcharts of a communication method for a multicast/broadcast service according to an embodiment of this application.
Figure 8B:
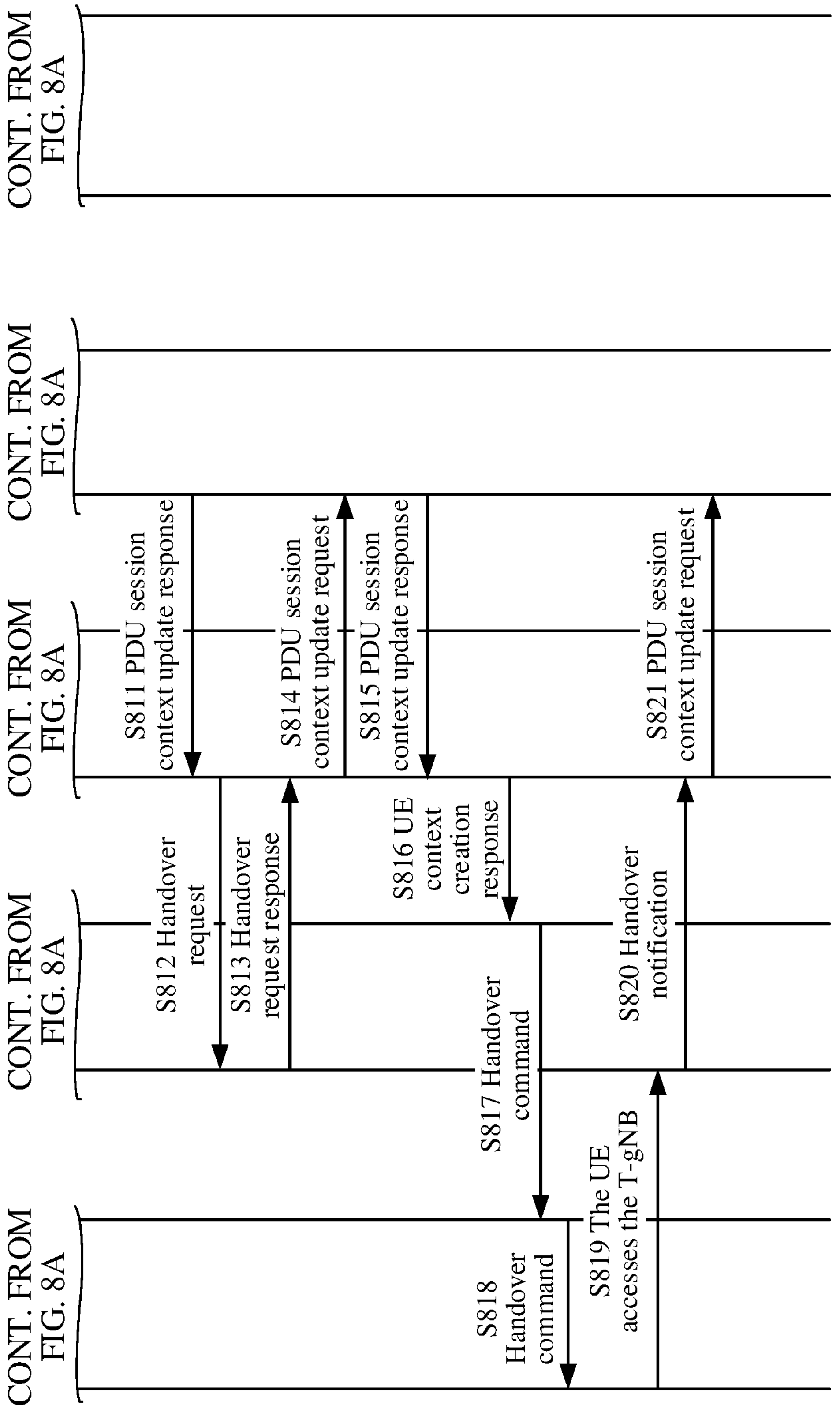
Figure 9:
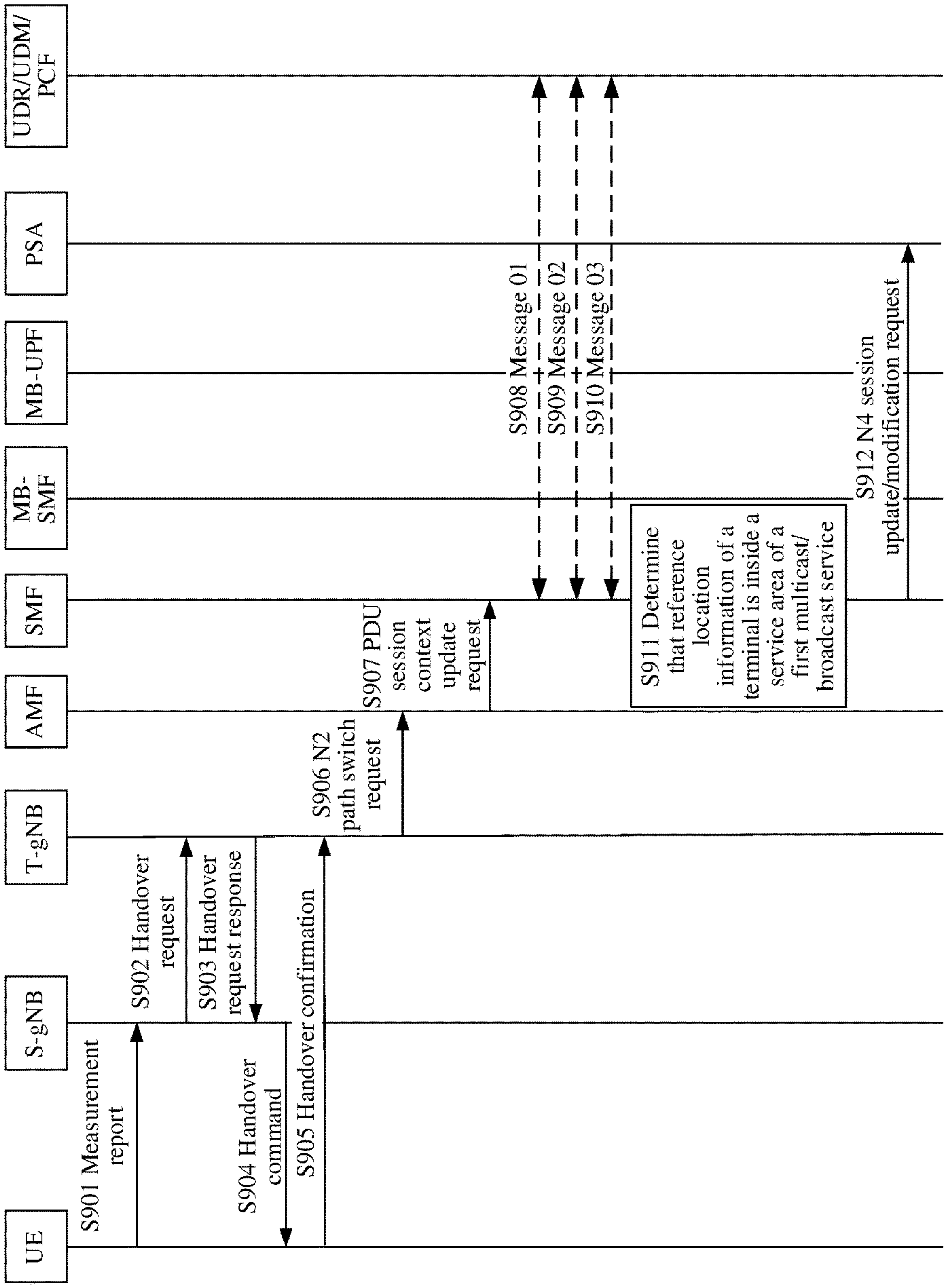
FIG. 9 is a flowchart of a communication method for a multicast/broadcast service according to an embodiment of this application.

As shown in FIG. 8A and FIG. 8B, this embodiment provides a flowchart of performing an N2 handover on a terminal between non-co-site cells. In the embodiment shown in FIG. 8A and FIG. 8B, an example in which a network device is an SMF is used for description.

S801. A UE sends a measurement report to an S-gNB.

Correspondingly, the S-gNB receives the measurement report, and determines, based on the measurement report, to hand over the UE to a T-gNB. Determining, based on the measurement report, to hand over the UE to the T-gNB belongs to the conventional art, and details are not described.

S802. The S-gNB sends a handover required to a source AMF (S-AMF). For example, the "handover required" includes PDU session information of the to-be-handed-over UE, and the PDU session information may include an identifier of a PDU session and QoS information corresponding to a unicast QoS flow included in the PDU session.

The QoS information of the unicast QoS flow includes a QFI and a QoS parameter.

Further, if the PDU session of the UE is associated with a multicast/broadcast service, which, for example, may be a first multicast/broadcast service, the PDU session information may further include information about a unicast QoS flow to which a multicast/broadcast QoS flow is mapped. For example, the PDU session is associated with a first multicast/broadcast service, the PDU session information may further include an identifier of a first unicast QoS flow, and there is a mapping relationship between the first unicast QoS flow and a multicast/broadcast QoS flow used to transmit data of the first multicast/broadcast service.

The "handover required" further includes a target identifier (Target ID), and Target ID may be identification information of a target cell to which the UE is to be handed over.

In addition, the "handover required" may further include N2 SM information. If the N2 SM information indicates that there is no direct forwarding tunnel between the S-gNB and the T-gNB, it indicates that an indirect forwarding tunnel can be established between the S-gNB and the T-gNB. In this case, the N2 SM information may include the indirect forwarding tunnel information allocated by the S-gNB.

The "handover required" may further include an identifier of a QoS flow that the S-gNB expects to forward through the forwarding tunnel. For example, if the multicast/broadcast QoS flow needs to be forwarded through the forwarding tunnel, the handover request includes a QFI of a unicast QoS flow corresponding to the multicast/broadcast QoS flow.

S803. The S-AMF selects a target AMF (target-AMF, T-AMF) based on Target ID.

The T-AMF is connected to the T-gNB.

S804. The S-AMF sends a UE context creation request to the T-AMF.

The UE context creation request may be Namf_Communication_CreateUEContext Request. The request may include context information that is of the UE that is handed over and that is stored in the S-AMF, and may further include information sent by the S-gNB to the S-AMF in step 802.

S805. The T-AMF sends a PDU session context update request to the SMF.

The PDU session context update request may be Nsmf_PDU Session_UpdateSMContext Request. The request message may include identification information of the PDU session (for example, an ID of the PDU session), identification information of the T-AMF (for example, an ID of the T-AMF), Target ID, N2 SM information, and the like.

S806 to S808 respectively correspond to the SMF sends a message 01, a message 02, and a message 03 to a UDR/UDM/PCF.

The message 01 may be for the SMF to query the UDR/UDM/PCF for context information of a first multicast/broadcast service. The message 02 may be for the SMF to query the UDR/UDM/PCF for context information of a first multicast/broadcast corresponding to location information corresponding to Target ID. The message 03 may be used by the SMF to query the UDR/UDM/PCF for context information of a first multicast/broadcast corresponding to location information corresponding to the target access network device.

It should be noted that the context information may include identification information of a multicast/broadcast service, for example, may be any one of the following, or may be a combination of one or more of the following, but not limited to: an identifier of the multicast/broadcast service, a name of the multicast/broadcast service, a multicast/broadcast address of the multicast/broadcast service, a multicast/broadcast IP address of the multicast/broadcast service, or a temporary mobile group identity (TMGI) corresponding to the multicast/broadcast service, a session address of the multicast/broadcast service. The context information may further include service area information corresponding to a multicast/broadcast service, for example, may be one or more of the following information, or may be any combination of one or more of the following information, including: geographic area information, public land mobile network information, tracking area information, identification information of a cell, identification information of a base station, identification information of a central unit of the base station, identification information of a distributed unit (DU) of the base station, or a civil address list. The context information further includes an area session identifier of a service area corresponding to the multicast/broadcast service and the like.

S809. The SMF determines that a reference location of the terminal is inside a service area of a first multicast/broadcast service.

If the SMF stores the context information of the first multicast/broadcast service for the terminal on the S-gNB, the SMF determines that the identifier of the target cell of the terminal and/or the identifier of the T-gNB of the terminal is included in the service area in the context information of the first multicast/broadcast service.

S811. The SMF sends a PDU session context update response to the T-AMF.

The PDU session context update response may be Nsmf_PDU Session_UpdateSMContext Response.

When the SMF determines that the reference location of the terminal is inside the service area of the first multicast/broadcast service, the SMF sends the PDU session context update response to the T-AMF.

The SMF may notify, using the PDU session context update response, the T-AMF to allocate a transmission resource to or establish a transmission resource for the terminal.

The PDU session context update response message may include QoS information of a unicast QoS flow of the PDU session, and the unicast QoS flow may include a unicast QoS flow to which the first multicast/broadcast QoS flow is mapped.

The QoS information may include a QFI and a corresponding QoS parameter.

Optionally, if the SMF does not store the context information of the first multicast/broadcast service for the terminal on the S-gNB, the SMF may send the message 01 to the UDR/UDM/PCF to obtain the context information of the first multicast/broadcast service.

S812. The T-AMF sends a handover request to the T-gNB.

The message includes the QoS information of the unicast QoS flow included in the PDU session. In this case, the T-gNB allocates a radio resource to the unicast QoS flow based on the QoS information of the QoS flow.

It should be understood that, for brevity, other steps in FIG. 8A and FIG. 8B are not described in detail. The steps should be understood as the conventional art in the N2 handover, and details are not described again.

According to the communication method for a multicast/broadcast service provided in this application, when the SMF dynamically determines that the reference location information of the terminal is inside the service area of the first multicast/broadcast service, a T-gNB of the terminal is triggered to allocate a resource to or establish a resource for the terminal, thereby improving the utilization of network resources.

Figure 22A:
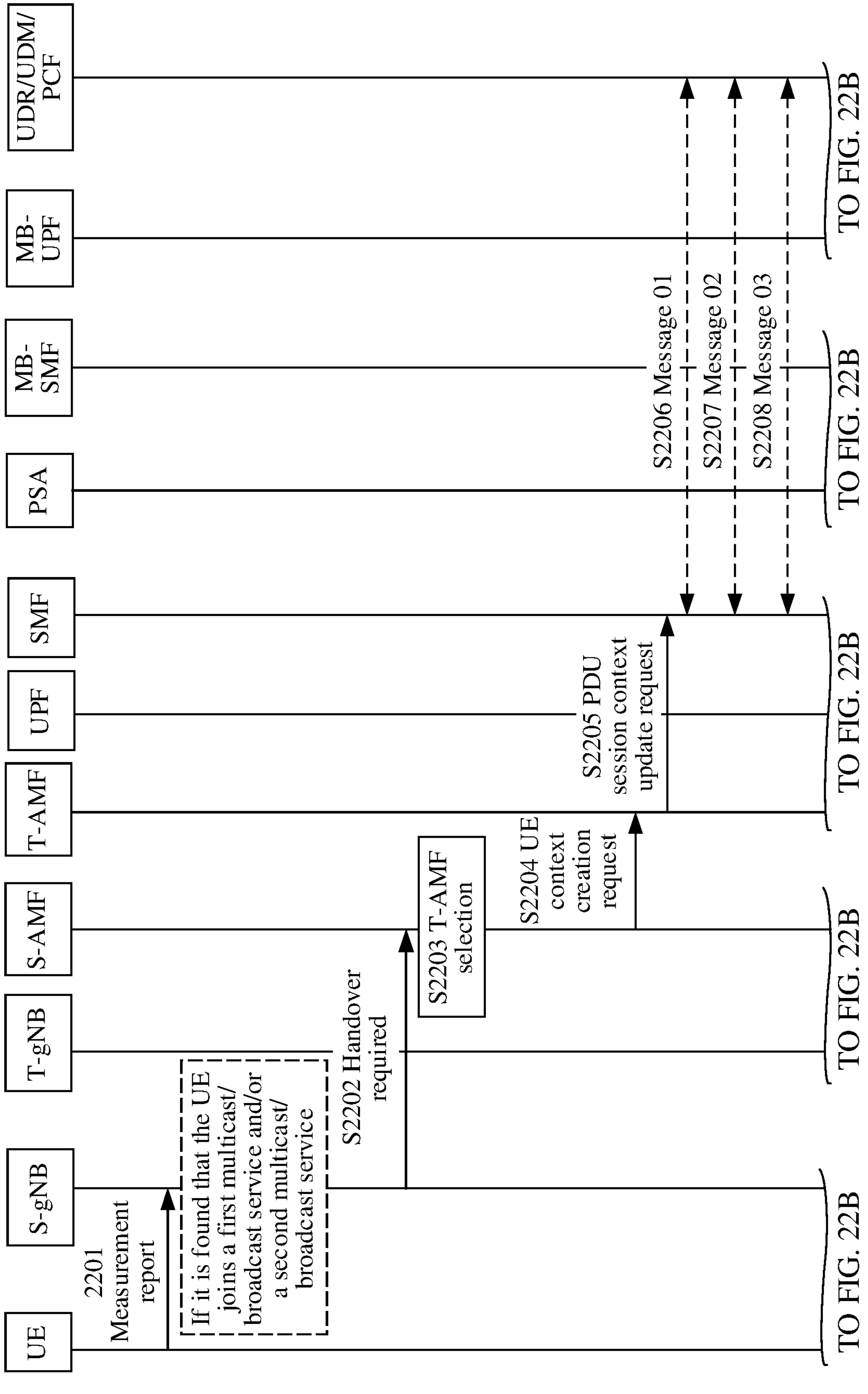
FIG. 22A and FIG. 22B are flowcharts of a communication method for a multicast/broadcast service according to an embodiment of this application.
Figure 22B:
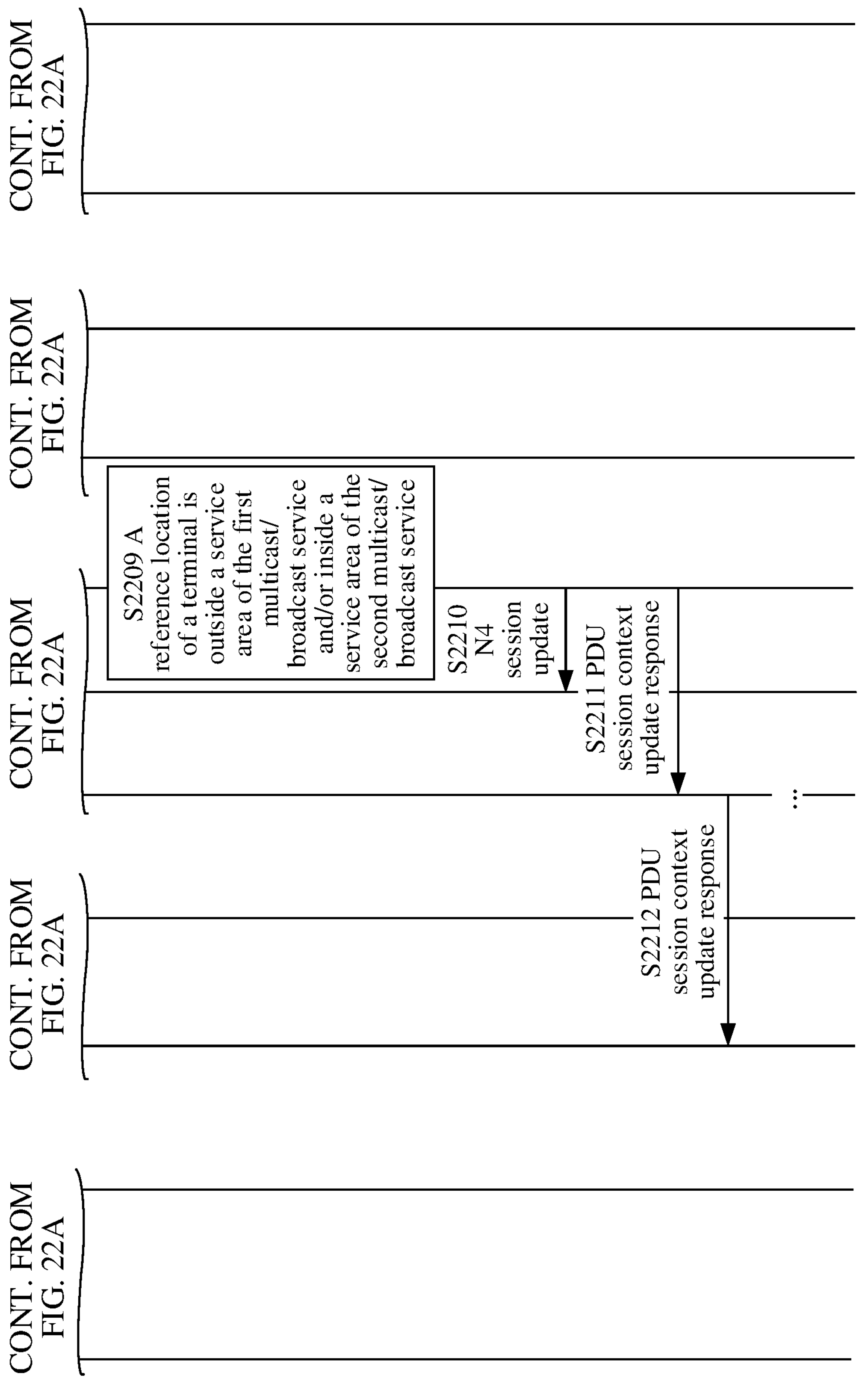

As shown in FIG. 22A and FIG. 22B, this embodiment provides a flowchart of performing an N2 handover on a terminal between non-co-site cells. In the embodiment shown in FIG. 22A and FIG. 22B, an example in which a network device is an SMF is used for description.

S2201. A UE sends a measurement report to a source base station (S-gNB).

Correspondingly, the S-gNB receives the measurement report. The measurement report may include signal measurement values of a maximum of eight neighboring cells measured by the UE. The S-gNB determines, based on the measurement report, to hand over the UE to a T-gNB. For example, the source base station selects a base station to which a neighboring cell with a strongest signal belongs as the T-gNB to which the UE is to be handed over, that is, the T-gNB selected by the S-gNB for the UE. For an implementation of determining, based on the measurement report, to hand over the UE to the T-gNB, refer to descriptions in the existing related technology. Details are not described again.

S2202. The S-gNB sends a handover required to an S-AMF. S2202 differs from S802 in that in S2202, N2 session management information (N2 SM Information) in the handover required includes identification information (target cell ID) of a target cell. For example, the N2 session management information may be a handover required transfer. Alternatively, the identification information of the target cell is an information element parallel to the N2 session management information.

After the S-gNB obtains an identifier of the target cell, the S-gNB finds/determines that the terminal device joins a first multicast/broadcast service, and the S-gNB sends the handover required to the S-AMF.

In addition, it should be noted that the S-gNB may obtain an identifier of the target cell. For example, the S-gNB itself stores identification information of a cell in another base station, for example, an identifier of a cell included in a neighboring base station. Alternatively, the S-gNB obtains identification information of a cell in another base station, for example, an identifier of a cell included in a neighboring base station, based on operation, administration, and maintenance (OAM). Alternatively, the S-gNB obtains identification information of a cell in another base station, and the like based on the measurement report sent by the UE.

In an implementation, if the S-gNB finds that the UE joins a multicast/broadcast service, which, for example, may be a first multicast/broadcast service, a handover required sent by the S-gNB to the S-AMF carries identification information (target cell ID) of a target cell. The identification information of the target cell is included in N2 session management information (N2 SM Information). The N2 session management information may be a handover required transfer. The N2 session management information is an information element parallel to a handover type, a source-to-target transparent container, a target identifier (Target ID), and the like. Alternatively, the identification information of the target cell is an information element parallel to the N2 session management information. The information element parallel to the N2 session management information may be, for example, the identification information of the target cell that serves as an information element that is added, in addition to information elements included in a handover required (handover required) in the conventional art: a handover type, a target identifier (Target ID), a cause value (Cause), a source-to-target transparent container (Source to Target Transparent Container), a PDU session resource list, a message type, an AMF UE NGAP ID, or a RAN UE NGAP ID, and that is parallel to the information elements included in the handover required in the conventional technology. For another example, the identification information of the target cell serves as an information element in addition to information elements included in a handover required in the conventional art: a handover type, a target identifier (Target ID), a cause value (Cause), a source-to-target transparent container (Source to Target Transparent Container), a PDU session resource list, a message type, an AMF UE NGAP ID, or a RAN UE NGAP ID, is not carried in any of the information elements that need to be included in the handover required in the conventional art, and instead, is carried in the handover required as an independent information element.

In an implementation, that the S-gNB finds whether the UE joins the multicast/broadcast service may include the following manners:

In a first manner, the S-gNB may determine, based on whether a context of the UE includes an identifier (for example, MBS Session ID or TMGI) of the first multicast/broadcast service, or based on whether a context of the UE includes an identifier (for example, MBS Session ID or TMGI) and an area session identifier (for example, Area Session ID or Flow ID) of the first multicast/broadcast service, whether the UE joins the first multicast/broadcast service.

For a non-local multicast/broadcast service, that is, if the first multicast/broadcast service is a non-local multicast/broadcast service, when the context of the UE includes the identifier (for example, MBS Session ID or TMGI) of the first multicast/broadcast service, it indicates that the UE joins the first multicast/broadcast service. Conversely, when the context of the UE does not include the identifier (for example, MBS Session ID or TMGI) of the first multicast/broadcast service, it indicates that the UE does not join the first multicast/broadcast service.

For a local multicast/broadcast service, that is, if the first multicast/broadcast service is a local multicast/broadcast service, when the context of the UE includes the identifier (for example, MBS Session ID or TMGI) and the area session identifier (for example, Area Session ID or Flow ID) of the first multicast/broadcast service, it indicates that the UE joins the first multicast/broadcast service. Conversely, when the context of the UE does not include the identifier (for example, MBS Session ID or TMGI) and the area session identifier (for example, Area Session ID or Flow ID) of the first multicast/broadcast service, it indicates that the UE does not join the first multicast/broadcast service.

In a second manner, the S-gNB may determine, based on whether a context (MBS session context) corresponding to the first multicast/broadcast service includes identification information (for example, a new generation application protocol UE ID (NGAP UE ID), a subscription permanent identifier (SUPI), a general public subscription identifier (GPSI), or a subscription concealed identifier (SUCI)) of the UE, whether the UE joins the first multicast/broadcast service. When the context corresponding to the first multicast/broadcast service includes the identification information of the UE, it indicates that the UE joins the first multicast/broadcast service. Conversely, when the context corresponding to the first multicast/broadcast service does not include the identification information of the UE, it indicates that the UE does not join the first multicast/broadcast service.

In a third manner, the S-gNB may determine, based on whether a context of the UE includes an identifier (for example, MBS Session ID or TMGI) of the first multicast/broadcast service, whether the UE joins the first multicast/broadcast service, or the S-gNB may determine, based on whether a context of the UE includes an identifier (for example, MBS Session ID or TMGI) and an area session identifier (for example, Area Session ID or Flow ID) of the first multicast/broadcast service, whether the UE joins the first multicast/broadcast service. In addition, the S-gNB may determine, based on whether a context (MBS session context) corresponding to the first multicast/broadcast service includes identification information (for example, an NGAP UE ID, a SUPI, a GPSI, or a SUCI) of the UE, whether the UE joins the first multicast/broadcast service.

For a non-local multicast/broadcast service, that is, if the first multicast/broadcast service is a non-local multicast/broadcast service, when the context of the UE includes the identifier (for example, the MBS Session ID or the TMGI) of the first multicast/broadcast service, and in addition, the context corresponding to the first multicast/broadcast service includes the identification information of the UE, it indicates that the UE joins the first multi cast/broadcast service. Conversely, when the context of the UE does not include the identifier (for example, MBS Session ID or TMGI) of the first multicast/broadcast service, and in addition, the context corresponding to the first multicast/broadcast service does not include the identification information of the UE, it indicates that the UE does not join the first multicast/broadcast service.

For a local multicast/broadcast service, that is, if the first multicast/broadcast service is a local multicast/broadcast service, when the context of the UE includes the identifier (for example, MBS Session ID or TMGI) and the area session identifier (for example, Area Session ID or Flow ID) of the first multicast/broadcast service, and in addition, the context corresponding to the first multicast/broadcast service includes the identification information of the UE, it indicates that the UE joins the first multicast/broadcast service. Conversely, when the context of the UE does not include the identifier (for example, MBS Session ID or TMGI) and the area session identifier (for example, Area Session ID or Flow ID) of the first multicast/broadcast service, and in addition, the context corresponding to the first multicast/broadcast service does not include the identification information of the UE, it indicates that the UE does not join the first multicast/broadcast service.

In addition, the S-gNB may further determine, in another manner, whether the UE joins the first multicast/broadcast service. This is not limited in this application.

It should be noted that when the S-gNB determines whether the UE joins a plurality of multicast/broadcast services, for example, the S-gNB determines whether the UE joins a first multicast/broadcast service and a second multicast/broadcast service, the foregoing three or other manners may be used for determining whether the UE joins both the first multicast/broadcast service and the second multicast/broadcast service. Such a determining method is similar to that of determining whether the UE joins the first multicast/broadcast service, and details are not described herein again.

S2203 is the same as S802, and details are not described herein again.

S2204. The S-AMF sends a UE context creation request to the T-AMF. Different from S804, the N2 session management information (N2 SM Information) in the UE context creation request sent by the S-AMF to the T-AMF further includes an identifier (target cell ID) of a target cell, and the N2 session management information may be a handover required transfer. Alternatively, identification information of the target cell is an information element parallel to the N2 session management information. The information elements parallel to the N2 session management information are described above, and details are not described herein again.

S2205. The T-AMF sends a PDU session context update request to the SMF. Different from S805, the N2 session management information (N2 SM Information) in the PDU session context update request sent by the T-AMF to the SMF further includes an identifier (target cell ID) of a target cell. The N2 session management information may be a handover required transfer. Alternatively, identification information of the target cell is an information element parallel to the N2 session management information. The information elements parallel to the N2 session management information are described above, and details are not described herein again.

Based on the identification information (target cell ID) of the target cell, if the SMF finds that the target cell (target cell ID) is outside a service area of the first multicast/broadcast service, the SMF may release a first transmission resource of the terminal. The first transmission resource is used to transmit data of the first multicast/broadcast service, and includes a resource used by the terminal to transmit the data of the first multicast/broadcast service through the T-gNB of the terminal. Alternatively, if the SMF finds that the target cell (target cell ID) is outside a service area of the first multicast/broadcast service, the SMF does not send QoS information corresponding to the first multicast/broadcast service to the target access network device. In other words, the N2 session management information (N2 SM Information) sent by the SMF to the T-gNB does not include the QoS information corresponding to the first multicast/broadcast service.

It should be noted that the release may also be understood as triggering release, triggering deletion or deletion, initiating deletion or termination, or the like.

Based on the identification information (target cell ID) of the target cell, if the SMF finds that the target cell (target cell ID) of the UE is inside a service area of the second multicast/broadcast service, the SMF may initiate establishment/configuration of a second transmission resource of the terminal. The second transmission resource is used to transmit data of the second multicast/broadcast service, and includes a resource used by the terminal to transmit the data of the second multicast/broadcast service through the T-gNB. Descriptions of the second transmission resource may be the same as those of the first transmission resource, and details are not described herein again. Alternatively, if the SMF finds that the target cell (target cell ID) is inside a service area of the second multicast/broadcast service, the SMF sends QoS information corresponding to the second multicast/broadcast service to the target access network device of the terminal. In other words, the N2 session management information (N2 SM Information) sent by the SMF to the target access network device of the terminal includes the QoS information corresponding to the second multicast/broadcast service.

It should be noted that the release may also be understood as triggering release, triggering deletion or deletion, initiating deletion or termination, or the like.

Subsequent S2206 to S2212 are the same as S806 to S812. Details are not described herein again.

Figure 23A:
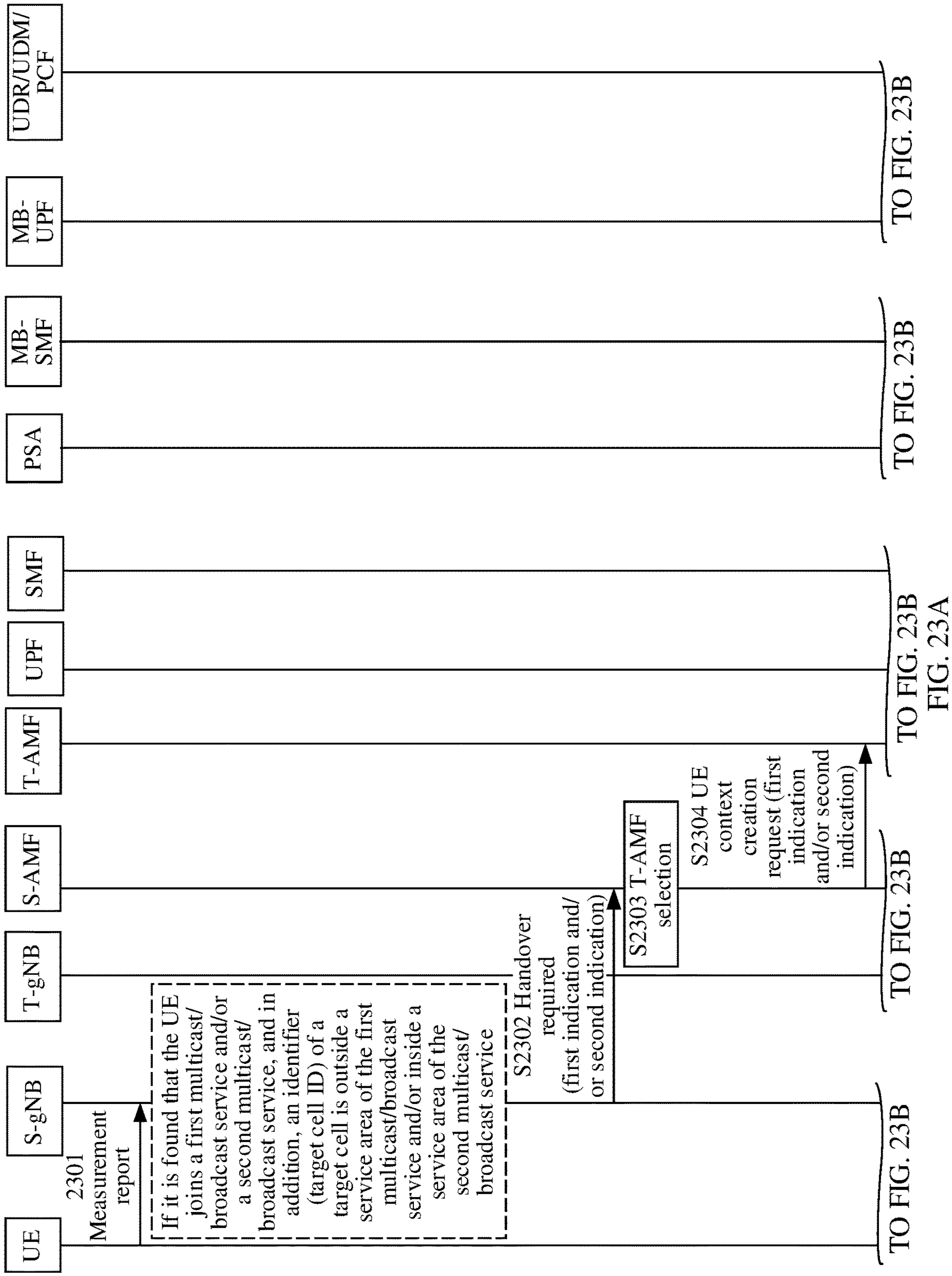
FIG. 23A and FIG. 23B are flowcharts of a communication method for a multicast/broadcast service according to an embodiment of this application.
Figure 23B:
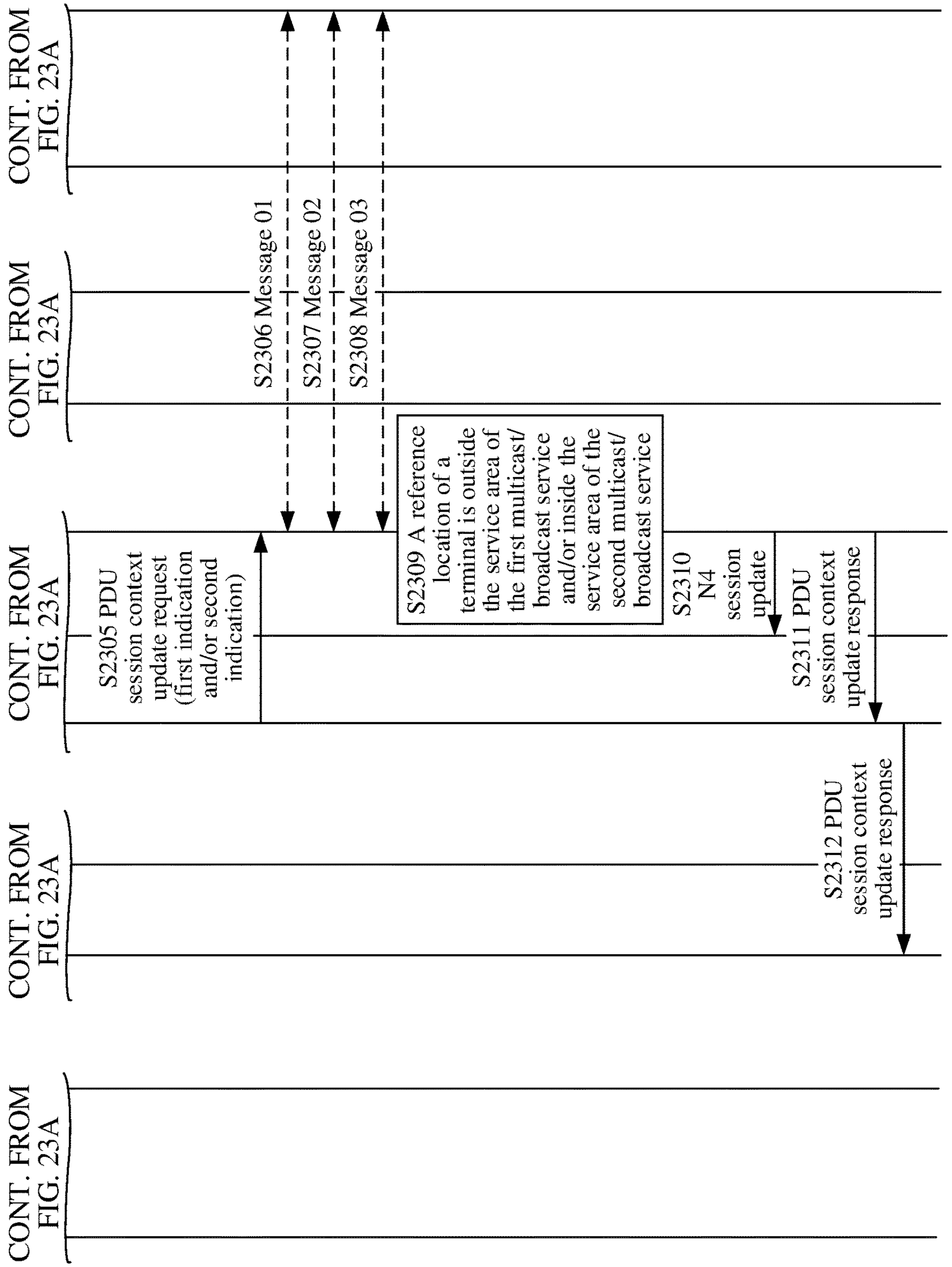

As shown in FIG. 23A and FIG. 23B, this embodiment provides a flowchart of performing an N2 handover on a terminal between non-co-site cells. In the embodiment shown in FIG. 23A and FIG. 23B, an example in which a network device is an SMF is used for description.

S2301. A UE sends a measurement report to a source base station (S-gNB).

Correspondingly, the S-gNB receives the measurement report. The measurement report may include signal measurement values of a maximum of eight neighboring cells measured by the UE. The S-gNB determines, based on the measurement report, to hand over the UE to a T-gNB. For example, the S-gNB selects a base station to which a neighboring cell with a strongest signal belongs as the T-gNB to which the UE is to be handed over, that is, the T-gNB selected by the S-gNB for the UE. For determining, based on the measurement report, to hand over the UE to the T-gNB, refer to descriptions in the existing related technology. Details are not described again.

If the S-gNB finds that UE joins a multicast/broadcast service, which, for example, may be a first multicast/broadcast service and/or a second multicast/broadcast service, and in addition, the S-gNB further finds that an identifier (target cell ID) of a target cell is outside a service area of the first multicast/broadcast service and/or inside a service area of the second multicast/broadcast service, the S-gNB includes indication information in the N2 session management information (N2 SM Information) in the handover required sent to the S-AMF in S2302. The indication information includes first indication information and/or second indication information. The first indication information may notify the SMF that the target cell (target cell ID) is outside the service area of the first multicast/broadcast service, and the second indication information may notify the SMF that the target cell (target cell ID) is inside the service area of the second multicast/broadcast service. The N2 session management information may be a handover required transfer.

In addition, the handover required further includes an identifier of the first multicast/broadcast service and/or identification information of the second multicast/broadcast service.

S2302. The S-gNB sends a handover required to an S-AMF. S2302 differs from S802 in that in S2302, N2 session management information (N2 SM Information) in the handover required further includes indication information, that is, first indication information and/or second indication information. The N2 session management information may be a handover required transfer. Alternatively, the indication information is an information element parallel to the N2 session management information. The information elements parallel to the N2 session management information are described above, and details are not described herein again.

In other words, it should be noted that, when the SMF needs to be indicated that the target cell (target cell ID) is outside the service area of the first multicast/broadcast service, the S-gNB adds first indication information to the N2 session management information (N2 SM Information) in the handover required sent to the S-AMF in S2302. When the SMF needs to be indicated that the target cell (target cell ID) is inside the service area of the second multicast/broadcast service, the S-gNB adds second indication information to the N2 session management information (N2 SM Information) in the handover required to the S-AMF in S2302. When the SMF needs to be indicated that the target cell (target cell ID) is outside the service area of the first multicast/broadcast service, and the SMF needs to be indicated that the target cell (target cell ID) is inside the service area of the second multicast/broadcast service, the S-gNB includes first indication information and/or second indication information in the N2 session management information (N2 SM Information) in the handover required sent to the S-AMF in S2302. The indication may also be understood as functioning as a notification or a notice. The N2 session management information may be a handover required transfer. Alternatively, the first indication information and/or the second indication information is an information element parallel to the N2 session management information. The information elements parallel to the N2 session management information are described above, and details are not described herein again.

The first indication information may correspond to an identifier of the first multicast/broadcast service, and the second indication information may correspond to an identifier of the second multicast/broadcast service.

S2303 is the same as S802, and details are not described herein again.

S2304 differs from S804 in that, N2 session management information (N2 SM Information) in a UE context creation request sent by the S-AMF to the T-AMF further includes indication information, and the indication information includes first indication information and/or second indication information. The N2 session management information may be a handover required transfer. Alternatively, the first indication information and/or the second indication information is an information element parallel to the N2 session management information. The information elements parallel to the N2 session management information are described above, and details are not described herein again.

S2305 differs from S805 in that N2 session management information (N2 SM Information) in a PDU session context update request sent by the T-AMF to the SMF further includes indication information, that is, first indication information and/or second indication information. The N2 session management information may be a handover required transfer. Alternatively, the first indication information and/or the second indication information is an information element parallel to the N2 session management information. The information elements parallel to the N2 session management information are described above, and details are not described herein again.

Based on the first indication information and/or the second indication information, if the SMF finds that the target cell (target cell ID) is outside a service area of the first multicast/broadcast service, the SMF may release a first transmission resource of the terminal. The first transmission resource is used to transmit data of the first multicast/broadcast service, and includes a resource used by the terminal to transmit the data of the first multicast/broadcast service through the T-gNB of the terminal. Alternatively, if the SMF finds that the target cell (target cell ID) is outside a service area of the first multicast/broadcast service, the SMF does not send QoS information corresponding to the first multicast/broadcast service to the target access network device of the terminal. In other words, the N2 session management information (N2 SM Information) sent by the SMF to the T-gNB does not include the QoS information corresponding to the first multicast/broadcast service.

Based on the first indication information and/or the second indication information, if the SMF finds that the target cell (target cell ID) is inside a service area of the second multicast/broadcast service, the SMF may initiate establishment/configuration of a second transmission resource of the terminal. The second transmission resource is used to transmit data of the second multicast/broadcast service, and includes a resource used by the terminal to transmit the data of the second multicast/broadcast service through the T-gNB of the terminal. Descriptions of the second transmission resource may be the same as those of the first transmission resource, and details are not described herein again. Alternatively, if the SMF finds that the target cell (target cell ID) is inside a service area of the second multicast/broadcast service, the SMF sends QoS information corresponding to the second multicast/broadcast service to the target access network device of the terminal. In other words, the N2 session management information (N2 SM Information) sent by the SMF to the T-gNB includes the QoS information corresponding to the second multicast/broadcast service.

Subsequent S2306 to S2312 are the same as S806 to S812. Details are not described herein again.

As shown in FIG. 9, this embodiment provides a flowchart of performing an Xn handover on a terminal between non-co-site cells. In the embodiment shown in FIG. 9, an example in which a network device is an SMF is used for description.

S901 to S905 are a handover of a terminal from an S-gNB to a T-gNB in an Xn handover procedure in the conventional art. For brevity, details are not described herein in this application.

S906. The T-gNB sends an N2 path switch request to the AMF.

For example, the request includes QFIs of unicast QoS flows that are successfully switched and fail to be switched in the PDU session of the UE, and/or QFIs of multicast/broadcast QoS flows that are successfully switched and fail to be switched in the PDU session. For example, these QFIs may be encapsulated in an N2 SM message. In addition, the N2 path switch request may further include an endpoint identifier that is of a PDU session tunnel and that is allocated by the T-gNB to the UE. Alternatively, the N2 path switch request further includes location information (UE Location Information) of the UE and the like. The location information of the UE may be location information in a target access network device of the terminal, and may include identification information of a target cell and the like.

S907. The AMF sends a PDU session context update request to the SMF.

The PDU session context update request may be Nsmf_PDU Session_UpdateSMContext Request.

It can be learned from FIG. 9 that when the AMF sends the PDU session context update request to the SMF, the handover of the UE from the S-gNB to the T-gNB, that is, step 901 to step 905, has been completed. Therefore, the PDU session context update request carries location information of the UE in the current T-gNB.

S911. The SMF determines that a reference location of the terminal is inside a service area of a first multicast/broadcast service. The SMF determines, based on the location information of the UE and multicast/broadcast context information corresponding to a first multicast/broadcast service that the UE joins on the S-gNB, that the location information of the UE is included in the multicast/broadcast context information. For example, the SMF may determine that identification information of a target cell is included in area identification information in the multicast/broadcast context information.

S912. The SMF sends an N4 session update/modification request to a PSA (UPF).

When the SMF determines that the location information of the UE is included in the multicast/broadcast context information, the SMF notifies, using the N4 session update/modification request, the UPF to establish a first transmission resource.

It should be understood that, for brevity, other steps in FIG. 9 are not described in detail. The steps should be understood as the conventional art in the Xn handover, and details are not described again.

According to the communication method for a multicast/broadcast service provided in this application, when the SMF dynamically determines that the reference location information of the terminal is inside the service area of the first multicast/broadcast service, the PSA (UPF) is triggered to allocate a resource to or establish a resource for the terminal, thereby improving the utilization of network resources.

Next, descriptions are provided by using an example in which a network device is an S-gNB.

Figure 10A:
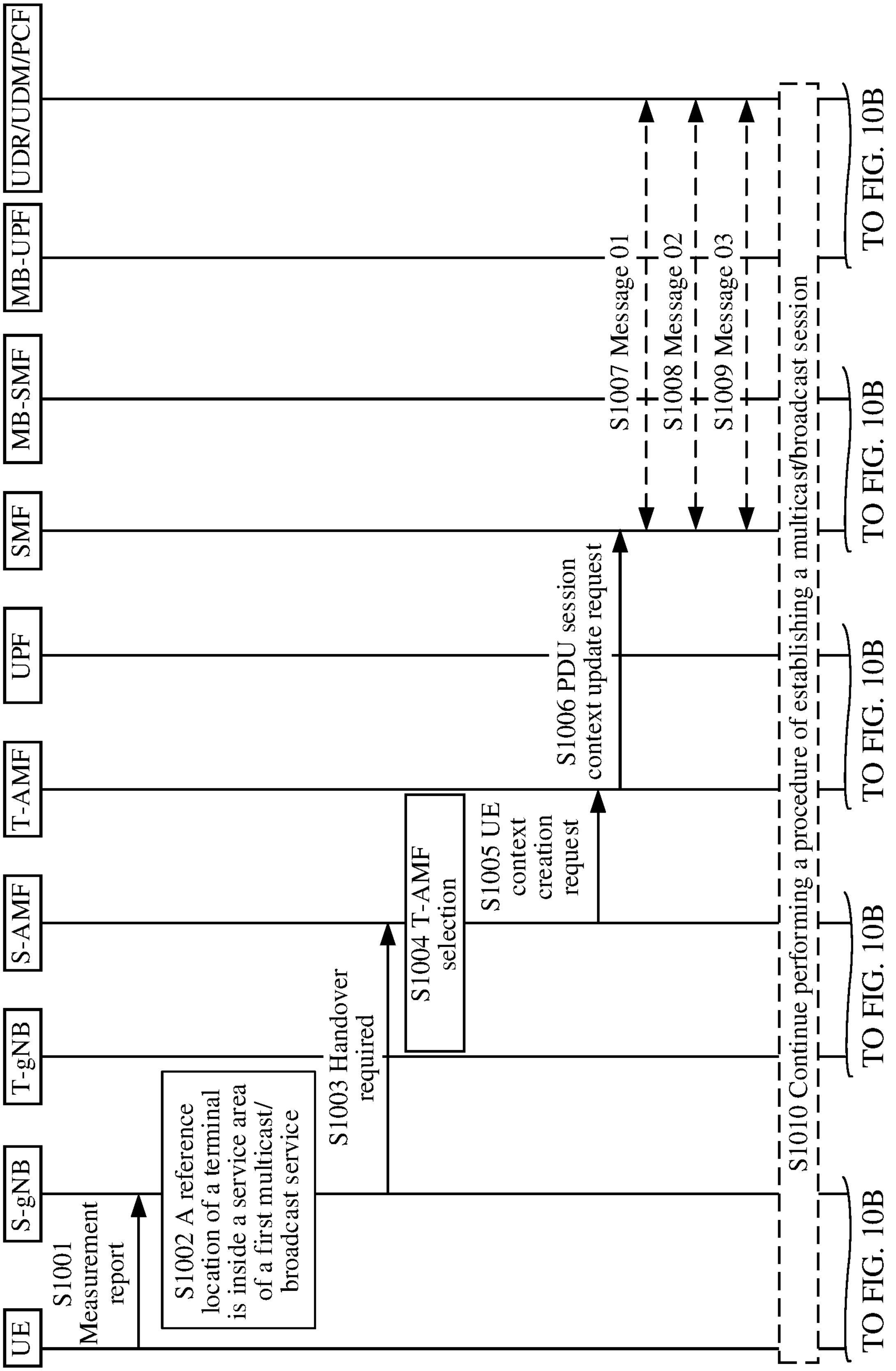
FIG. 10A and FIG. 10B are flowcharts of a communication method for a multicast/broadcast service according to an embodiment of this application.
Figure 10B:
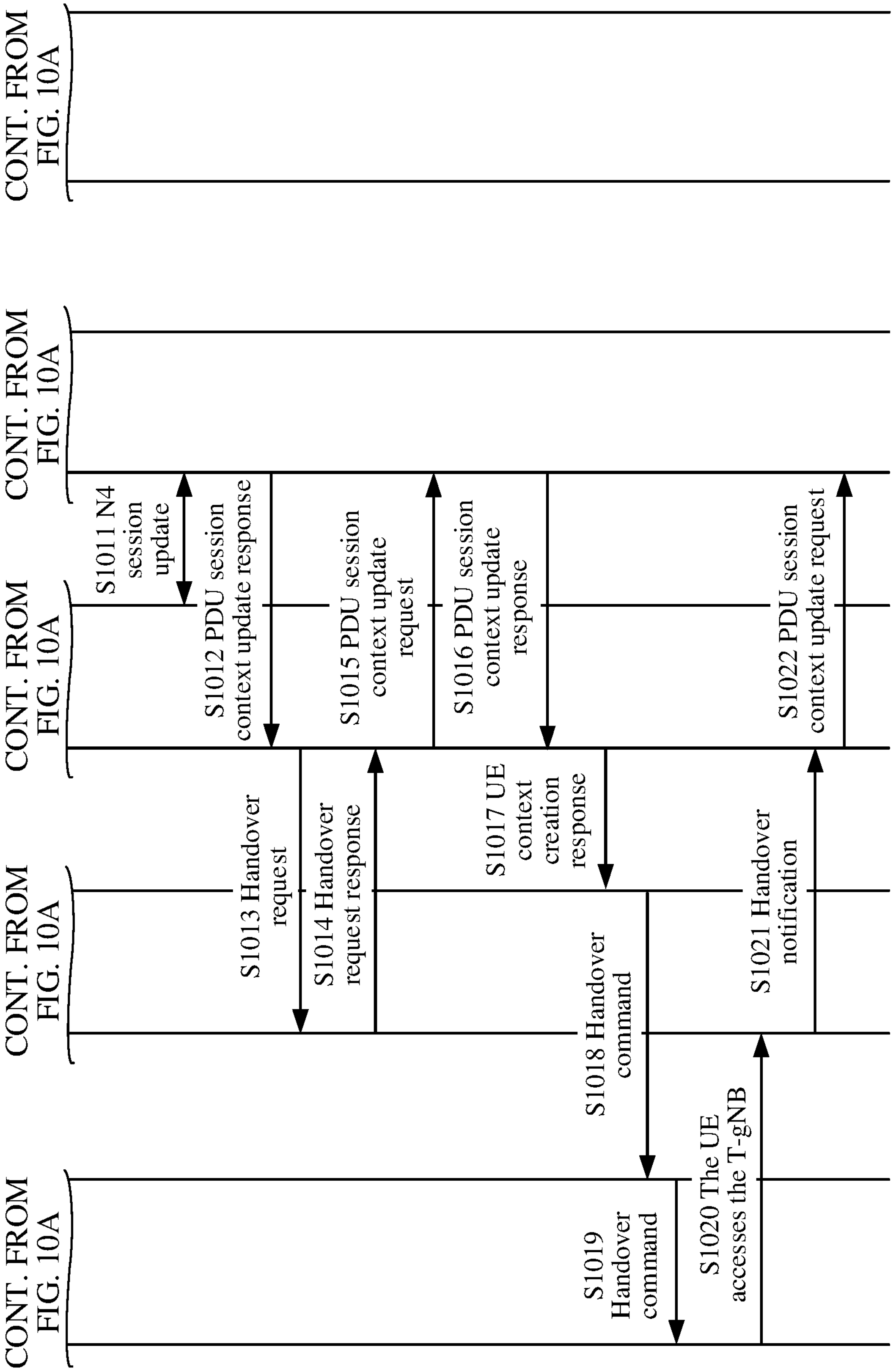

As shown in FIG. 10A and FIG. 10B, this embodiment provides a flowchart of performing an N2 handover on a terminal between non-co-site cells. In the embodiment shown in FIG. 10A and FIG. 10B, an example in which a network device is an S-gNB is used for description.

S1001. A UE sends a measurement report to an S-gNB.

S1002. The S-gNB determines that a reference location of the terminal is inside a service area of a first multicast/broadcast service.

After receiving the measurement report from the UE, the S-gNB determines, based on the measurement report, to hand over the UE to a T-gNB. The measurement report carries identification information of the T-gNB and/or identification information of a target cell.

The S-gNB stores service area information in context information corresponding to the first multicast/broadcast service that the UE joins on the source base station. Therefore, the S-gNB determines that the identification information of the T-gNB or the identification information of the target cell in the measurement report is included in the service area of the first multicast/broadcast service.

S1003. The S-gNB sends a handover required to an S-AMF.

When the S-gNB determines that the identification information of the T-gNB or the identification information of the target cell in the measurement report is included in the service area of the first multicast/broadcast service, the S-gNB sends the handover required to the S-AMF. The handover required may include PDU session information of a multicast/broadcast service associated with the to-be-handed-over UE. In other words, the PDU session information includes information about a unicast QoS flow to which a multicast/broadcast QoS flow is mapped. In addition, the handover required further includes the identification information of the target cell to which the UE is to be handed over.

In S1004 to S1013, the PDU session information is transmitted to the T-gNB, and after receiving the information, the T-gNB allocates, to the UE, a transmission resource used to transmit data of the first multicast/broadcast service.

The T-gNB allocates a corresponding radio bearer to the multicast/broadcast QoS flow based on the information about the unicast QoS flow to which the multicast/broadcast QoS flow is mapped. In other words, related configurations from the PDCP layer to the PHY layer are for meeting a requirement of a QoS parameter. The requirement may be, for example, a bandwidth, a delay, or jitter.

It should be noted that other steps in FIG. 10A and FIG. 10B are not described in detail. The steps should be understood as the conventional art in the N2 handover, and details are not described again.

According to the communication method for a multicast/broadcast service provided in this application, during an N2 handover procedure, when the S-gNB dynamically determines that the reference location information of the terminal is inside the service area of the first multicast/broadcast service, the T-gNB of the terminal is triggered to allocate a resource to or establish a resource for the terminal, thereby improving the utilization of network resources.

Figure 11:
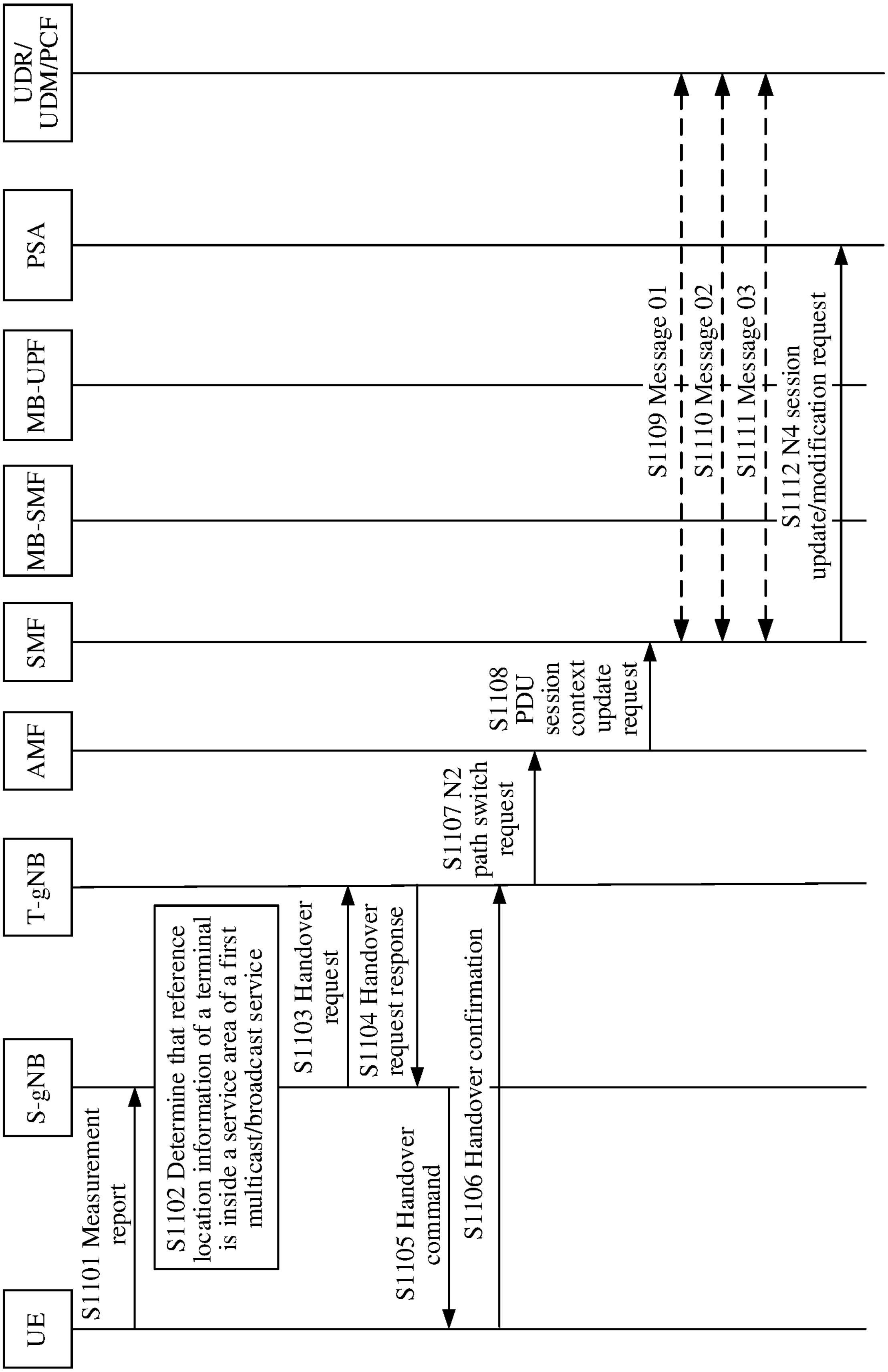
FIG. 11 is a flowchart of a communication method for a multicast/broadcast service according to an embodiment of this application.

As shown in FIG. 11, this embodiment provides a flowchart of performing an Xn handover on a terminal between non-co-site cells. In the embodiment shown in FIG. 11, an example in which a network device is an S-gNB is used for description.

S1101. A UE sends a measurement report to an S-gNB.

S1102. The S-gNB determines that a reference location of the terminal is inside a service area of a first multicast/broadcast service.

After receiving the measurement report from the UE, the S-gNB determines, based on the measurement report, to hand over the UE to a T-gNB. The measurement report carries identification information of the T-gNB and/or identification information of a target cell.

The S-gNB stores service area information in context information corresponding to the first multicast/broadcast service that the UE joins on the source base station. Therefore, the S-gNB determines that the identification information of the T-gNB or the identification information of the target cell in the measurement report is included in the service area of the first multicast/broadcast service.

S1103. The S-gNB sends a handover request to a T-gNB.

When determining that the identification information of the T-gNB or the identification information of the target cell in the measurement report is included in the service area of the first multicast/broadcast service, the S-gNB sends the handover request to the T-gNB. The handover request may include PDU session information of a multicast/broadcast service associated with the to-be-handed-over UE. In other words, the PDU session information includes information about a unicast QoS flow to which a multicast/broadcast QoS flow is mapped. In addition, the handover request further includes the identification information of the target cell to which the UE is to be handed over.

S1104. The T-gNB sends a handover request response to the S-gNB.

After receiving the handover request in S1103, the T-gNB allocates, to the UE based on the PDU session information, a transmission resource used to transmit the data of the first multicast/broadcast service.

It should be noted that the context information in the foregoing descriptions (FIG. 7 to FIG. 11) may include identification information of a multicast/broadcast service, for example, and may be any one of the following, or may be a combination of one or more of the following, but not limited to: an identifier of the multicast/broadcast service, a name of the multicast/broadcast service, a multicast/broadcast address of the multicast/broadcast service, a multicast/broadcast IP address of the multicast/broadcast service, a temporary mobile group identity (TMGI) corresponding to the multicast/broadcast service, or a session address of the multicast/broadcast service. The context information may further include service area information corresponding to a multicast/broadcast service, for example, and may be one or more of the following information, or may be any combination of one or more of the following information, including: geographic area information, public land mobile network information, tracking area information, identification information of a cell, identification information of a base station, identification information of a central unit of the base station, identification information of a distributed unit (DU) of the base station, or a civil address list. The context information further includes an area session identifier of a service area corresponding to the multicast/broadcast service and the like.

It should be noted that other steps in FIG. 11 are not described in detail. The steps should be understood as the conventional art in the Xn handover, and details are not described again.

According to the communication method for a multicast/broadcast service provided in this application, during an Xn handover procedure, when the S-gNB dynamically determines that the reference location information of the terminal is inside the service area of the first multicast/broadcast service, the T-gNB of the terminal is triggered to allocate a resource to or establish a resource for the terminal, thereby improving the utilization of network resources.

Figure 12:
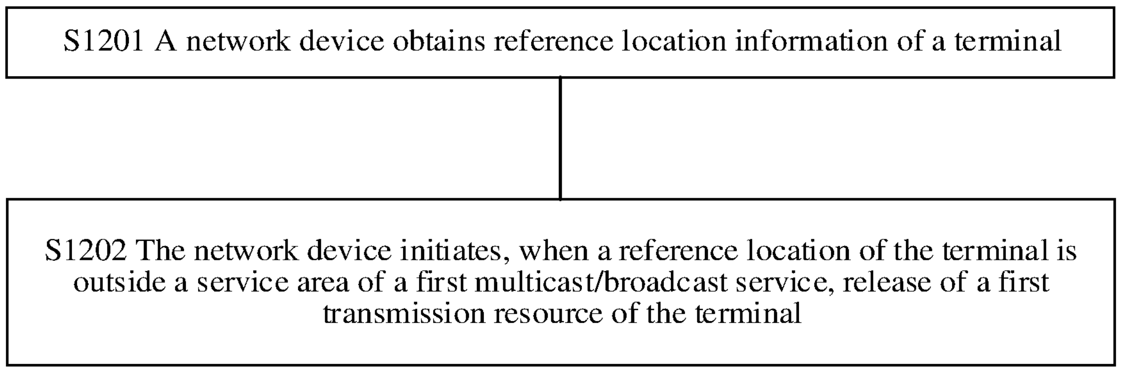
FIG. 12 is a flowchart of a communication method for a multicast/broadcast service according to an embodiment of this application.

FIG. 12 is a flowchart of a communication method 1200 for a multicast/broadcast service according to an embodiment of this application. The method may be applied to a process in which a terminal is handed over from an S-gNB to a T-gNB device, or may be applied to a process in which a terminal is handed over between co-site cells. The method 1200 includes at least the following steps.

S1201. A network device obtains reference location information of a terminal.

The reference location information represents a reference location of the terminal. The reference location information includes location information of the terminal in an access network device that currently serves the terminal, or location information of the terminal in a T-gNB of the terminal. It should be noted that the location information includes at least one of the following: an identifier of a cell, an identifier of an access network device, an identifier of a tracking area, or an identifier of a public land mobile network (PLMN). In addition, the location information may further include global positioning system (GPS) geographic location information, a sector identifier, a PCI, an antenna identifier, a DU identifier, or the like.

Optionally, when the reference location information includes the location information of the terminal in the access network device that currently serves the terminal, the location information may be one or more combinations of an identifier of a current serving cell, an identifier of an access network that currently serves the terminal, an identifier of a current tracking area, or the like.

Optionally, when the reference location information includes the location information of the terminal in the T-gNB of the terminal, the location information may be one or more of an identifier of a target cell, an identifier of the T-gNB, an identifier of a target tracking area, or the like.

S1202. The network device initiates release of a first transmission resource of the terminal, where the first transmission resource is used to transmit data of a first multicast/broadcast service, and includes a resource used by the terminal to transmit the data of the first multicast/broadcast service through the T-gNB of the terminal.

When the network device determines that a reference location of the terminal is outside a service area of the first multicast/broadcast service, the network device triggers release of the first transmission resource of the terminal. The first transmission resource is used to transmit the data of the first multicast/broadcast service.

It should be noted that the initiating release may also be understood as triggering release, triggering deletion, initiating deletion, or the like.

According to the communication method for a multicast/broadcast service provided in this application, if the network device determines that the reference location of the terminal is outside the service area of the first multicast/broadcast service, the network device triggers release of the transmission resource used to transmit the data of the first multicast/broadcast service. Through processing and operations performed by the network device, this solution can effectively save network resources, and avoid a resource waste caused by invalid forwarding of data of a multicast/broadcast service.

Optionally, the network device may be an SMF or an S-gNB.

First, the method 1200 is described by using an example in which the network device is an SMF. The method may include embodiments in which the network device is an SMF shown in FIG. 13 to FIG. 15.

Figure 13:
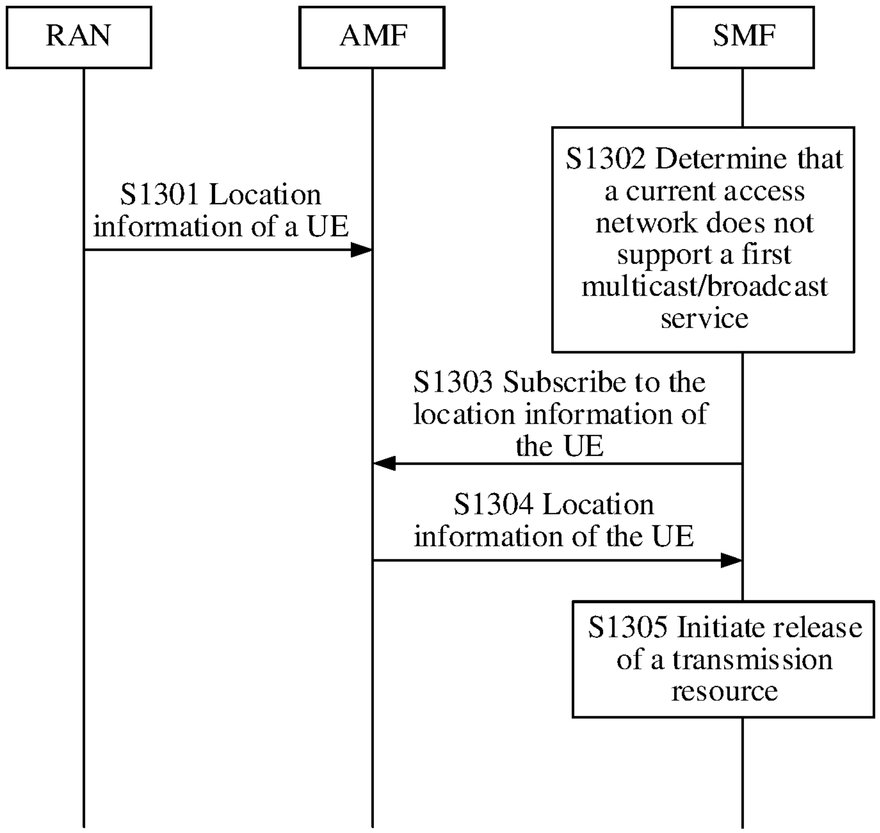
FIG. 13 is a flowchart of a communication method for a multicast/broadcast service according to an embodiment of this application.

As shown in FIG. 13, this embodiment provides a flowchart of a co-site cell handover performed on a terminal.

S1301. An access network device reports location information to an AMF.

The reference location information may be location information in an access network device that currently serves the terminal. The access network device reports the location information to the AMF. The location information may be identification information of a cell in which the terminal is currently located.

S1302. An SMF determines that the current access network device does not support a first multicast/broadcast service.

S1303. The SMF subscribes to location information of the terminal from the AMF.

Optionally, when the SMF receives a join request from the terminal, and the SMF determines that the current access network device does not support the multicast/broadcast function, the SMF subscribes to the location information of the terminal from to the AMF. It should be understood that the join request may be control plane signaling, for example, may be a PDU session modification/establishment request, or the join request may be a user plane join request, for example, may be an Internet group management protocol join (IGMP join), a multicast listener discovery (MLD), or a multicast listener report (MLR).

Optionally, if the SMF determines that the current access network device does not support the multicast/broadcast function and the service area established on the access network device for the multicast/broadcast service includes one or more or all cells of the access network device, the SMF subscribes to the location information of the terminal from to the AMF.

Optionally, when the SMF determines that the current access network device does not support the multicast/broadcast function, the SMF subscribes to the location information of the terminal from to the AMF.

Alternatively, when the SMF receives a multicast/broadcast service establishment indication sent by an MB-SMF, the SMF subscribes to the location information of the terminal from to the AMF.

In another possible manner, when the SMF receives a multicast/broadcast service establishment/modification indication sent by a UDR or a PCF, the SMF subscribes to the location information of the terminal from to the AMF.

Alternatively, when the SMF receives a PDU session modification/establishment request sent by a UDR, a PCF, or a UDM, the SMF subscribes to the location information of the terminal from to the AMF.

It should be noted that the foregoing triggering the SMF to subscribe to the location information of the terminal from to the AMF is merely an example instead of a limitation. It should be understood that when the terminal moves, the terminal may be triggered at a moment of accessing a multicast/broadcast service or by another condition.

S1304. The AMF sends the location information of the UE to the SMF.

After receiving a subscription message, the AMF may return a first message to the SMF. The first message carries the location information of the terminal.

S1305. The SMF initiates release of a first transmission resource of the terminal.

Based on the current location information of the UE, for an access network device that does not support a multicast/broadcast function or after the UE moves out of a multicast/broadcast service area, a QoS flow corresponding to the multicast/broadcast service is released in a PDU session associated with the multicast/broadcast service.

It should be understood that the releasing the QoS flow corresponding to the multicast/broadcast service may also be understood as deleting the QoS flow corresponding to the multicast/broadcast service.

According to the communication method for a multicast/broadcast service provided in this application, if the network device determines that the reference location of the terminal is outside the service area of the first multicast/broadcast service, the network device triggers/initiates release/deletion of the first transmission resource of the terminal so that network resources can be effectively saved, and a resource waste caused by invalid forwarding can be avoided.

Figure 14A:
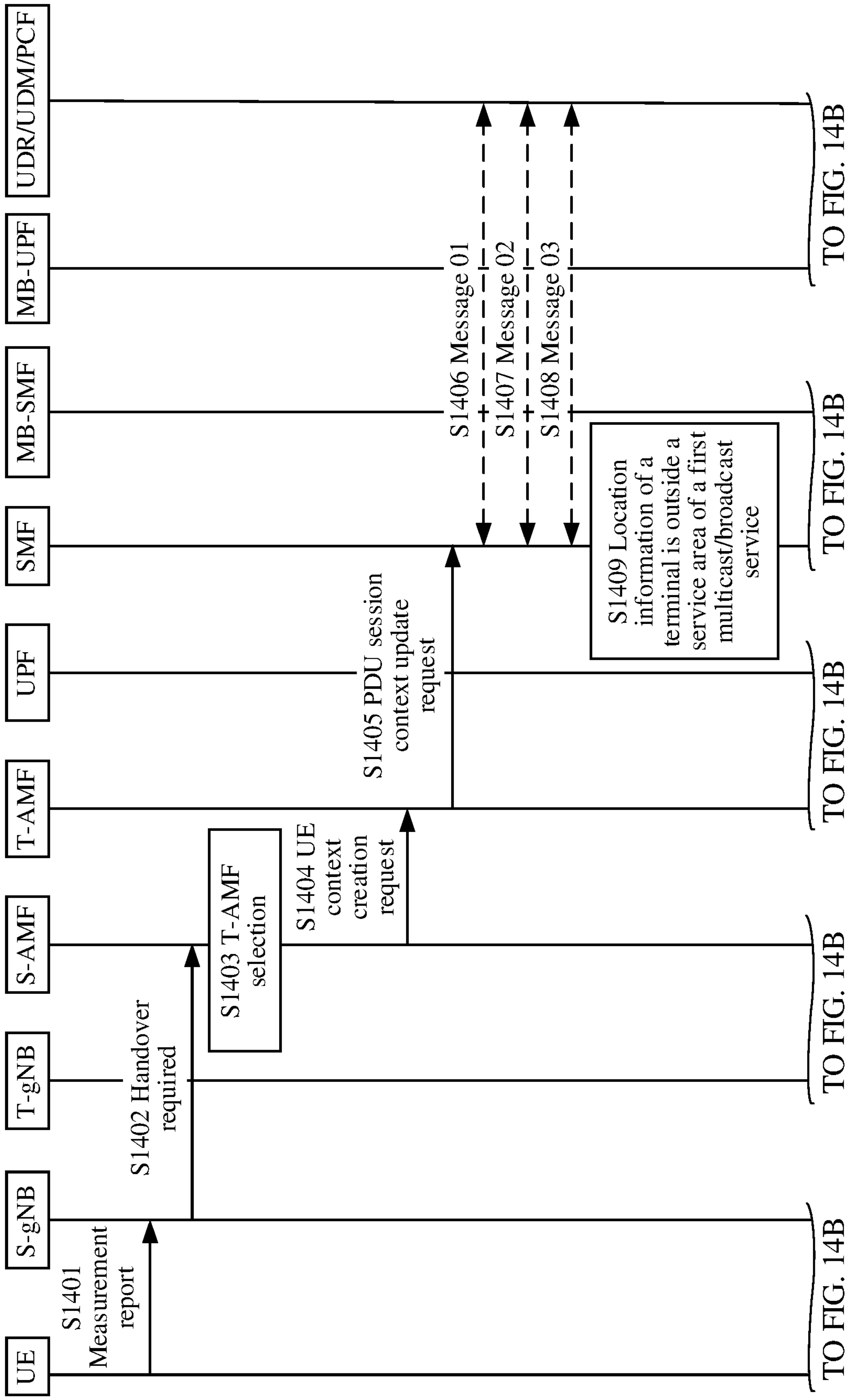
FIG. 14A and FIG. 14B are flowcharts of a communication method for a multicast/broadcast service according to an embodiment of this application.
Figure 14B:
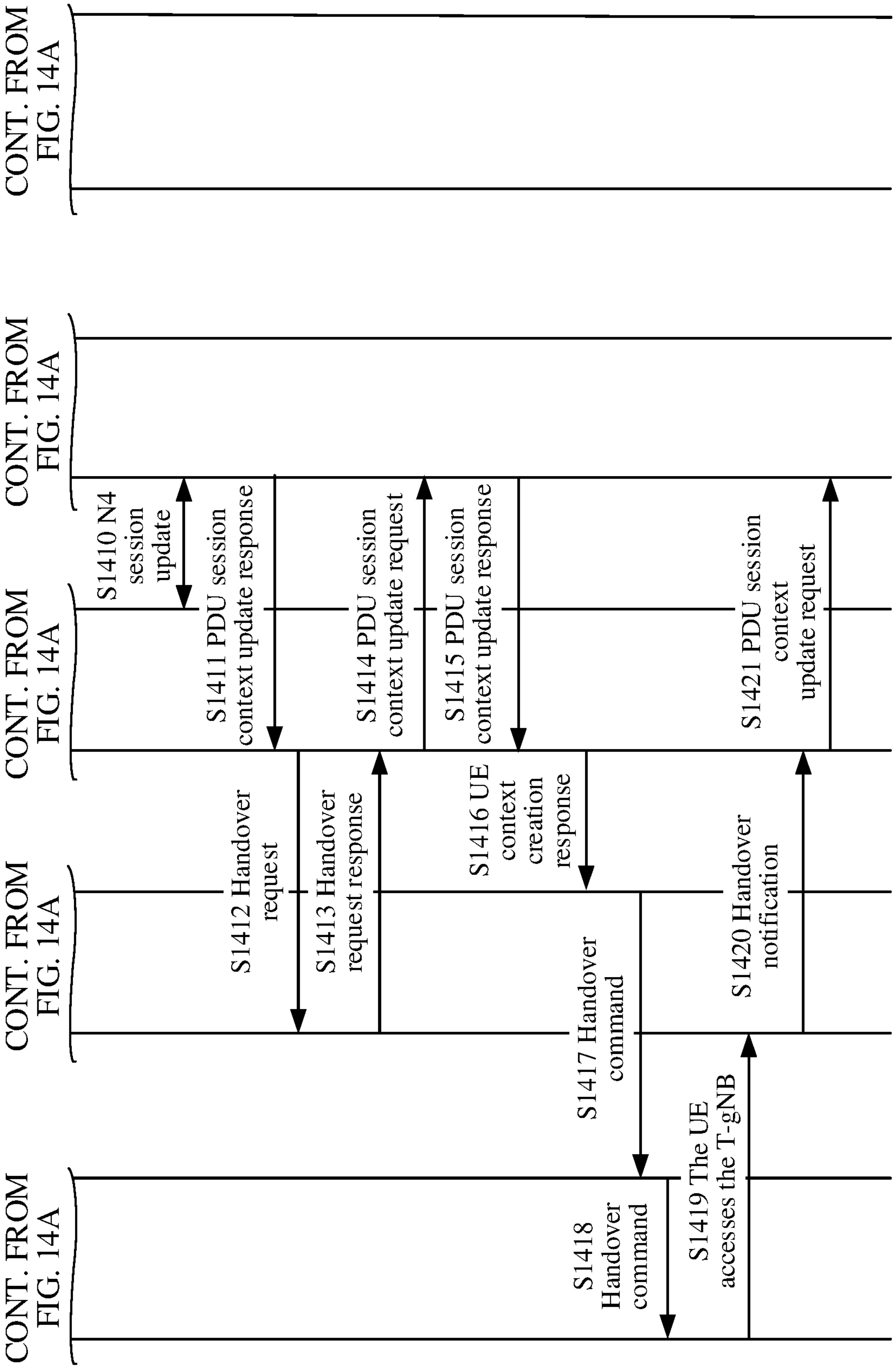

As shown in FIG. 14A and FIG. 14B, this embodiment provides a flowchart of performing an N2 handover on a terminal between non-co-site cells.

It should be noted that a PDU session associated with a multicast/broadcast service may also be referred to as a unicast fall-back PDU session, or referred to as a PDU session for a 5GC shared delivery method to individual delivery method switch (5GC shared delivery method to individual delivery method switch), or referred to as a PDU session corresponding to a 5GC individual multicast/broadcast service traffic delivery method (5GC individual MBS traffic delivery method), or referred to as a PDU session corresponding to a 5GC individual delivery method, or referred to as a PDU session corresponding to an individual delivery method.

The PDU session context update request may be Nsmf_PDU Session_UpdateSMContext Request.

The PDU session context update request may include identification information of the PDU session, identification information of a T-AMF, identification information (Target ID) of a target cell selected by the source base station for the to-be-handed-over UE, and N2 SM information.

S1409. The SMF determines that a reference location of the terminal is outside a service area of a first multicast/broadcast service.

The reference location may be location information of the terminal in the T-gNB of the terminal, the location information may be an identifier (Target ID) of a target cell, an identifier of the T-gNB, an identifier of a target tracking area, or the like.

It should be understood that the location information is sent by the T-AMF to the SMF in S1405.

When the UE joins the multicast/broadcast service, the SMF knows that the PDU session is associated with the multicast/broadcast service. Therefore, when any one or more of the following conditions are met, the SMF determines that the reference location of the terminal is outside the service area of the first multicast/broadcast service.

It should be noted that the following briefly describes the determining conditions in a distinguishing manner based on whether the first multicast/broadcast service is established on the T-gNB or whether the location area corresponding to the identification information of the target cell is in the service area of the multicast/broadcast service established by the T-gNB.

1. The multicast/broadcast service has not been established (or existed or been distributed or been started (startup)) on the T-gNB, or the multicast/broadcast service has been established on the T-gNB, but location information of the terminal in the T-gNB of the terminal is not inside a service area of the multicast/broadcast service that has been established on the T-gNB.

The foregoing being not established may also be understood as not existing, being not distributed, or being not started (startup).

Optionally, the SMF does not store multicast/broadcast context information corresponding to the multicast/broadcast service that the terminal joins on the S-gNB. In this case, the SMF sends a first message to a UDR/UDM/PCF. The first message is for querying the multicast/broadcast context information (or a multicast/broadcast session context, or a multicast/broadcast service context, or multicast/broadcast group context information (multicast/broadcast group context)) corresponding to the multicast/broadcast service (or session or group) (that is, the multicast/broadcast service, the multicast/broadcast session, or the multicast/broadcast group) that the terminal joins on the S-gNB. The UDR/UDM/PCF returns the multicast/broadcast context information corresponding to the multicast/broadcast service that the terminal joins on the S-gNB. The SMF determines that the location information of the terminal in the T-gNB of the terminal is not inside a service area in the multicast/broadcast context information corresponding to the multicast/broadcast service that the terminal joins on the S-gNB.

It should be noted that the first message may include identification information corresponding to the multicast/broadcast service, and may further include an area session ID (also referred to as a local area ID or a multicast/broadcast session ID or a flow ID) of a service area corresponding to the multicast/broadcast service.

The context may include identification information of the multicast/broadcast service, which, for example, may be at least one of the following identification information: an ID of the multicast/broadcast service, a name of the multicast/broadcast service, a multicast/broadcast address of the multicast/broadcast service, a multicast/broadcast IP address of the multicast/broadcast service, a TMGI corresponding to the multicast/broadcast service, a session ID (multicast/broadcast service session ID, MBS session ID) of the multicast/broadcast service, or the like. The context may further include information about a service area corresponding to the multicast/broadcast service, which, for example, may refer to information about a geographic area (that is, information about one or more geographic areas), or may refer to at least one of the following location criteria: a PLMN (which may refer to one or more PLMNs), a TAI (which may refer to one or more TAIs), identification information of a base station (which may refer to one or more pieces of identification information and is not limited), identification information of a cell (identification information of one or more cells), or identification information of a tracking area (identification information of one or more tracking areas), identification information (central unit, CU) of a central unit of the base station, and identification information (distributed unit, DU) of a distribution unit of the base station, or may be a civil address table (civil address list) or the like. The context may further include an area session identifier of a service area corresponding to the multicast/broadcast service. The area session identifier of the service area corresponding to the multicast/broadcast service may be an area session ID of the service area corresponding to the multicast/broadcast service, or may be referred to as a local area ID, a local multicast/broadcast session ID, a local flow ID, or the like.

Optionally, the SMF stores the multicast/broadcast context information corresponding to the multicast/broadcast service that the terminal joins on the S-gNB, and the SMF determines that the location information of the terminal in the T-gNB of the terminal is not inside a service area in the multicast/broadcast context information corresponding to the multicast/broadcast service that the terminal joins on the S-gNB.

Optionally, the SMF may send a second message to the UDR/UDM/PCF, and query, using the second message, the multicast/broadcast context information corresponding to the location information that is of the terminal and that is in the T-gNB of the terminal. The UDR/UDM/PCF returns the multicast/broadcast context information corresponding to the location information of the terminal in the T-gNB of the terminal. The SMF determines that the area session identifier in the multicast/broadcast context information corresponding to the location information of the terminal in the T-gNB of the terminal is different from the area session identifier in the multicast/broadcast context information corresponding to the multicast/broadcast service that the terminal joins on the S-gNB.

Optionally, the SMF determines that the location information of the terminal in the T-gNB of the terminal is inside only a service area in the multicast/broadcast context information corresponding to the multicast/broadcast service that the terminal joins on the S-gNB.

Optionally, the SMF determines that the location information of the terminal in the T-gNB of the terminal is only inside a service area in the multicast/broadcast context information corresponding to the location information of the terminal in the T-gNB of the terminal.

Optionally, the SMF determines that the area session identifier in the multicast/broadcast context information corresponding to the location information of the terminal in the T-gNB of the terminal is different from the area session identifier in the multicast/broadcast context information corresponding to the multicast/broadcast service that the terminal joins on the S-gNB, and is further different from the area session identifier in the multicast/broadcast context information corresponding to the multicast/broadcast service of the T-gNB. It should be noted that the SMF may send a third message to the UDR/UDM/PCF, and query, using the third message, multicast/broadcast context information corresponding to the identification information of the T-gNB.

2. The multicast/broadcast service has been established on the T-gNB, and location information of the terminal in the T-gNB of the terminal is inside a service area of the multicast/broadcast service. In other words, the location information of the terminal in the T-gNB of the terminal is included in a service area of the corresponding context information that has been established by the T-gNB for the multicast/broadcast service.

Optionally, the SMF determines that the location information of the terminal in the T-gNB of the terminal is not inside a service area in the multicast/broadcast context information corresponding to the multicast/broadcast service that the terminal joins on the S-gNB.

Optionally, the SMF determines that the service area of the context information corresponding to the multicast/broadcast service that the terminal joins on the S-gNB is different from a service area of context information corresponding to the multicast/broadcast service obtained when or after the multicast/broadcast service is established on the T-gNB.

Optionally, the SMF determines that the area session identifier in the multicast/broadcast context information corresponding to the multicast/broadcast service that the terminal joins on the S-gNB is different from the area session identifier in context information corresponding to the T-gNB during or after the multicast/broadcast service is established on the T-gNB.

Optionally, the SMF determines that a location area corresponding to location information of the terminal in the T-gNB of the terminal is not inside a service area in the multicast/broadcast context information corresponding to the multicast/broadcast service that the terminal joins on the S-gNB.

It should be understood that the foregoing determining conditions are merely an example rather than a limitation. Any condition that can be for determining that the location information of the terminal in the T-gNB of the terminal is outside the service area of the first multicast/broadcast/broadcast service should fall within the protection scope of this application. In addition, one or more of the foregoing conditions may also be combined for joint determination. This is not limited in this application.

S1411. The SMF sends a PDU session context update response message to the T-AMF.

When the SMF determines, through conditions, that the location information of the terminal in the T-gNB of the terminal is not inside the service area of the first multicast/broadcast service, the SMF initiates release of the first transmission resource of the terminal.

Optionally, QoS information of a unicast QoS flow of a PDU session in the PDU session context update response message sent by the SMF to the T-AMF does not include information about a unicast QoS flow to which a first multicast/broadcast QoS flow is mapped. In other words, when the SMF determines that the T-gNB is not in the service area of the first multicast/broadcast service, the SMF does not create a QoS flow corresponding to the first multicast/broadcast service. Therefore, the SMF does not notify the T-gNB to configure/prepare/establish a radio resource corresponding to the QoS flow corresponding to the first multicast/broadcast service.

Optionally, the SMF may notify, through the T-AMF, the T-gNB of the terminal that the first transmission resource is invalid.

Optionally, the SMF may notify, through the T-AMF, the T-gNB of the terminal not to establish/prepare a radio resource corresponding to the first transmission resource.

Optionally, the SMF may not send an identifier of the first transmission resource to the T-gNB of the terminal through the T-AMF. Because the access network device allocates an air interface resource based on a QoS parameter corresponding to a QFI, that is, maps the QFI to a data radio bearer (DRB), a data radio bearer identified by a DRB identifier corresponds to an entire set of air interface resource configurations. Therefore, the session management function network element does not send a QFI identifier to the base station, so that the T-gNB does not allocate the DRB to the QFI.

That the SMF initiates release of a first transmission resource of the terminal is described.

(1) If a PDU session associated with a multicast/broadcast service includes only a unicast QoS flow to which a multicast/broadcast QoS flow is mapped, that the SMF notifies the T-gNB of the terminal to release the first transmission resource may include one or more of the following operations:

Optionally, the SMF may not forward the PDU session associated with the multicast/broadcast service (or the SMF may disable forwarding of the PDU session associated with the multicast/broadcast service). For example, based on a hierarchical structure formed by a Handover Request information element defined in 3GPP TS 38.413, the SMF may perform a corresponding operation on a Data Forwarding Not Possible information element.

Optionally, the SMF does not include the mapped unicast QoS flow in a QoS flow list requiring establishment of related air interfaces on the T-gNB. For example, the SMF does not include QoS Flow Setup Request Item corresponding to the mapped unicast QoS flow in QoS Flow Setup Request List.

Optionally, the SMF includes a QoS Flow Setup Request Item corresponding to the mapped unicast QoS flow in a QoS Flow Setup Request List, but the SMF does not perform parameter padding for QoS Flow Identifier and QoS Flow Level QoS Parameters. Alternatively, the SMF does not perform parameter padding for QoS Flow Identifier, QoS Flow Level QoS Parameters, and E-RAB ID. Alternatively, the SMF does not perform parameter padding for QoS Flow Identifier. Alternatively, the SMF does not perform parameter padding for QoS Flow Level QoS Parameters. Alternatively, the SMF does not perform parameter padding for E-RAB ID or the like.

It should be understood that the parameter padding may be, for example, an actual parameter corresponding to a formal parameter, an actual parameter corresponding to a variable, an actual value corresponding to the information element, or a value corresponding to the field.

(2) If a PDU session associated with a multicast/broadcast service further includes, in addition to a unicast QoS flow to which a multicast/broadcast QoS flow is mapped, another unicast QoS flow, the SMF notifies the T-gNB of the terminal to release the first transmission resource. That the SMF initiates release of the first transmission resource of the terminal described above is also applicable. One or more of the following operations may be further included.

Optionally, the SMF does not include the mapped unicast QoS flow in a QoS flow list requiring establishment of related air interfaces on the T-gNB. For example, the SMF does not include QoS Flow Setup Request Item corresponding to the mapped unicast QoS flow in QoS Flow Setup Request List.

Optionally, the SMF includes QoS Flow Setup Request Item corresponding to the mapped unicast QoS flow in QoS Flow Setup Request List, but the SMF does not perform parameter padding for QoS Flow Identifier and QoS Flow Level QoS Parameters. Alternatively, the SMF does not perform parameter padding for QoS Flow Identifier, QoS Flow Level QoS Parameters, and E-RAB ID. Alternatively, the SMF does not perform parameter padding for QoS Flow Identifier. Alternatively, the SMF does not perform parameter padding for QoS Flow Level QoS Parameters. Alternatively, the SMF does not perform parameter padding for an E-RAB identifier or the like.

It should be understood that the parameter padding may be, for example, an actual parameter corresponding to a formal parameter, an actual parameter corresponding to a variable, an actual value corresponding to the information element, or a value corresponding to the field.

It should be noted that a PDU session associated with a multicast/broadcast service may also be referred to as a unicast fall-back PDU session, or referred to as a PDU session for a 5GC shared delivery method to individual delivery method switch, or referred to as a PDU session corresponding to a 5GC individual multicast/broadcast service traffic delivery method (5GC individual MBS traffic delivery method), or referred to as a PDU session corresponding to a 5GC individual delivery method, or referred to as a PDU session corresponding to an individual delivery method.

It should be understood that the foregoing determining conditions are merely an examples rather than limitations. Any condition that can be for determining that the reference location of the terminal is outside the service area of the first multicast/broadcast/broadcast service should fall within the protection scope of this application. In addition, one or more of the foregoing conditions may also be combined for joint determination. This is not limited in this application.

It should be noted that other steps in FIG. 14A and FIG. 14B are not described in detail. The steps should be understood as the conventional art in the N2 handover, and details are not described again.

According to the communication method for a multicast/broadcast service provided in this application, if the SMF determines that the reference location of the terminal is outside the service area of the first multicast/broadcast service, the SMF notifies the target access network device of the terminal to initiate release of the first transmission resource of the terminal, so that network resources can be effectively saved, and a resource waste caused by invalid forwarding can be avoided.

Figure 15:
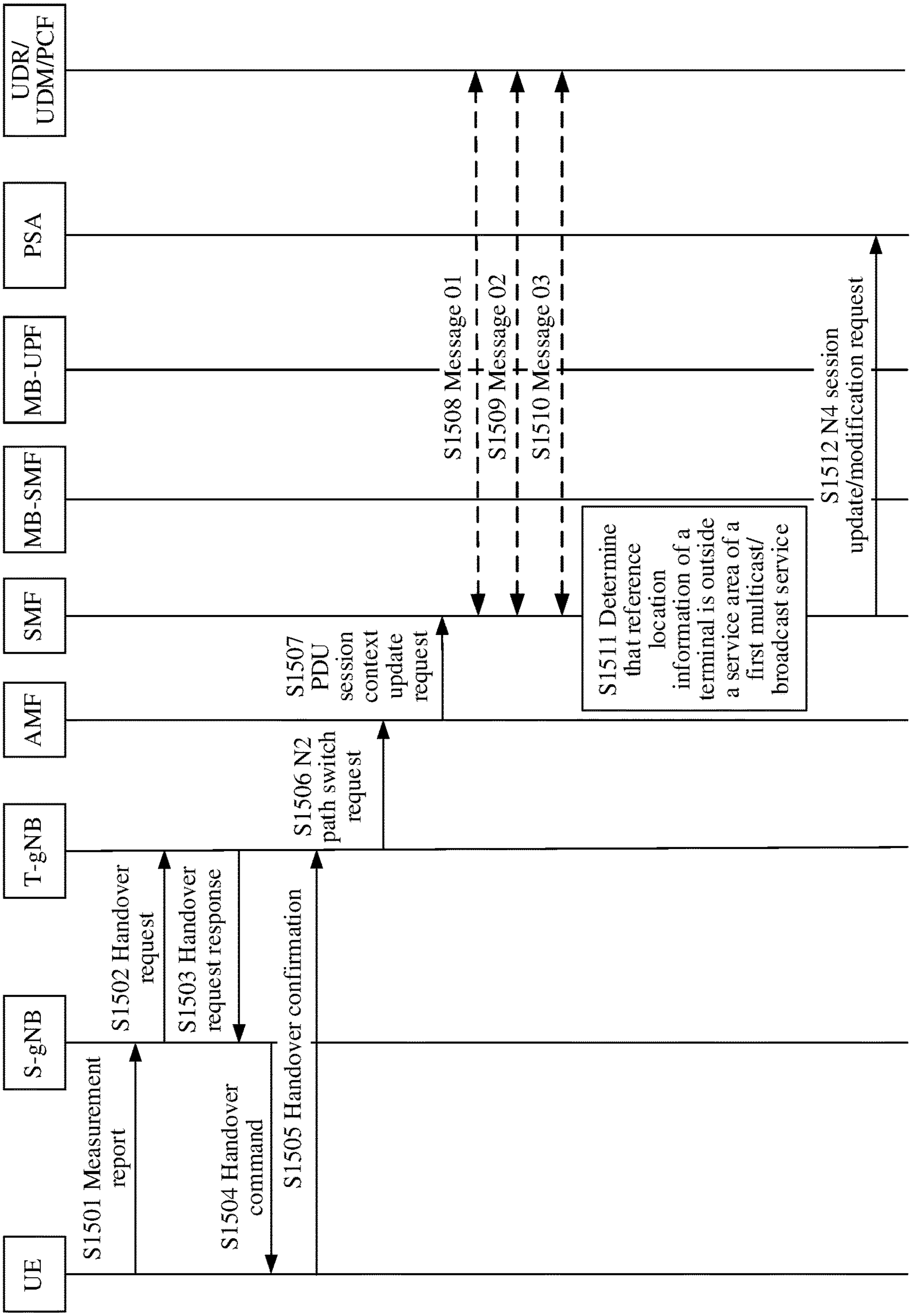
FIG. 15 is a flowchart of a communication method for a multicast/broadcast service according to an embodiment of this application.

As shown in FIG. 15, this embodiment provides a flowchart of performing an Xn handover on a terminal between non-co-site cells. In an Xn handover process shown in FIG. 15, the SMF obtains location information (UE Location Information) in an access network device that currently serves the terminal. In other words, in this case the access network device that serves the terminal is a target access network device, and the SMF notifies a UPF to release the first transmission resource.

The following steps are included:

S1507. The AMF sends a PDU session context update request to the SMF.

The PDU session context update request includes reference location information (for example, UE Location Information) of the UE. The reference location information may be location information in the access network device that currently serves the terminal. The location information may be one or more of an identifier of a current serving cell, an identifier of a current serving access network device, an identifier of a current tracking area, and the like.

S1511. The SMF determines that reference location information of the terminal is outside a service area of a first multicast/broadcast service.

The SMF determines, based on information about a service area of the first multicast/broadcast service in a context corresponding to the first multicast/broadcast service and the reference location information, that the terminal is outside the service area of the first multicast/broadcast service.

That the SMF determines that a reference location of the terminal is outside a service area of a first multicast/broadcast service is described below in detail.

It should be noted that the following briefly describes the determining conditions in a distinguishing manner based on whether the first multicast/broadcast service is established on the T-gNB or whether the reference location information of the UE (for example, UE Location Information) is in the service area of the multicast/broadcast service established by the T-gNB.

1. The multicast/broadcast service has not been established on the T-gNB, or the multicast/broadcast service has been established on the T-gNB, but location information (for example, UE Location Information) of the terminal in the access network device that currently serves the terminal is not inside a service area of the multicast/broadcast service that has been established on the T-gNB.

Optionally, the SMF does not store multicast/broadcast context information corresponding to the multicast/broadcast service that the terminal joins on the S-gNB. In this case, the SMF sends a first message to a UDR/UDM/PCF. The first message is for querying multicast/broadcast context information corresponding to the multicast/broadcast service that the terminal joins on the S-gNB. The UDR/UDM/PCF returns the multicast/broadcast context information corresponding to the multicast/broadcast service that the terminal joins on the S-gNB. The SMF determines that the location information of the terminal in the access network device that currently serves the terminal is not inside a service area in the multicast/broadcast context information corresponding to the multicast/broadcast service that the terminal joins on the S-gNB.

Optionally, the SMF stores the multicast/broadcast context information corresponding to the multicast/broadcast service that the terminal joins on the S-gNB, and the SMF determines that the location information of the terminal in the access network device that currently serves the terminal is not inside a service area in the multicast/broadcast context information corresponding to the multicast/broadcast service that the terminal joins on the S-gNB.

Optionally, the SMF may send a second message to the UDR/UDM/PCF, and query, using the second message, the multicast/broadcast context information corresponding to the location information of the terminal in the access network device that currently serves the terminal. The UDR/UDM/PCF returns the multicast/broadcast context information corresponding to the location information of the terminal in the access network device that currently serves the terminal. The SMF determines that the area session identifier in the multicast/broadcast context information corresponding to the location information of the terminal in the access network device that currently serves the terminal is different from the area session identifier in the multicast/broadcast context information corresponding to the multicast/broadcast service that the terminal joins on the S-gNB.

Optionally, the SMF determines that the location information of the terminal in the access network device that currently serves the terminal is only inside a service area in the multicast/broadcast context information corresponding to the multicast/broadcast service that the terminal joins on the S-gNB.

Optionally, the SMF determines that the location information of the terminal in the access network device that currently serves the terminal is only inside a service area in the multicast/broadcast context information corresponding to the location information of the terminal in the T-gNB of the terminal.

Optionally, the SMF determines that the area session identifier in the multicast/broadcast context information corresponding to the location information of the terminal in the access network device that currently serves the terminal is different from the area session identifier in the multicast/broadcast context information corresponding to the multicast/broadcast service that the terminal joins on the S-gNB, and is further different from the area session identifier in the multicast/broadcast context information corresponding to the multicast/broadcast service of the T-gNB. It should be noted that the SMF may send a third message to the UDR/UDM/PCF, and query, using the third message, multicast/broadcast context information corresponding to the identification information of the T-gNB.

2. The multicast/broadcast service has been established on the T-gNB, and location information of the terminal in the access network device that currently serves the terminal is inside a service area of the multicast/broadcast service that has been established on the T-gNB. In other words, the location information of the terminal in the access network device that currently serves the terminal is included in a service area of the corresponding context information that has been established by the T-gNB for the multicast/broadcast/broadcast service.

Optionally, the SMF determines that the location information of the terminal in the access network device that currently serves the terminal is not inside a service area in the multicast/broadcast context information corresponding to the multicast/broadcast service that the terminal joins on the S-gNB.

Optionally, the SMF determines that the service area of the context information corresponding to the multicast/broadcast service that the terminal joins on the S-gNB is different from a service area of context information corresponding to the multicast/broadcast service obtained when or after the multicast/broadcast service is established on the T-gNB.

Optionally, the SMF determines that the service area of the context information corresponding to the multicast/broadcast service that the terminal joins on the S-gNB is different from a service area of context information corresponding to the multicast/broadcast service obtained when or after the multicast/broadcast service is established on the T-gNB.

Optionally, the SMF determines that the area session identifier in the multicast/broadcast context information corresponding to the multicast/broadcast service that the terminal joins on the S-gNB is different from the area session identifier in context information corresponding to the T-gNB during or after the multicast/broadcast service is established on the T-gNB.

Optionally, the SMF determines that a location area corresponding to the location information of the terminal in the access network device that currently serves the terminal is not inside a service area in the multicast/broadcast context information corresponding to the multicast/broadcast service that the terminal joins on the S-gNB.

It should be understood that the foregoing determining conditions are merely an example rather than a limitation. Any condition that can be for determining that the location information (for example, UE Location Information) of the terminal in the access network device that currently serve the terminal is outside the service area of the first multicast/broadcast/broadcast service should fall within the protection scope of this application. In addition, one or more of the foregoing conditions may also be combined for joint determination. This is not limited in this application.

S1512. The SMF sends an N4 session update/modification request to a UPF.

The SMF sends an N4 session update/modification request to the UPF. The request includes indication information notifying the UPF to release the first transmission resource.

In conclusion, in an Xn handover procedure, when the SMF determines that the location information of the terminal in the current access network device of the terminal (that is, the location information in the target base station, that is, UE Location Information brought in S1507) is not inside the service area of the first multicast/broadcast service, the SMF notifies, by sending an N4 session update/modification request or a PFCP session update/modification request to the UPF, the UPF to release/delete/disable the first transmission resource. The N4 session update/modification request does not include a PDR corresponding to a QoS flow of the first multicast/broadcast service, and may not include one or more of an FAR, a QER, or a URR.

That the SMF notifies, by sending an N4 session update/modification request or a PFCP session update/modification request to the UPF, the UPF to release the first transmission resource may include one or more of the following operations:

(1) If a PDU session associated with a multicast/broadcast service further includes, in addition to a unicast QoS flow to which a multicast/broadcast QoS flow is mapped, another unicast QoS flow, a hierarchical structure is formed based on a Path Switch Request Transfer information element defined in 3GPP TS 29.502 and 38.413. Optionally, if "QoS Flow Accept List" of "Path Switch Request Transfer" includes a unicast QoS flow to which the multicast/broadcast QoS flow is mapped, the SMF deletes an item corresponding to the multicast/broadcast QoS flow from "QoS Flow Accept List" (or releases the item or sets the item to null).

Optionally, if "QoS Flow Accept List" of "Path Switch Request Transfer" includes a unicast QoS flow to which the multicast/broadcast QoS flow is mapped, the SMF sets a parameter, that is, "QoS Flow Identifier", included in an item corresponding to the multi cast/broadcast QoS flow to null.

Optionally, if "QoS Flow Accept List" of "Path Switch Request Transfer" includes a unicast QoS flow to which the multicast/broadcast QoS flow is mapped, when establishing, adding, modifying, or updating (adding or modifying) a PFCP session context, the SMF does not establish, add, modify, or update a PDR or PDRs, an FAR or FARs, or the like corresponding to the multicast/broadcast QoS flow, or does not provide a PDR or PDRs, an FAR or FARs, or the like corresponding to the multicast/broadcast QoS flow to a PSA-UPF/UPF.

Optionally, if "QoS Flow Accept List" of "Path Switch Request Transfer" includes a unicast QoS flow to which the multicast/broadcast QoS flow is mapped, when establishing, adding, modifying, or updating a PFCP session context, the SMF does not establish, add, modify, or update a PDR or PDRs or the like corresponding to the multicast/broadcast QoS flow, or does not provide a PDR or PDRs or the like corresponding to the multicast/broadcast QoS flow to a PSA-UPF/UPF.

Optionally, if "QoS Flow Accept List" of "Path Switch Request Transfer" includes a unicast QoS flow to which the multicast/broadcast QoS flow is mapped, when/before/after establishing, adding, modifying, or updating a PFCP session context, the SMF does not establish, add, modify, or update a PDR or PDRs, an FAR or FARs, a QER or QERs, or the like corresponding to the multicast/broadcast QoS flow, or does not provide a PDR or PDRs, an FAR or FARs, a QER or QERs, or the like corresponding to the multicast/broadcast QoS flow to a PSA-UPF/UPF.

Optionally, if "QoS Flow Accept List" of "Path Switch Request Transfer" includes a unicast QoS flow to which the multicast/broadcast QoS flow is mapped, when/before/after establishing, adding, modifying, or updating a PFCP session context, the SMF does not establish, add, modify, or update a PDR or PDRs, an FAR or FARs, a QER or QERs, a URR or URRs, or the like corresponding to the multicast/broadcast QoS flow, or does not provide a PDR or PDRs, an FAR or FARs, a QER or QERs, a URR or URRs, or the like corresponding to the multicast/broadcast QoS flow to a PSA-UPF/UPF.

Optionally, if "QoS Flow Accept List" of "Path Switch Request Transfer" includes a unicast QoS flow to which the multicast/broadcast QoS flow is mapped, when/before/after establishing, adding, modifying, or updating a PFCP session context, the SMF does not establish, add, modify, or update a PDR or PDRs corresponding to the multicast/broadcast QoS flow, or does not provide a PDR or PDRs corresponding to the multicast/broadcast QoS flow to a PSA-UPF/UPF.

Optionally, if "QoS Flow Accept List" of "Path Switch Request Transfer" includes a unicast QoS flow to which the multicast/broadcast QoS flow is mapped, when/before/after establishing, adding, modifying, or updating a PFCP session context, the SMF does not establish, add, modify, or update a PDR or PDRs or an FAR or FARs corresponding to the multicast/broadcast QoS flow, or does not provide a PDR or PDRs or an FAR or FARs corresponding to the multicast/broadcast QoS flow to a PSA-UPF/UPF.

Optionally, if "QoS Flow Accept List" of "Path Switch Request Transfer" includes a unicast QoS flow to which the multicast/broadcast QoS flow is mapped, when/before/after establishing, adding, modifying, or updating a PFCP session context, the SMF does not establish, add, modify, or update a PDR or PDRs, an FAR or FARs, or a QER or QERs corresponding to the multicast/broadcast QoS flow, or does not provide a PDR or PDRs, an FAR or FARs, or a QER or QERs corresponding to the multicast/broadcast QoS flow to a PSA-UPF/UPF.

Optionally, if "QoS Flow Accept List" of "Path Switch Request Transfer" includes a unicast QoS flow to which the multicast/broadcast QoS flow is mapped, when/before/after establishing, adding, modifying, or updating a PFCP session context, the SMF does not establish, add, modify, or update a PDR or PDRs, an FAR or FARs, a QER or QERs, or a URR or URRs corresponding to the multicast/broadcast QoS flow, or does not provide a PDR or PDRs, an FAR or FARs, a QER or QERs, or a URR or URRs corresponding to the multicast/broadcast QoS flow to a PSA-UPF/UPF.

(2) If a PDU session associated with a multicast/broadcast service includes only a unicast QoS flow to which a multicast/broadcast QoS flow is mapped, that the SMF initiates release of the first transmission resource of the terminal described above is also applicable.

It should be noted that, herein, a PDU session associated with a multicast/broadcast service may also be referred to as a unicast fall-back PDU session, or a PDU session for a 5GC shared delivery method to individual delivery method switch, or a PDU session corresponding to a 5GC individual delivery method, or a PDU session corresponding to an individual delivery method.

It should be noted that other steps in FIG. 15 are not described in detail. The steps should be understood as the conventional art in the Xn handover, and details are not described again.

According to the communication method for a multicast/broadcast service provided in this application, if the SMF determines that the reference location of the terminal is outside the service area of the first multicast/broadcast service, the SMF notifies the UPF to initiate release of the first transmission resource of the terminal, so that network resources can be effectively saved, and a resource waste caused by invalid forwarding can be avoided.

Second, the method 1200 is described by using an example in which the network device is an S-gNB.

Figure 16A:
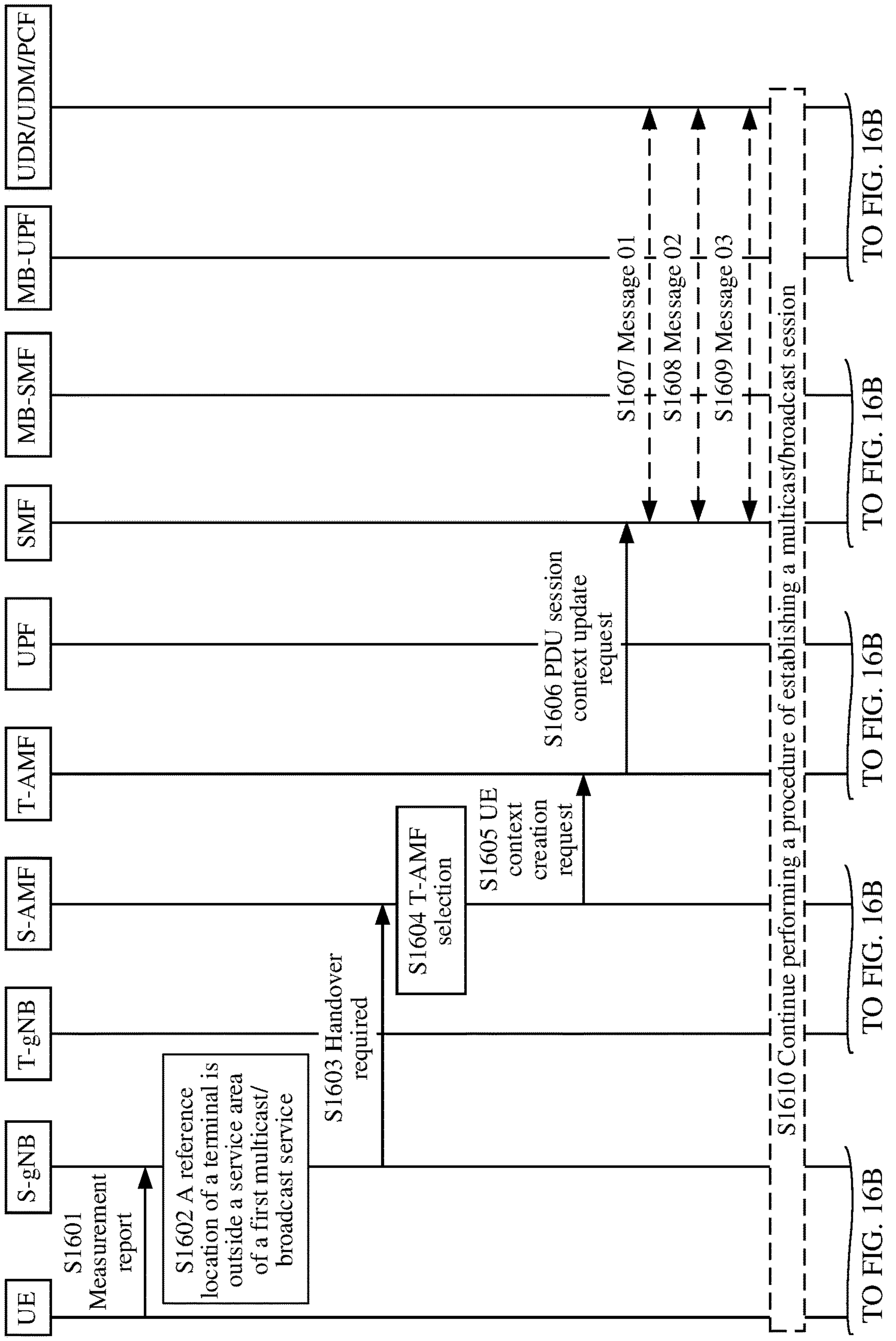
FIG. 16A and FIG. 16B are flowcharts of a communication method for a multicast/broadcast service according to an embodiment of this application.
Figure 16B:
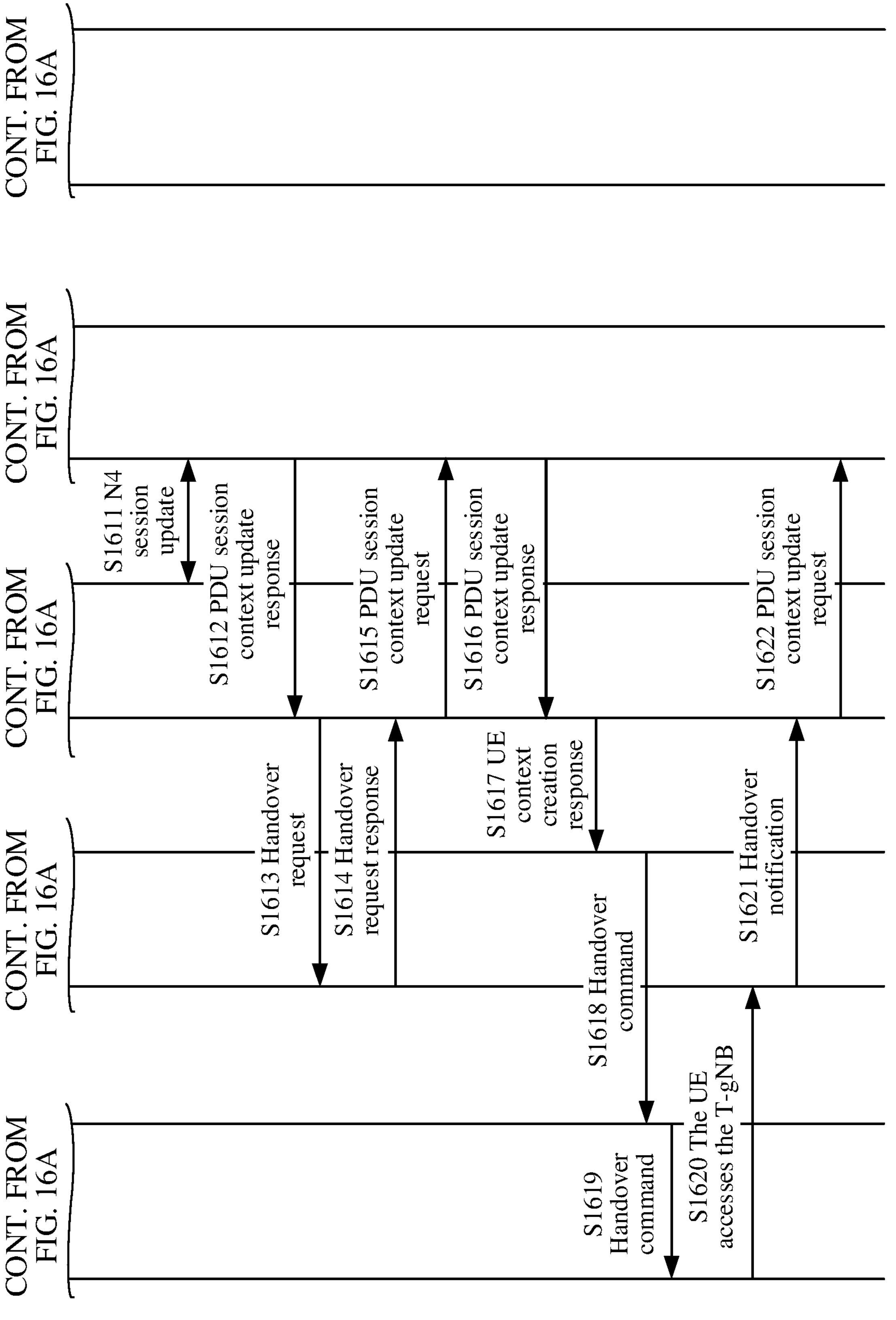

Applying the method 1200 to an N2 handover scenario is described first, as shown in FIG. 16A and FIG. 16B. In this scenario, the method 1200 is applicable to a scenario in which the S-gNB supports a multicast/broadcast function and the T-gNB does not support the multicast/broadcast function, or a scenario in which both the S-gNB and the T-gNB support a multicast/broadcast function, or a scenario in which the S-gNB does not support a multicast/broadcast function and the T-gNB supports a multicast/broadcast function.

The handover may include the following steps.

S1601. A UE sends a measurement report to an S-gNB. Correspondingly, the S-gNB receives the measurement report, determines a target cell, and determines to hand over the UE to a T-gNB in which the target cell is located.

S1602. The S-gNB determines that reference location information of the UE is not inside a service area of a first multicast/broadcast service. The reference location information may be location information of the terminal in the T-gNB of the terminal, the location information may be an identifier of a target cell, an identifier of the T-gNB, an identifier of a target tracking area, or the like.

After the S-gNB selects the target cell, the S-gNB stores a service area in corresponding context information obtained when the terminal joins the first multicast/broadcast service on the S-gNB. Therefore, the S-gNB may determine that location information of the terminal in the target cell of the terminal is not inside the service area of the first multicast/broadcast service.

Then, the S-gNB notifies, through S1603 to S1606, the SMF to release or delete the first transmission resource.

The S-gNB performs an operation based on a Handover Required information element in a hierarchical structure formed by the Handover Required information element defined in 3GPP TS 38.413. For example, one or more of the following manners may be used, which is not limited.

(1) If a PDU session associated with a multicast/broadcast service includes only a unicast QoS flow to which a multicast/broadcast QoS flow is mapped, the S-gNB may perform the following operations.

Optionally, the S-gNB does not include a "DL forwarding" information element in QoS Flow Information Item corresponding to a unicast QoS flow to which a multicast/broadcast QoS flow is mapped.

Optionally, the S-gNB includes a "DL forwarding" information element in QoS Flow Information Item corresponding to a unicast QoS flow to which a multicast/broadcast QoS flow is mapped, but does not set the unicast QoS flow to which the multicast/broadcast QoS flow is mapped to downlink forwarding proposed (or recommended) (which, according to 3GPP TS 38413, is described in English as "it is set to 'DL forwarding proposed'").

Optionally, the S-gNB includes a "DL forwarding" information element in QoS Flow Information Item corresponding to a unicast QoS flow to which a multicast/broadcast QoS flow is mapped, but does not perform parameter padding for DL forwarding.

It should be noted that the unicast QoS flow to which the multicast/broadcast QoS flow is mapped may be understood as the unicast QoS flow corresponding to the multicast/broadcast QoS flow.

It should be understood that the parameter padding may be, for example, an actual parameter corresponding to a formal parameter, an actual parameter corresponding to a variable, an actual value corresponding to the information element, or a value corresponding to the field.

(2) If a PDU session associated with a multicast/broadcast service further includes, in addition to a unicast QoS flow to which a multicast/broadcast QoS flow is mapped, another unicast QoS flow, in addition to the foregoing methods, the S-gNB may further perform the following operations. It should be noted that the following operations are not exhaustive and are not limited.

Alternatively, the S-gNB may not include any QoS Flow Information Item in QoS Flow Information List, or set QoS Flow Information List to null.

It should be noted that, herein, a PDU session associated with a multicast/broadcast service may also be referred to as a unicast fall-back PDU session, or a PDU session for a 5GC shared delivery method to individual delivery method switch, or a PDU session corresponding to a 5GC individual delivery method, or a PDU session corresponding to an individual delivery method.

It should be noted that other steps in FIG. 16A and FIG. 16B are not described in detail. The steps should be understood as the conventional art in the N2 handover, and details are not described again.

According to the communication method for a multicast/broadcast service provided in this application, if the S-gNB determines that the reference location of the terminal is outside the service area of the first multicast/broadcast service, the S-gNB notifies the SMF to initiate release of the first transmission resource of the terminal, so that network resources can be effectively saved, and a resource waste caused by invalid forwarding can be avoided.

Figure 17:
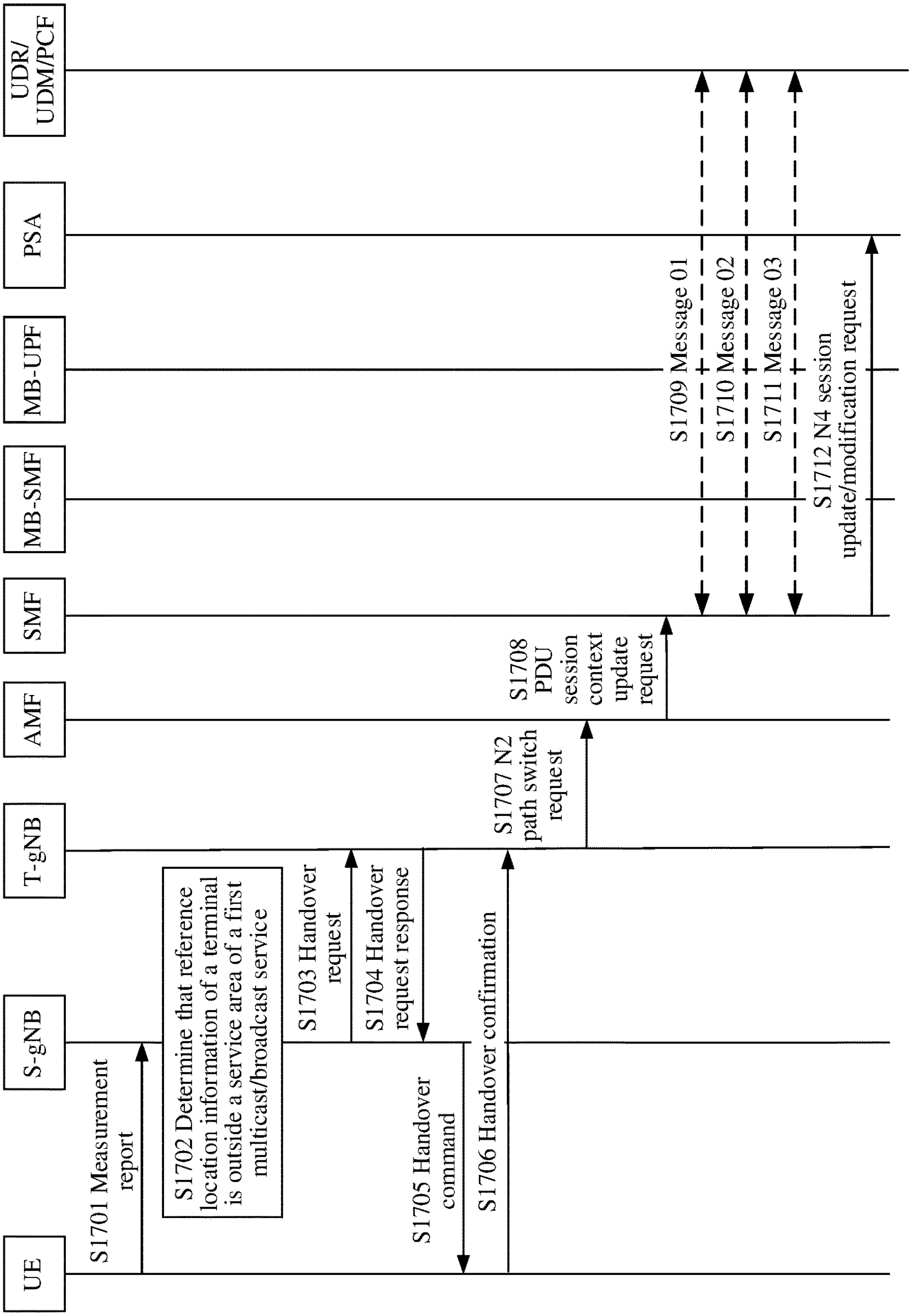
FIG. 17 is a flowchart of a communication method for a multicast/broadcast service according to an embodiment of this application.

Next, applying the network device being an S-gNB to an Xn handover scenario is described, as shown in FIG. 17. In this scenario, the network device being an S-gNB is applicable to a scenario in which the S-gNB support a multicast/broadcast function, and a T-gNB does not support a multicast/broadcast function.

S1701. A UE sends a measurement report to an S-gNB, and correspondingly, the S-gNB receives the measurement report, determines a target cell, and determines to hand over the UE to a T-gNB in which the target cell is located.

S1702. The S-gNB determines that reference location information of the UE is not inside a service area of a first multicast/broadcast service. The reference location information may be location information of the terminal in the T-gNB of the terminal, the location information may be an identifier of a target cell, an identifier of the T-gNB, an identifier of a target tracking area, or the like.

After the S-gNB selects the target cell, the S-gNB stores a service area in corresponding context information obtained when the terminal joins the first multicast/broadcast service on the S-gNB. Therefore, the S-gNB may determine that location information of the terminal in the target cell of the terminal is not inside the service area of the first multicast/broadcast service.

Then, the S-gNB notifies, through S1703 to S1708, the SMF to release or delete the first transmission resource.

The S-gNB performs an operation based on a Handover Request information element in a hierarchical structure formed by the Handover Request information element defined in 3GPP TS38.423. For example, one or more of the following manners may be used, which is not limited.

(1) If a PDU session associated with a multicast/broadcast service includes only a unicast QoS flow to which a multicast/broadcast QoS flow is mapped, the S-gNB may perform the following operations.

Optionally, the S-gNB does not include a "QoS Flow Identifier" information element in QoS Flows To Be Setup Item corresponding to a unicast QoS flow to which a multicast/broadcast QoS flow is mapped.

Optionally, the S-gNB does not include a "QoS Flow Level QoS Parameters" information element in QoS Flows To Be Setup Item corresponding to a unicast QoS flow to which a multicast/broadcast QoS flow is mapped.

Optionally, the S-gNB does not include, in "QoS Flows To Be Setup List", a "QoS Flows To Be Setup Item" information element corresponding to a unicast QoS flow to which a multicast/broadcast QoS flow is mapped.

Optionally, the S-gNB includes a "QoS Flow Identifier" information element in QoS Flows To Be Setup Item corresponding to a unicast QoS flow to which a multicast/broadcast QoS flow is mapped, but does not perform parameter padding for QoS Flow Identifier.

Optionally, the S-gNB includes a "QoS Flow Level QoS Parameters" information element in QoS Flows To Be Setup Item corresponding to a unicast QoS flow to which a multicast/broadcast QoS flow is mapped, but does not perform parameter padding for "QoS Flow Level QoS Parameters".

Optionally, the S-gNB includes, in "QoS Flows To Be Setup List", a "QoS Flows To Be Setup Item" information element corresponding to a unicast QoS flow to which a multicast/broadcast QoS flow is mapped, but does not perform parameter padding for "QoS Flows To Be Setup Item".

It should be understood that the parameter padding may be, for example, an actual parameter corresponding to a formal parameter, an actual parameter corresponding to a variable, an actual value corresponding to the information element, or a value corresponding to the field.

(2) If a PDU session associated with a multicast/broadcast service further includes, in addition to a unicast QoS flow to which a multicast/broadcast QoS flow is mapped, another unicast QoS flow, in addition to the foregoing methods, the S-gNB may further perform the following operations.

Optionally, the S-gNB does not include any "QoS Flows To Be Setup Item" in "QoS Flows To Be Setup List".

Optionally, the S-gNB includes, in "QoS Flows To Be Setup List", "QoS Flows To Be Setup Item" corresponding to a unicast QoS flow to which a multicast/broadcast QoS flow is mapped, but does not parameter padding for "QoS Flows To Be Setup Item".

Optionally, the S-gNB does not include a "QoS Flows To Be Setup List" information element in "PDU Session Resources To Be Setup Item".

Optionally, the S-gNB includes a "QoS Flows To Be Setup List" information element in "PDU Session Resources To Be Setup Item", but does not perform parameter padding on "QoS Flows To Be Setup List".

Optionally, the S-gNB does not include an information element "PDU Session Resources To Be Setup Item" in "PDU Session Resources To Be Setup List".

Optionally, the S-gNB includes an information element "PDU Session Resources To Be Setup Item" in "PDU Session Resources To Be Setup List", but does not perform parameter padding for "PDU Session Resources To Be Setup Item".

It should be noted that a PDU session associated with a multicast/broadcast service may also be referred to as a unicast fall-back PDU session, or referred to as a PDU session for a 5GC shared delivery method to individual delivery method switch, or referred to as a PDU session corresponding to a 5GC individual multicast/broadcast service traffic delivery method (5GC individual MBS traffic delivery method), or referred to as a PDU session corresponding to a 5GC individual delivery method, or referred to as a PDU session corresponding to an individual delivery method.

It should be noted that other steps in FIG. 17 are not described in detail. The steps should be understood as the conventional art in the Xn handover, and details are not described again.

According to the communication method for a multicast/broadcast service provided in this application, if the S-gNB determines that the reference location of the terminal is outside the service area of the first multicast/broadcast service, the S-gNB notifies the SMF to initiate release of the first transmission resource of the terminal, so that network resources can be effectively saved, and a resource waste caused by invalid forwarding can be avoided.

Figure 18:
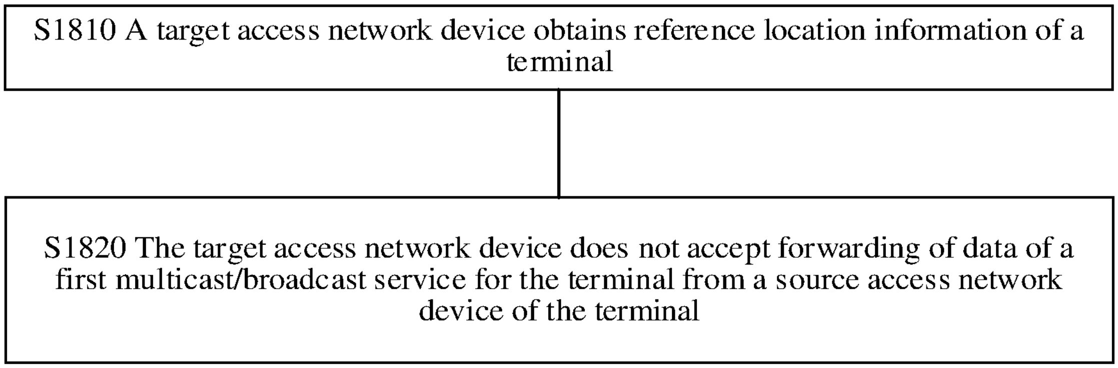
FIG. 18 is a flowchart of a communication method for a multicast/broadcast service according to an embodiment of this application.

FIG. 18 is a flowchart of a communication method 1800 for a multicast/broadcast service according to an embodiment of this application. The method 1800 includes at least the following steps.

It should be noted that the method 1800 is applicable to a scenario in which an S-gNB does not support the first multicast/broadcast service, but a T-gNB supports the first multicast/broadcast service.

The following steps are included.

S1810. The T-gNB obtains reference location information of a terminal, where the reference location information represents a reference location of the terminal.

Optionally, the T-gNB receives the reference location information of the terminal from the S-gNB. The reference location information includes location information of the terminal in the T-gNB of the terminal.

Optionally, the T-gNB may accept handover request information from the S-gNB, and the handover request information includes the location information of the terminal in the T-gNB.

S1820. The T-gNB does not accept forwarding of data of a first multicast/broadcast service for the terminal from the S-gNB of the terminal.

Alternatively, the T-gNB discards forwarding of data of a first multicast/broadcast service for the terminal from the S-gNB.

When the reference location of the terminal is outside a service area of the first multicast/broadcast service, the T-gNB does not accept/discards forwarding the data of the first multicast/broadcast service for the terminal from the source access network device of the terminal.

It should be noted that a PDU session associated with a multicast/broadcast service may also be referred to as a unicast fall-back PDU session, or referred to as a PDU session for a 5GC shared delivery method to individual delivery method switch, or referred to as a PDU session corresponding to a 5GC individual multicast/broadcast service traffic delivery method (5GC individual MBS traffic delivery method), or referred to as a PDU session corresponding to a 5GC individual delivery method, or referred to as a PDU session corresponding to an individual delivery method.

Figure 19:
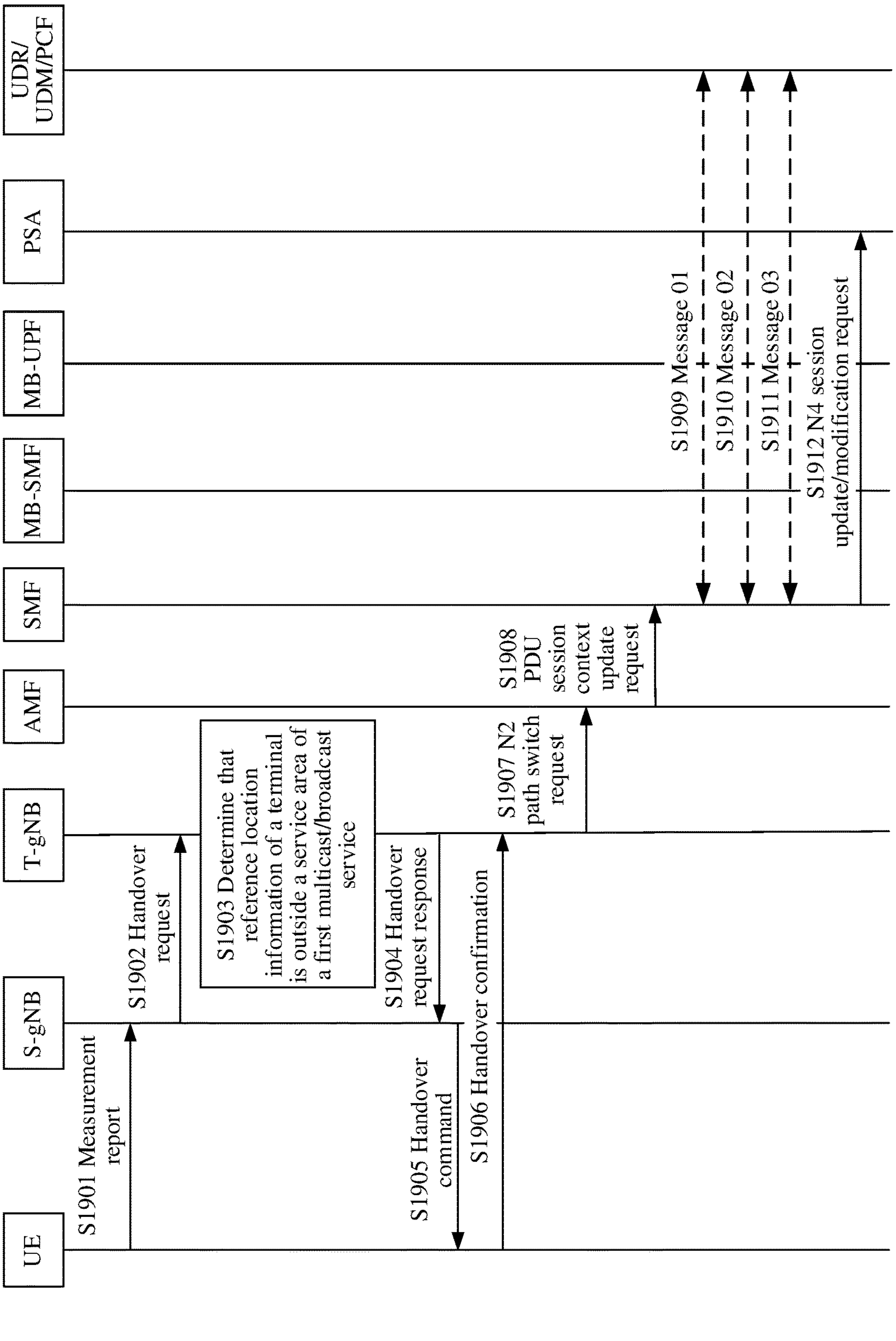
FIG. 19 is a flowchart of a communication method for a multicast/broadcast service according to an embodiment of this application.

For example, this embodiment may be applied to an Xn handover scenario, as shown in FIG. 19.

The following key steps are included:

S1902. The S-gNB sends a handover request to a T-gNB.

For example, the handover request may include PDU session information of the to-be-handed-over UE. The PDU session information may include an identifier of a PDU session and QoS information corresponding to a unicast QoS flow included in the PDU session. If the PDU session information of the to-be-handed-over UE is further associated with a multicast/broadcast service, the PDU session information further includes QoS information corresponding to a QoS flow corresponding to the associated multicast/broadcast service. For example, the QoS information of the unicast QoS flow includes a unicast QFI and a QoS parameter that correspond to the unicast QoS flow, and QoS information of a QoS flow of a multicast/broadcast service includes a unicast QFI to which a multicast/broadcast QFI corresponding to the multicast/broadcast service is mapped and a QoS parameter corresponding to the QFI.

In addition, the handover request may further include a QFI of a QoS flow that the S-gNB expects to forward to the T-gNB and a forwarding tunnel endpoint identifier generated by the S-gNB. For example, the QoS flow that the S-gNB expects to forward to the T-gNB may be a unicast QoS flow (including a unicast QoS flow to which a multicast/broadcast QoS flow is mapped).

In addition, according to a definition of the Handover Request information element in 3GPP TS 38.423, the handover request may further include location information or a location area (for example, Global NG-RAN Node ID) corresponding to the UE on the source base station.

S1903. When the T-gNB determines that the reference location information of the terminal is outside the service area of the first multicast/broadcast service, the T-gNB does not accept forwarding of data of the first multicast/broadcast service for the terminal from the S-gNB of the terminal.

If the T-gNB stores the service area in context information corresponding to the first multicast/broadcast service that another terminal joins on the T-gNB, the T-gNB determines that the location information corresponding to the terminal on the S-gNB is not in the service area.

The T-gNB may perform the following operations according to the definition of the Handover Request information element in 3GPP TS 38.423. It should be noted that the following operations are not exhaustive and are not limited.

(1) If a PDU session associated with a multicast/broadcast service includes a unicast QoS flow to which a multicast/broadcast QoS flow is mapped, the T-gNB may perform the following operations.

Optionally, the T-gNB may not recommend including (or may not include) an item corresponding to the QoS flow in "QoS Flows Admitted List".

Optionally, the T-gNB may recommend including (or may include) an item corresponding to the QoS flow in "QoS Flows Admitted List", but does not perform parameter padding for the item corresponding to the QoS flow.

Optionally, the T-gNB may not recommend including (or may not include) an item corresponding to the QoS flow in "QoS Flows Admitted List", and the T-gNB may recommend including (or may include) the item corresponding to the QoS flow in "QoS Flows not Admitted List".

Optionally, the T-gNB may not recommend including (or may not include) an item corresponding to the QoS flow in "QoS Flows Admitted List", and the T-gNB may not recommend including (or may not include) the item corresponding to the QoS flow in "QoS Flows Accepted For Data Forwarding List".

Optionally, the T-gNB may not recommend including (or may not include) an item corresponding to the QoS flow in "QoS Flows Admitted List", and the T-gNB may recommend (or may) include the item corresponding to the QoS flow in "QoS Flows Accepted For Data Forwarding List", but does not perform parameter padding for the item corresponding to the QoS flow.

Optionally, the T-gNB may not recommend including (or may not include) an item corresponding to the QoS flow in "QoS Flows Admitted List", the T-gNB may not recommend including (or may not include) the item corresponding to the QoS flow "QoS Flows Accepted For Data Forwarding List", and the T-gNB may not recommend including (or may not include) the item corresponding to the QoS flow in "QoS Flows Accepted For Data Forwarding List".

Optionally, the T-gNB may not recommend including (or may not include) an item corresponding to the QoS flow "QoS Flows Admitted List", the T-gNB may not recommend including (or may not include) the item corresponding to the QoS flow in "QoS Flows Accepted For Data Forwarding List", and the T-gNB may recommend including (or may include) the item corresponding to the QoS flow in "QoS Flows Accepted For Data Forwarding List", but does not perform parameter padding for the item corresponding to the QoS flow.

It should be understood that the parameter padding may be, for example, an actual parameter corresponding to a formal parameter, an actual parameter corresponding to a variable, an actual value corresponding to the information element, or a value corresponding to the field.

(2) If a PDU session associated with a multicast/broadcast service further includes only a unicast QoS flow to which a multicast/broadcast QoS flow is mapped, in addition to the operations in the foregoing method (1), the T-gNB may further perform the following operations. It should be noted that the following operations are not exhaustive and are not limited.

Optionally, the T-gNB does not (or does not recommend to) include any item corresponding to the QoS flow in a Handover Request Acknowledge information element.

According to the communication method for a multicast/broadcast service provided in this embodiment of this application, for the Xn handover, based on the location information corresponding to the terminal on the S-gNB and the service area in the context information corresponding to the multicast/broadcast service that is stored on the T-gNB, if the location information corresponding to the terminal on the S-gNB is not inside the service area, the T-gNB skips forwarding the QoS flow corresponding to the multicast/broadcast service or does not recommend forwarding the QoS flow corresponding to the multicast/broadcast service. Through processing and operations performed by the T-gNB, this solution can effectively save network resources, and avoid a resource waste caused by invalid forwarding of data of a multicast/broadcast service.

Figure 20:
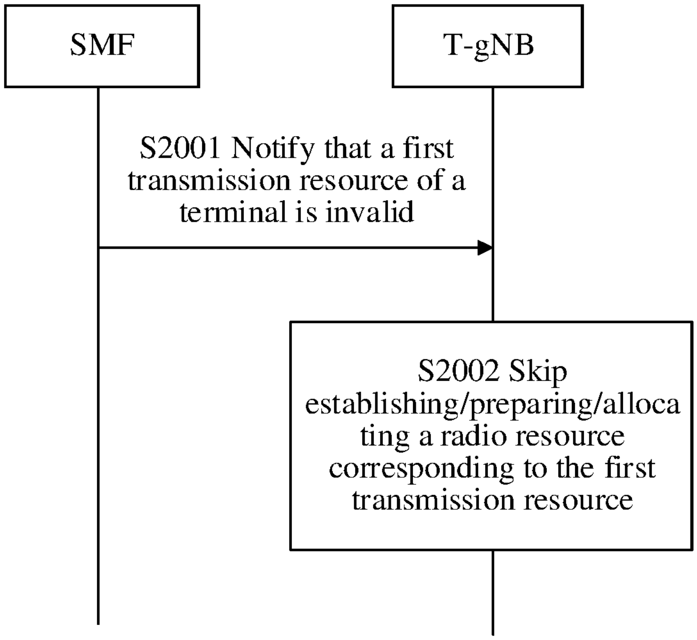
FIG. 20 is a flowchart of a communication method for a multicast/broadcast service according to an embodiment of this application.

FIG. 20 is a flowchart of a communication method 2000 for a multicast/broadcast service according to an embodiment of this application. The method 2000 includes at least the following steps.

S2001. A T-gNB receives a notification from an SMF. The notification notifies that a first transmission resource of the terminal is invalid, and the first transmission resource is used to transmit data of a first multicast/broadcast service.

S2002. The T-gNB does not establish a radio resource corresponding to the first transmission resource. That the T-gNB does not establish a radio resource corresponding to the first transmission resource may be replaced with that the T-gNB does not prepare a radio resource corresponding to the first transmission resource, or the T-gNB does not allocate a radio resource corresponding to the first transmission resource.

Figure 21:
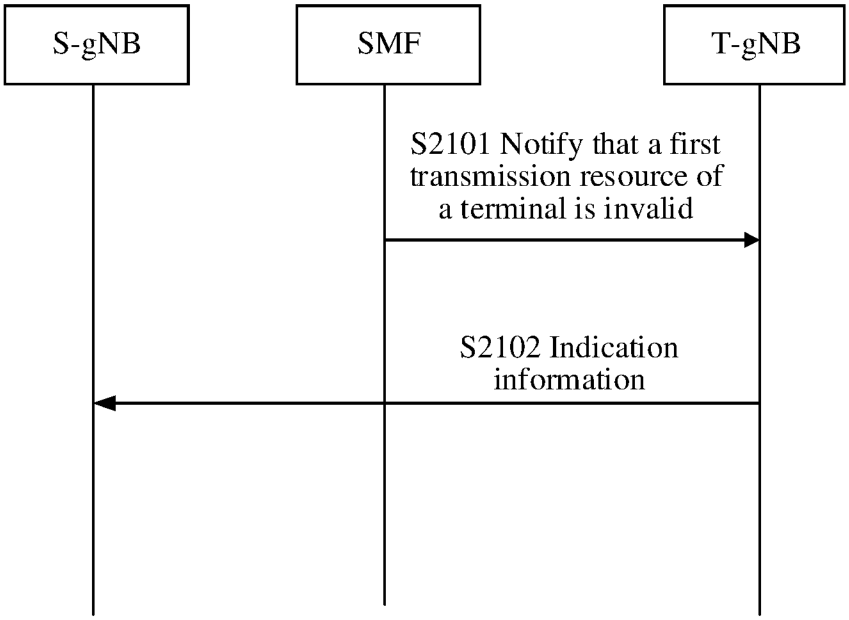
FIG. 21 is a flowchart of a communication method for a multicast/broadcast service according to an embodiment of this application.

Optionally, the T-gNB may further perform an operation in step 2102 shown in FIG. 21. For example, the T-gNB sends indication information to the S-gNB of the terminal. The indication information indicates that the T-gNB does not accept forwarding of data of a first multicast/broadcast service for the terminal from the source access network device.

According to the communication method for a multicast/broadcast service provided in this embodiment of this application, based on the location information corresponding to the terminal on the S-gNB and the service area in the context information corresponding to the multicast/broadcast service that is stored on the T-gNB, if the location information corresponding to the terminal on the S-gNB is not inside the service area, the T-gNB skips forwarding the QoS flow corresponding to the multicast/broadcast service or does not recommend forwarding the QoS flow corresponding to the multicast/broadcast service. Through processing and operations performed by the T-gNB, this solution can effectively save network resources and avoid a resource waste caused by invalid forwarding of data of a multicast/broadcast service.

It may be understood that in the foregoing method embodiments, the methods and operations implemented by the network device may alternatively be implemented by a component (for example, a chip or a circuit) that can be used in the network device.

The methods provided in embodiments of this application are described above in detail with reference to FIG. 5 to FIG. 23A and FIG. 23B. With reference to FIG. 24 to FIG. 27, the following describes in detail a communication apparatus for a multicast/broadcast service provided in embodiments of this application. It should be understood that descriptions of apparatus embodiments correspond to the descriptions of the method embodiments. Therefore, for content that is not described in detail, refer to the foregoing method embodiments. For brevity, details are not described herein again.

In embodiments of this application, the network device or the target access network device may be divided into function modules based on the foregoing method examples, for example, each function module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used. An example in which functional modules are obtained through division based on corresponding modules is used below for description.

Figure 24:
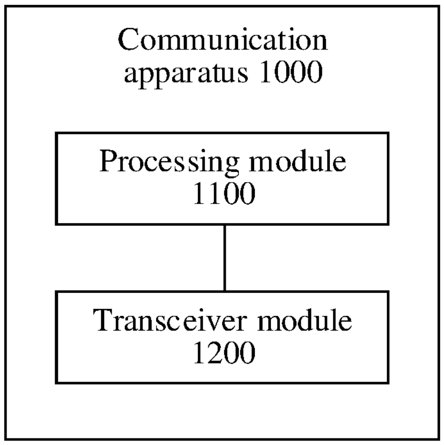
FIG. 24 is a diagram of a communication apparatus for a multicast/broadcast service according to an embodiment of this application.

FIG. 24 is a diagram of a communication apparatus for a multicast/broadcast service according to an embodiment of this application. As shown in the figure, the communication apparatus 1000 for a multicast/broadcast service may include a processing module 1100 and a transceiver module 1200.

In a possible design, the communication apparatus 1000 for a multicast/broadcast service may correspond to the network device in the foregoing method embodiments, and may be the SMF in the foregoing embodiments or a chip configured in the S-gNB.

The communication apparatus 1000 for a multicast/broadcast service may include modules configured to perform the method performed by the network device in the method 500 in FIG. 5, the method 700 in FIG. 7, the method 800 in FIG. 8A and FIG. 8B, the method 900 in FIG. 9, the method 1200 in FIG. 12, the method 1300 in FIG. 13, the method 1400 in FIG. 14A and FIG. 14B, or the method 1500 in FIG. 15. In addition, the modules in the communication apparatus 1000 for a multicast/broadcast service and the foregoing other operations and/or functions are respectively for implementing corresponding procedures in the method 500 in FIG. 5, the method 700 in FIG. 7, the method 800 in FIG. 8A and FIG. 8B, the method 900 in FIG. 9, the method 1200 in FIG. 12, the method 1300 in FIG. 13, the method 1400 in FIG. 14A and FIG. 14B, the method 1500 in FIG. 15, the method 2200 in FIG. 22A and FIG. 22B, or the method 2300 in FIG. 23A and FIG. 23B.

When the communication apparatus 1000 for a multicast/broadcast service is configured to perform the method 500 in FIG. 5, the processing module 1100 may be configured to perform step 510 and step 520 in the method 500.

When the communication apparatus 1000 for a multicast/broadcast service is configured to perform the method 700 in FIG. 7, the processing module 1100 may be configured to perform step 720 in the method 700, and the transceiver module 1200 may be configured to perform step 703 and step 704 in the method 700.

When the communication apparatus 1000 for a multicast/broadcast service is configured to perform the method 800 in FIG. 8A and FIG. 8B, the processing module 1100 may be configured to perform step 809 in the method 800, and the transceiver module 1200 may be configured to perform step 805 to step 808 and step 810 in the method 800.

When the communication apparatus 1000 for a multicast/broadcast service is configured to perform the method 900 in FIG. 9, the processing module 1100 may be configured to perform step 911 in the method 900, and the transceiver module 1200 may be configured to perform step 907 to step 910 and step 912 in the method 900.

When the communication apparatus 1000 for a multicast/broadcast service is configured to perform the method 1200 in FIG. 12, the processing module 1100 may be configured to perform step 1201 and step 1202 in the method 1200.

When the communication apparatus 1000 for a multicast/broadcast service is configured to perform the method 1300 in FIG. 13, the processing module 1100 may be configured to perform step 1302 and step 1305 in the method 1300, and the transceiver module 1200 may be configured to perform step 1303 and step 1304 in the method 1300.

When the communication apparatus 1000 for a multicast/broadcast service is configured to perform the method 1400 in FIG. 14A and FIG. 14B, the processing module 1100 may be configured to perform step 1409 in the method 1400, and the transceiver module 1200 may be configured to perform step 1405 to step 1408 and step 1410 in the method 1400.

When the communication apparatus 1000 for a multicast/broadcast service is configured to perform the method 1500 in FIG. 15, the processing module 1100 may be configured to perform step 1511 in the method 1500, and the transceiver module 1200 may be configured to perform step 1507 to step 1510 and step 1512 in the method 1500.

When the communication apparatus 1000 for a multicast/broadcast service is configured to perform the method 2200 in FIG. 22A and FIG. 22B, the processing module 1100 may be configured to perform step 2209 in the method 2200, and the transceiver module 1200 may be configured to perform step 2205 to step 2208 and step 2210 in the method 2200.

When the communication apparatus 1000 for a multicast/broadcast service is configured to perform the method 2300 in FIG. 23A and FIG. 23B, the processing module 1100 may be configured to perform step 2309 in the method 2300, and the transceiver module 1200 may be configured to perform step 2305 to step 2308 and step 2310 in the method 2300.

Figure 25:
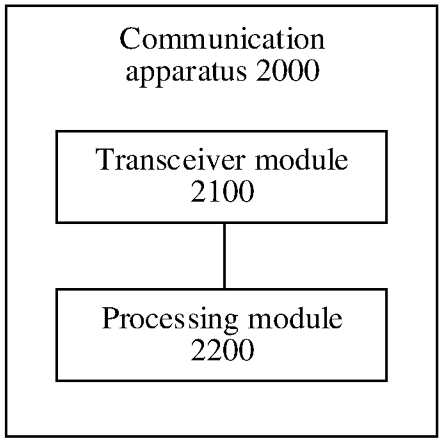
FIG. 25 is a diagram of a communication apparatus for a multicast/broadcast service according to an embodiment of this application.

FIG. 25 is a diagram of a communication apparatus for a multicast/broadcast service according to an embodiment of this application. As shown in the figure, the communication apparatus 2000 for a multicast/broadcast service may include a transceiver module 2100 and a processing module 2200.

In a possible design, the communication apparatus 2000 for a multicast/broadcast service may correspond to the network device in the foregoing method embodiments, and may be the S-gNB in the foregoing embodiments or a chip configured in the S-gNB.

The communication apparatus 2000 for a multicast/broadcast service may include modules configured to perform the method performed by the network device in the method 500 in FIG. 5, the method 1000 in FIG. 10A and FIG. 10B, the method 1100 in FIG. 11, the method 1200 in FIG. 12, the method 1600 in FIG. 16A and FIG. 16B, or the method 1700 in FIG. 17. In addition, the modules in the communication apparatus 2000 for a multicast/broadcast service and the foregoing other operations and/or functions are respectively for implementing corresponding procedures in the method 500 in FIG. 5, the method 1000 in FIG. 10A and FIG. 10B, the method 1100 in FIG. 11, the method 1200 in FIG. 12, the method 1600 in FIG. 16A and FIG. 16B, or the method 1700 in FIG. 17.

When the communication apparatus 1000 for a multicast/broadcast service is configured to perform the method 500 in FIG. 5, the processing module 2200 may be configured to perform step 510 and step 520 in the method 500.

When the communication apparatus 2000 for a multicast/broadcast service is configured to perform the method 1000 in FIG. 10A and FIG. 10B, the transceiver module 2100 may be configured to perform step 1001 and step 1003 in the method 1000, and the processing module 2200 may be configured to perform step 1002 in the method 1000.

When the communication apparatus 2000 for a multicast/broadcast service is configured to perform the method 1100 in FIG. 11, the transceiver module 2100 may be configured to perform step 1001 and step 1003 in the method 1100, and the processing module 2200 may be configured to perform step 1102 in the method 1100.

When the communication apparatus 2000 for a multicast/broadcast service is configured to perform the method 1200 in FIG. 12, the processing module 2200 may be configured to perform step 1201 and step 1202 in the method 1200.

When the communication apparatus 2000 for a multicast/broadcast service is configured to perform the method 1600 in FIG. 16A and FIG. 16B, the transceiver module 2100 may be configured to perform step 1601 and step 1603 in the method 1600, and the processing module 2200 may be configured to perform step 1602 in the method 1600.

When the communication apparatus 2000 for a multicast/broadcast service is configured to perform the method 1700 in FIG. 17, the transceiver module 2100 may be configured to perform step 1701 and step 1703 in the method 1700, and the processing module 2200 may be configured to perform step 1702 in the method 1700.

Figure 26:
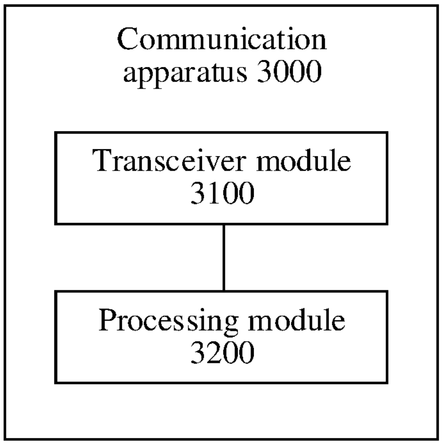
FIG. 26 is a diagram of a communication apparatus for a multicast/broadcast service according to an embodiment of this application.

FIG. 26 is a diagram of a communication apparatus 3000 for a multicast/broadcast service according to an embodiment of this application. As shown in the figure, the communication apparatus 3000 for a multicast/broadcast service may include a transceiver module 3100 and a processing module 3200.

In a possible design, the communication apparatus 3000 for a multicast/broadcast service may correspond to the target access network device in the foregoing method embodiments, or a chip configured in the target access network device.

The communication apparatus 3000 for a multicast/broadcast service may include modules configured to perform the method performed by the target access network device in the method 1800 in FIG. 18, the method 1900 in FIG. 19, the method 2000 in FIG. 20, or the method 2100 in FIG. 21. In addition, the modules in the communication apparatus 3000 for a multicast/broadcast service and the foregoing other operations and/or functions are respectively for implementing a corresponding procedure in the method 1800 in FIG. 18, the method 1900 in FIG. 19, the method 2000 in FIG. 20, or the method 2100 in FIG. 21.

When the communication apparatus 3000 for a multicast/broadcast service is configured to perform the method 1800 in FIG. 18, the processing module 3200 may be configured to perform step 1810 and step 1820 in the method 1800.

When the communication apparatus 3000 for a multicast/broadcast service is configured to perform the method 1900 in FIG. 19, the transceiver module may be configured to perform step 1902, step 1904, and step 1907 in the method 1900, and the processing module 3200 may be configured to perform step 1903 in the method 1900.

When the communication apparatus 3000 for a multicast/broadcast service is configured to perform the method 2000 in FIG. 20, the transceiver module may be configured to perform step 2001 in the method 2000, and the processing module 3200 may be configured to perform step 2002 in the method 2000.

When the communication apparatus 3000 for a multicast/broadcast service is configured to perform the method 2100 in FIG. 21, the transceiver module may be configured to perform step 2101 and step 2102 in the method 2100.

Figure 27:
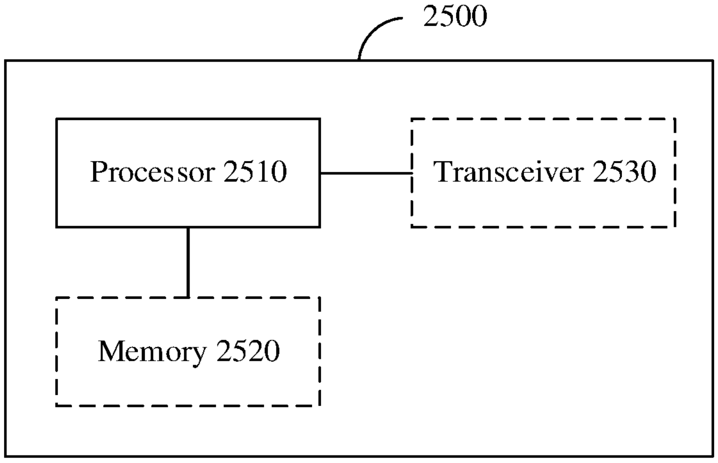
FIG. 27 is a diagram of a communication apparatus according to an embodiment of this application.

As shown in FIG. 27, embodiments of this application further provide a communication apparatus 2500 for a multicast/broadcast service. The communication apparatus 2500 for a multicast/broadcast service includes a processor 2510. The processor 2510 is coupled to the memory 2520. The memory 2520 is configured to store a computer program or instructions and/or data. The processor 2510 is configured to execute the computer program or the instructions and/or the data stored in the memory 2520, to enable the methods in the foregoing method embodiments to be performed.

Optionally, the communication apparatus 2500 for a multicast/broadcast service includes one or more processors 2510.

Optionally, as shown in FIG. 17, the communication apparatus 2500 for a multicast/broadcast service may further include a memory 2520.

Optionally, there may be one or more memories 2520 included in the communication apparatus 2500 for a multicast/broadcast service.

Optionally, the memory 2520 and the processor 2510 may be integrated together, or may be arranged separately.

Optionally, as shown in FIG. 27, the communication apparatus 2500 for a multicast/broadcast service may further include a transceiver 2530. The transceiver 2530 is configured to send and/or receive a signal. For example, the processor 2510 is configured to control the transceiver 2530 to send and/or receive a signal.

In a solution, the communication apparatus 2500 for a multicast/broadcast service is configured to implement operations performed by the network device or the target access network device in the foregoing method embodiments.

Embodiments of this application further provide a computer-readable storage medium. The computer-readable storage medium stores computer instructions for implementing the method performed by the network device or the target access network device in the foregoing method embodiments.

For example, when the computer program is executed by a computer, the computer is enabled to implement the method performed by the terminal device or the method performed by the network device in the foregoing method embodiment.

Embodiments of this application further provide a computer program product including instructions. When the instructions are executed by a computer, the computer is enabled to implement the method performed by the terminal device or the method performed by the network device in the foregoing method embodiment.

Embodiment of this application further provide a communication system for a multicast/broadcast service. The communication system includes the network device or the target access network device in the foregoing embodiments.

It may be clearly understood by a person skilled in the art that, for the purpose of convenient and brief description, for explanations and beneficial effects of related content in any communication apparatus for a multicast/broadcast service provided above, refer to the corresponding method embodiments provided above. Details are not described herein again.

In embodiments of this application, the terminal device or the network device may include a hardware layer, an operating system layer running above the hardware layer, and an application layer running above the operating system layer. The hardware layer may include hardware such as a central processing unit (CPU), a memory management unit (MMU), and a memory (also referred to as a primary memory). An operating system at the operating system layer may be any one or more computer operating systems that implement service processing through a process, for example, a Linux operating system, a Unix operating system, an Android operating system, an iOS operating system, or a Windows operating system. The application layer may include applications such as a browser, an address book, word processing software, and instant messaging software.

A structure of an execution body of the method provided in embodiments of this application is not limited in embodiments of this application, provided that a program that records code of the method provided in embodiments of this application can be run to perform communication according to the method provided in embodiments of this application. For example, the method provided in embodiments of this application may be performed by a terminal device, a network device, or a functional module that is in a terminal device or a network device and that can invoke and execute the program.

Aspects or features of this application may be implemented as a method, an apparatus or a product that uses standard programming and/or engineering technologies. The term “product” used in this specification may cover a computer program that can be accessed from any computer-readable component, carrier or medium.

The computer-readable storage medium may be any usable medium accessible by a computer, or a data storage device, such as a server or a data center, integrating one or more usable media. The usable medium (or the computer-readable medium) may include, for example, but is not limited to, various media that can store program code such as a magnetic medium or a magnetic storage device (for example, a floppy disk, a hard disk (for example, a removable hard disk), or a magnetic tape), an optical medium (for example, an optical disc, a compact disc (CD), or a digital versatile disc (DVD)), a smart card, a flash memory device (for example, an erasable programmable read-only memory (EPROM), a card, a stick, or a key drive), or a semiconductor medium (for example, a solid-state disk (SSD), a USB flash drive, a read-only memory (ROM), or a random access memory (RAM)).

Various storage media described in this specification may represent one or more devices and/or other machine-readable media that are configured to store information. The term “machine-readable media” may include but is not limited to a radio channel and various other media that can store, include, and/or carry instructions and/or data.

It should be understood that the processor in embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It may be understood that the memory mentioned in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM). For example, the RAM may be used as an external cache. By way of example and not limitation, the RAM may include the following plurality of forms: a static random access memory (SRAM), a dynamic random access memory (DRAM), a synchronous dynamic random access memory (sySDRAM), a double data rate synchronous dynamic random access memory (DDR SDRAM), an enhanced synchronous dynamic random access memory (ESDRAM), a synchlink dynamic random access memory (SLDRAM), or a direct rambus dynamic random access memory (DR RAM).

It should be noted that when the processor is a general-purpose processor, a DSP, an ASIC, an FPGA or another programmable logic device, a discrete gate or a transistor logic device, or a discrete hardware component, the memory (storage module) may be integrated into the processor.

It should further be noted that the memory described in this specification aims to include but is not limited to these memories and any memory of another proper type.

In the several embodiments provided in this application, it should be understood that the disclosed apparatus and method may be implemented in other manners. For example, the foregoing apparatus embodiments are only examples. For example, division into the foregoing units is only logical function division, and may be another division manner during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The foregoing units described as separate parts may or may not be physically separate, and parts displayed as units may or may not be physical units, may be located in one position, or may be distributed on a plurality of network units. Some or all of the units may be selected based on actual requirements to implement the solutions provided in this application.

In addition, function units in embodiments of this application may be integrated into one unit, or each of the units may exist alone physically, or two or more units are integrated into one unit.

All or some of the foregoing embodiments may be implemented by using software, hardware, firmware, or any combination thereof.

When software is used to implement the embodiments, all or a part of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. For example, the computer may be a personal computer, a server, or a network device. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. For the computer-readable storage medium, refer to the foregoing descriptions.

The foregoing descriptions are merely implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims and this specification.

What is claimed is:

1. A communication method for a multicast/broadcast service, comprising:

subscribing, by a session management function network element, to a reference location information of a terminal from an access and mobility management network element;

receiving, by the session management function network element, the reference location information of the terminal from the access and mobility management network element, the reference location information representing a reference location of the terminal, the reference location information including one or more of a current location cell of the terminal or a location of the terminal in a target access network device of the terminal; and triggering, by the session management function network element when the reference location of the terminal is inside a service area of a first multicast/broadcast service, the target access network device of the terminal to allocate a transmission resource to the terminal, the transmission resource being used for transmitting data of the first multicast/broadcast service.

2. The method according to claim 1, wherein the location information is an identifier of a target cell of the terminal and/or an identifier of the target access network device.

3. The method according to claim 1, wherein the location information includes at least one of: an identifier of a cell, an identifier of an access network device, an identifier of a tracking area, or an identifier of a public land mobile network (PLMN).

4. A communication method for a multicast/broadcast service, comprising:

subscribing, by a session management function network element, to a reference location information of a terminal from an access and mobility management network element;

receiving, by the session management function network element, the reference location information of the terminal from the access and mobility management network element, the reference location information representing a reference location of the terminal, the reference location information including one or more of a current location cell of the terminal or a location of the terminal in a target access network device of the terminal; and initiating, by the session management function network element when the reference location of the terminal is outside a service area of a first multicast/broadcast service, release of a first transmission resource of the terminal, the first transmission resource being used for transmitting data of the first multicast/broadcast service.

5. The method according to claim 4, wherein the first transmission resource comprises a resource used for the terminal transmitting the data of the first multicast/broadcast service through the target access network device of the terminal.

6. The method according to claim 4, wherein the method further comprises:

determining, by the session management function network element based on the reference location information, that the terminal is outside the service area of the first multicast/broadcast service.

7. The method according to claim 4, wherein the first message is a protocol data unit (PDU) session context update request or a location information provision.

8. The method according to claim 4, wherein:

the initiating, by the session management function network element, the release of the first transmission resource comprises one or both of:

notifying, by the session management function network element, a user plane function network element (UPF) to release the first transmission resource; or notifying, by the session management function network element, the target access network device of the terminal to release the first transmission resource.

9. The method according to claim 8, wherein the notifying, by the session management function network element, the UPF to release the first transmission resource comprises:

sending, by the session management function network element, an N4 session modification request or a packet forwarding control protocol (PFCP) session modification request to the UPF to notify the UPF to release the first transmission resource.

10. The method according to claim 4, wherein the location information includes at least one of: an identifier of a cell, an identifier of an access network device, an identifier of a tracking area, or an identifier of a public land mobile network (PLMN).

11. A session management function network element for a multicast/broadcast service, comprising:

a memory storing instructions; and at least one processor in communication with the memory, the at least one processor configured, upon execution of the instructions, to perform the following steps:

subscribing to a reference location information of a terminal from an access and mobility management network element;

receiving the reference location information of the terminal from the access and mobility management network element, the reference location information representing a reference location of the terminal, the reference location information including one or more of a current location cell of the terminal or a location of the terminal in a target access network device of the terminal; and triggering, when the reference location of the terminal is inside a service area of a first multicast/broadcast service, the target access network device of the terminal to allocate a transmission resource to the terminal, the transmission resource being used for transmitting data of the first multicast/broadcast service.

12. The session management function network element according to claim 11, wherein the location information is an identifier of a target cell of the terminal and/or an identifier of the target access network device.

13. A session management function network element for a multicast/broadcast service, comprising:

a memory storing instructions; and at least one processor in communication with the memory, the at least one processor configured, upon execution of the instructions, to perform the following steps:

subscribing to a reference location information of a terminal from an access and mobility management network element;

receiving the reference location information of the terminal from the access and mobility management network element, the reference location information representing a reference location of the terminal, the reference location information including one or more of a current location cell of the terminal or a location of the terminal in a target access network device of the terminal; and initiating, when the reference location of the terminal is outside a service area of a first multicast/broadcast service, release of a first transmission resource of the terminal, the first transmission resource being used for transmitting data of the first multicast/broadcast service.

14. The session management function network element according to claim 13, wherein the first transmission resource comprises a resource used for the terminal transmitting the data of the first multicast/broadcast service through the target access network device of the terminal.

15. The session management function network element according to claim 13, wherein the at least one processor is further configured to:

determine, based on the reference location information, that the terminal is outside the service area of the first multicast/broadcast service.

16. The session management function network element according to claim 13, wherein the at least one processor further executes the instructions to perform one or more of:

notify a user plane function network element (UPF) to release the first transmission resource; or notify the target access network device of the terminal to release the first transmission resource.

* * * * *